United States Patent

Kawanishi et al.

[11] Patent Number: 5,889,235
[45] Date of Patent: Mar. 30, 1999

[54] COMBINATION WEIGHING METHOD AND COMBINATION BALANCE

[75] Inventors: Shozo Kawanishi; Hiroshi Higuchi; Yoshitaka Mikata; Kenichi Nakagawa; Seiji Yamano, all of Hyogo-ken, Japan

[73] Assignee: Yamato Scale Company, Ltd., Hyogo-ken, Japan

[21] Appl. No.: 860,546

[22] PCT Filed: Oct. 11, 1996

[86] PCT No.: PCT/JP96/02955

§ 371 Date: Jun. 5, 1997

§ 102(e) Date: Jun. 5, 1997

[87] PCT Pub. No.: WO97/14020

PCT Pub. Date: Apr. 17, 1997

[30] Foreign Application Priority Data

Oct. 12, 1995 [JP] Japan ................................. 7-291922
Feb. 19, 1996 [JP] Japan ................................. 8-056815

[51] Int. Cl.[6] .................................................. G01G 13/00
[52] U.S. Cl. .......................................... 177/25.18; 177/52
[58] Field of Search ................................... 177/25.18, 52, 177/56, 57

[56] References Cited

U.S. PATENT DOCUMENTS 4,418,772  12/1983  Fukuda ................................ 177/25.18
4,420,051  12/1983  Furuta et al. ............................. 177/52
5,340,949   8/1994  Fujimura et al. .................... 177/25.18

FOREIGN PATENT DOCUMENTS 58-47718 A   3/1983   Japan .
62/17564 A   1/1986   Japan .
8-29242 A    2/1996   Japan .

Primary Examiner—Randy W. Gibson
Attorney, Agent, or Firm—Senniger, Powers, Leavitt & Roedel

[57] ABSTRACT

A combination weighing machine includes a plurality of cups (20) into which articles (21) are put, a weigher (62) for measuring the sum weights of cup (20) and the articles (21) in the cups (20), or measuring the weights of the articles (21) while the articles (21) are held in the cups (20), a retention conveyor (63) for receiving from the weigher (62) and causing to wait the plurality of cups (20) containing articles (21) of which weights have been measured by the weigher (62), combination computing means for combining respective weight values developed by the measurement by the weigher (62) in various ways, and selecting articles (21) forming a combination of articles the sum weight of which is within a predetermined weight range, and a transfer conveyor (66) for conveying the cups (20) containing the articles (21) which form the combination selected by the combination computing means to a discharge position where the articles (21) forming the selected combination are discharged.

13 Claims, 29 Drawing Sheets

FIG. 20
(a)
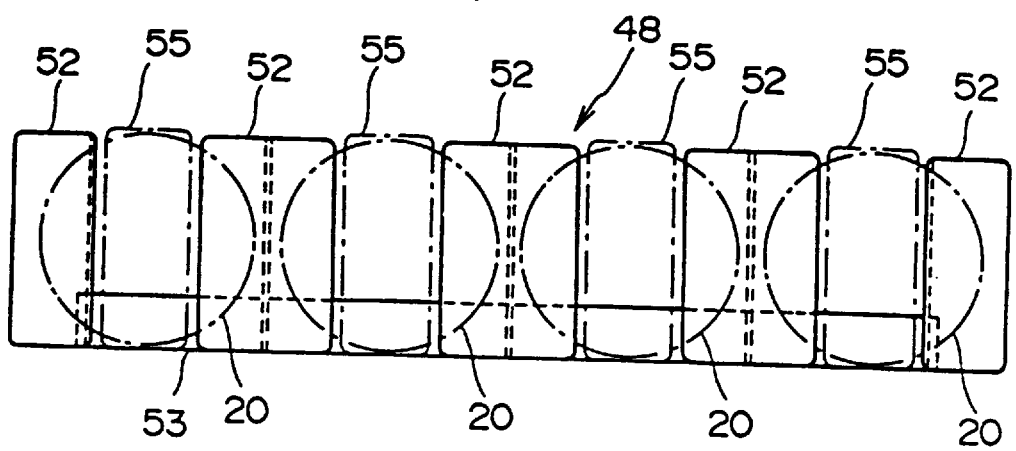
(b)
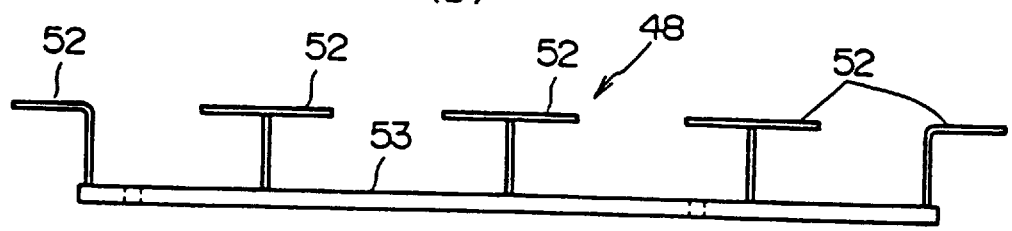
(c)  (d)
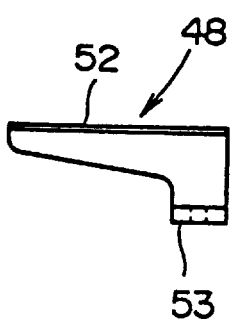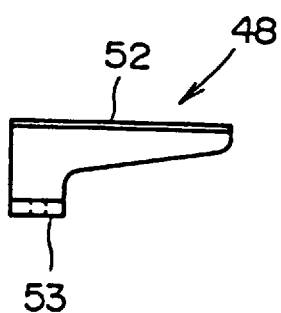

FIG. 21(a)
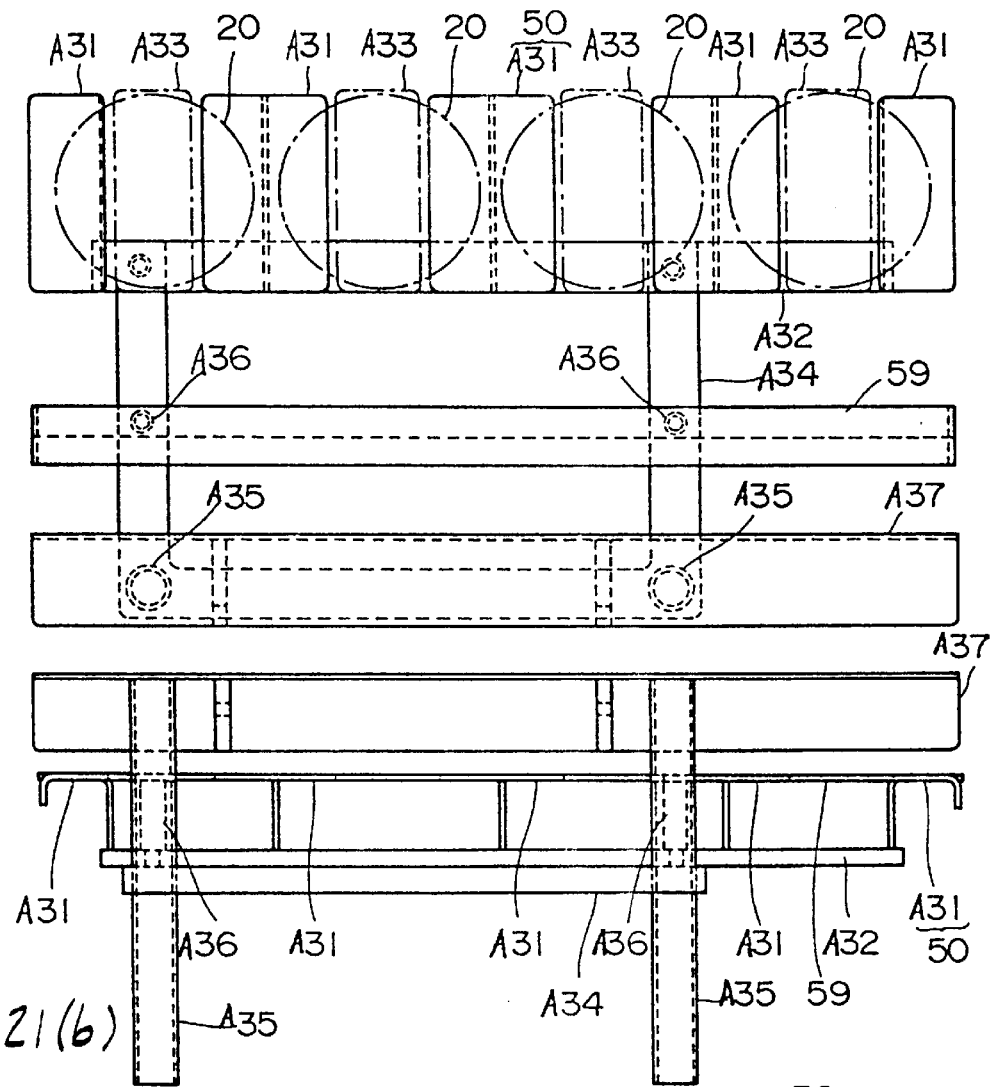
FIG. 21(b)
FIG. 21(c)
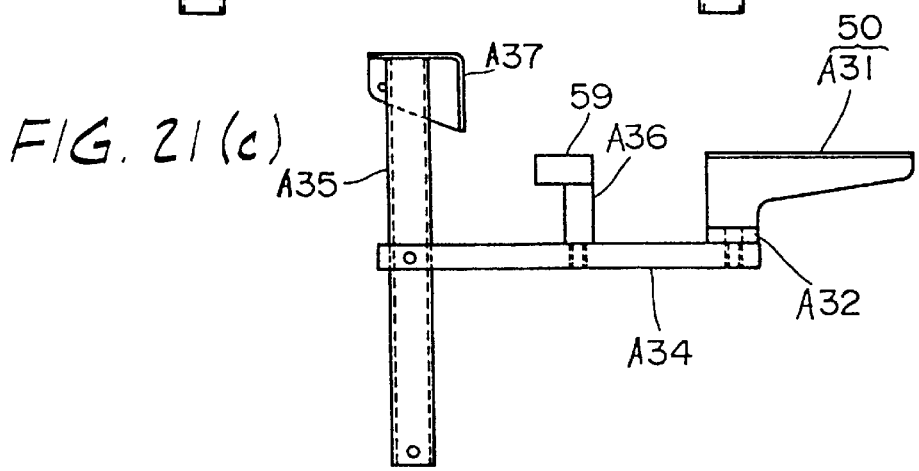

FIG. 33
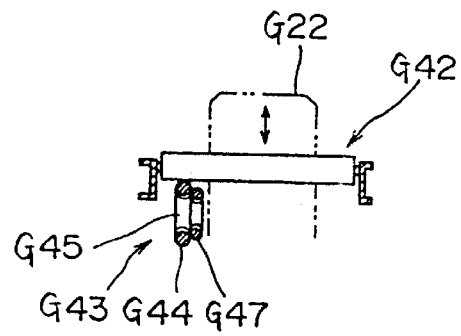
FIG. 34(a)    FIG. 34(c)
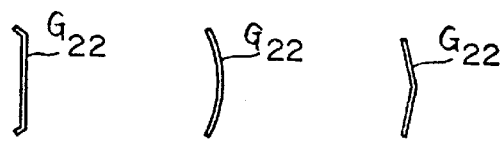
FIG. 34(b)
FIG. 35
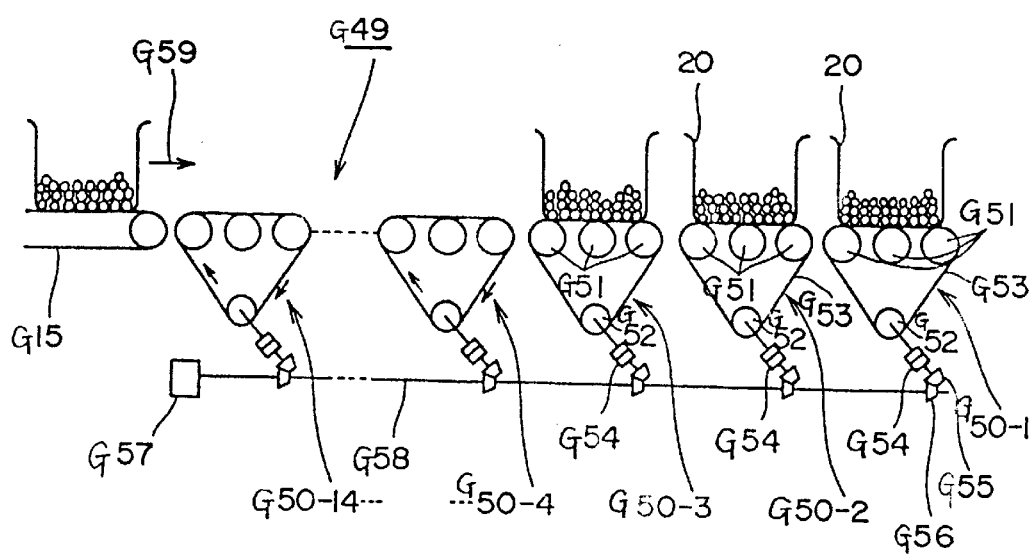

COMBINATION WEIGHING METHOD AND COMBINATION BALANCE

TECHNICAL FIELD

This invention relates to a combination weighing machine which can weigh and transport adhesive or sticky articles, such as cut vegetable, pickles and roe, while holding them in article holding means.

BACKGROUND ART

As shown in FIG. 36 which is a partially simplified cross-sectional view, a prior art combination weighing machine includes a cone-shaped distributing table 1 onto which articles 2 to be weighed are supplied. The distributing table 1 distributes the articles 2 outward of the outer periphery of the table 1 by centrifugal force, for example. The articles 2 moved outward of the periphery of the distributing table 1 are fed to a plurality of straight feeders 3 disposed along the outer periphery of the distributing table 1. The straight feeders 3 transport the articles 2 successively outward. The articles 2 discharged from a distal end of each straight feeder 3 drop into a supply hopper 4 disposed beneath the distal end of the feeder 3. The articles 2 in the hoppers 4 are then fed to weighing hoppers 5 which are disposed beneath respective ones of the supply hoppers 4. The articles in each weighing hopper 5 are then weighed by a weight detector 6 which supports that weighing hopper 5. After the articles 2 are weighed, a gate 7 inside each weighing hopper 5 is opened and the weighed articles are fed to a memory hopper 8 disposed beneath the weighing hopper 5. When the weighing hoppers 5 are emptied, other articles are supplied to the weighing hoppers 5 in a manner similar to the one described above. The measured weights of weighed articles in the respective weighing hoppers 5 and the measured weights of weighed articles in the respective memory hoppers 8 are arithmetically combined and processed, and the combination of measured weights which is equal or nearest in weight to a predetermined weight is selected. The articles corresponding to the selected weight are discharged from the weighing hopper 5 and the memory hopper 8. The discharged article 2 are fed to a collection hopper 11 via an individual chute 9 and a collecting chute 10, where they are fed to a packaging machine 12.

Usually, the prior art combination weighing machine shown in FIG. 36 requires at least ten to fourteen weighing hoppers 5, although the number depends on a required measuring precision. These ten to fourteen weighing hoppers 5 are disposed beneath the distal ends of the respective ones of ten to fourteen straight feeders 3. Then, the diameter D (see FIG. 36) of a circle on which the weighing hoppers 5 are disposed is relatively large. For feeding articles selected for combination to the packaging machine 12, the selected articles must be gathered to one location above the packaging machine 12. Therefore the selected articles are fed to the single collection hopper 11. Accordingly, the diameter D of the prior art combination weighing machine is relatively large as shown in FIG. 36, and the length R of the path from the respective weighing hoppers 5 to the collection hopper 11, too, is long accordingly.

For weighing articles which are sticky or adhesive, if the length R of the path 13 is long, amounts of articles sticking to inside walls of the individual chutes 9 and collecting chute 10 which together form the path 13 increase, which results in lowering of the weighing precision of the combination weighing machine.

With the combination machine shown in FIG. 36, the use of the memory hoppers 8 increases the number of weighed articles which can be combined, which can improve the combination weighing precision. However, with this machine, because weighed articles 2 in the weighing hoppers 5 must be removed into the memory hoppers 8, a larger amount of articles, when they are sticky or adhesive, will adhere to the weighing hoppers 5 and the memory hoppers 8, which degrade the combination weighing precision. Then, for sticky or adhesive articles, it sometimes become impossible to use the memory hoppers 8 in order to maintain a desired weighing precision.

In order to maintain a desired weighing precision without using the memory hoppers 8, the number of the weighing hoppers 5 may be increased. However, with an increased number of weighing hoppers 5, the diameter D shown in FIG. 36 increases and, accordingly, the length R of the path 13 also increases. Therefore there is a limitation on the number of the weighing hoppers 5 which can be increased. Furthermore, the use of a larger number of weighing hoppers 5 undesirably increases not only the cost but also the size of the weighing machine.

In the combination weighing machine shown in FIG. 36, articles in one weighing hopper 5 or articles in one memory hopper 8 beneath the weighing hopper 5 are selected for combination, the articles in the weighing hopper 5 are discharged and the weighing hopper 5 becomes empty. Then, another articles are fed to the empty weighing hopper 5 for weighing. Accordingly, as long as articles in a weighing hopper 5 or in a memory hopper 8 beneath that weighing hopper 5 are not selected for combination and, therefore, not discharged, the weighing by that weighing hopper 5 is interrupted and, therefore, no further articles can be weighed. There are always a plural number of such weighing hoppers 5 that discontinue weighing during the operation of the combination weighing machine. Thus, the efficiency of the plural weighing hoppers 5 as a whole is undesirably low.

Another problem in the combination weighing machine shown in FIG. 36 is that since articles selected for combination are discharged from the weighing hoppers 5 or the memory hoppers 8 and transported along the inner walls of the individual chutes 9 and the inner walls of the collecting chute 10 to the packaging machine 12, it will take a relatively long time for the articles, in particular, sticky or adhesive articles to move along the path 13, and, hence, it will take a long time for the weighed articles to be packaged in the packaging machine 12.

One object of the present invention is to provide a combination weighing machine which can combination-weigh adhesive or sticky articles with an improved weighing precision, which can provide improved operating efficiency for weighing hoppers, and which has improved weighing speed. Another object is to provide a compact combination weighing machine which has a relatively small size.

DISCLOSURE OF INVENTION

A combination weighing method according to a first invention comprises the steps of: putting an article into each article holding means; measuring, by weighing means, the sum weight of each article holding means and said article in said article holding means, or the weight of said article while said article is held in said article holding means; feeding out said article holding means containing articles of which weights have been measured by said weighing means, and causing said article holding means to wait; combining by combination computing means, weight values developed by the measurement by said weighing means in various ways, and selecting articles forming a combination of articles the sum weight of which is within a predetermined weight range; and conveying said article holding means containing said articles which form said combination selected by said combination computing means to a discharge position where the articles forming said selected combination are discharged.

A combination weighing machine according to a second invention comprises: a plurality of article holding means into which articles are put; weighing means for measuring the sum weights of said article holding means and said articles in said article holding means, or measuring the weights of said articles while said articles are held in said article holding means; waiting means for receiving from said weighing means and causing to wait a plurality of said article holding means containing articles of which weights have been measured by said weighing mean; combination computing means for combining respective weight values developed by the measurement by said weighing means in various ways, and selecting articles forming a combination of articles the sum weight of which is within a predetermined weight range; and transfer means for conveying said article holding means containing said articles which form said combination selected by said combination computing means to a discharge position where the articles forming said selected combination are discharged.

A combination weighing machine according to a third invention is the combination weighing machine of the second invention in which a predetermined number, two or greater, of said weighing means are provided; said combination computing means selects a combination of articles equal in number to said weighing means; and each time said predetermined number of article holding means containing the articles forming said selected combination are fed out from said waiting means, the same number of article holding means containing articles of which weights have been measured by said weighing means are fed to said waiting means.

A combination weighing machine according to a fourth invention is the combination weighing machine of the second invention which further comprises: deviation preventing means for arranging said article holding means in a row on said waiting means and preventing said article holding means from deviating out of said waiting means; and removing means for removing said article holding means containing the articles forming the combination selected by said combination computing means, from said waiting means onto said transfer means.

A combination weighing machine according to a fifth invention comprises: a plurality of article holding means into which articles are put; weighing means for measuring the sum weights of said article holding means and said articles in said article holding means, or measuring the weights of said articles while said articles are held in said article holding means; waiting means for causing a plurality of said article holding means containing articles of which weights have been measured by said weighing means, to wait in a row with said article holding means contacting adjacent ones; combination computing means for combining respective weight values developed by the measurement by said weighing means in various ways, and selecting articles forming a combination of articles the sum weight of which is within a predetermined weight range; removing means for removing from said waiting means said article holding means containing the articles forming the combination selected by said combination computing means; and transfer means for conveying said article holding means removed by said removing means to a discharge position where the articles forming said selected combination are discharged.

A combination weighing machine according to a sixth invention comprises: a plurality of article holding means into which articles are put; feeding means for alternately moving and stopping respective article holding means which are held in contact with preceding and succeeding ones, to thereby convey said respective article holding means in the forward direction; second weighing means having a table disposed in a succeeding stage of said feeding means, for measuring the sum weights of said article holding means and said articles contained in said article holding means disposed on said table, or measuring the weights of said articles while said articles are held in said article holding means; combination computing means for combining respective weight values developed by the measurement by said second weighing means in various ways, and selecting articles forming a combination of articles the sum weight of which is within a predetermined weight range; and transfer means for conveying said article holding means containing the articles forming the combination selected by said combination computing means to a discharge position where the articles forming said selected combination are discharged; said combination weighing machine further comprising second elevator means including a second elevator which is driven to move between an elevated position and a lowered position, said second elevator, while in said elevated position, being capable of receiving said article holding means conveyed by said feeding means, said article holding means being moved away from the succeeding article holding means on said feeding means while said second elevator is moving to said lowered position, whereby said article holding means on said second elevator is transferred onto said table.

A combination weighing machine according to a seventh invention comprises: a plurality of article holding means into which articles are put; weighing means for measuring the sum weights of said article holding means and said articles in said article holding means, or measuring the weights of said articles while said articles are held in said article holding means; waiting means for receiving from said weighing means a plurality of said article holding means containing articles of which weights have been measured by said weighing means, and causing the received article holding means to wait; combination computing means for combining respective weight values developed by the measurement by said weighing means in various ways, and selecting articles forming a combination of articles the sum weight of which is within a predetermined weight range; and discharge means for conveying the articles forming the combination selected by said combination computing means to a discharge position for discharging; wherein said discharge means includes a lift conveyor for conveying upward said article holding means containing articles arranged in a plurality of lateral rows, and for turning upside down said article holding means arranged in rows at the top of said lift conveyor and causing said upside-down article holding means to fall onto a receiving frame, whereby articles contained in said respective article holding means are discharged through the inside of said receiving frame.

A combination weighing method according to an eighth invention comprises the steps of: putting an article into each article holding means; measuring, by weighing means, the sum weight of each article holding means and said article in said article holding means, or the weight of said article while said article is held in said article holding means; causing to wait said article holding means containing articles of which weights have been measured by said weighing means; combining, by combination computing means, weight values developed by the measurement by said weighing means in various ways, and selecting articles forming a combination of articles the sum weight of which is within a predetermined weight range; conveying said article holding means containing said articles which form said combination selected by said combination computing means to a predetermined discharge position; and discharging articles from respective article holding means conveyed to said discharge position.

A combination weighing machine according to a ninth invention comprises: a plurality of article holding means into which articles are put; weighing means for measuring the sum weights of said article holding means and said articles in said article holding means, or measuring the weights of said articles while said articles are held in said article holding means; waiting means for receiving from said weighing means and causing to wait a plurality of said article holding means containing articles of which weights have been measured by said weighing means; combination computing means for combining respective weight values developed by the measurement by said weighing means in various ways, and selecting articles forming a combination of articles the sum weight of which is within a predetermined weight range; transfer means for conveying said article holding means containing said articles which form said combination selected by said combination computing means to a predetermined discharge position; and discharge means for discharging articles from respective article holding means conveyed to said discharge position.

A combination weighing machine according to a tenth invention is the combination weighing machine of the ninth invention in which a predetermined number, two or greater, of said weighing means are provided; said combination computing means selects a combination of articles equal in number to said weighing means; and each time said predetermined number of article holding means containing the articles forming said selected combination are fed out from said waiting means, the same number of article holding means containing articles of which weights have been measured by said weighing means are fed to said waiting means.

A combination weighing method according to an eleventh invention comprises the steps of: putting an article into each article holding means; measuring, by weighing means, the sum weight of each article holding means and said article in said article holding means, or the weight of said article while said article is held in said article holding means; combining, by combination computing means, weight values developed by the measurement by said weighing means in various ways, and selecting articles forming a combination of articles the sum weight of which is within a predetermined weight range; conveying said article holding means containing said articles which form said combination selected by said combination computing means to a discharge position where the articles which form said combination selected by said combination computing means are discharged.

A combination weighing machine according to a twelfth invention comprises a plurality of article holding means into which articles are put; weighing means for weighing the sum weight of each article holding means and said article in that article holding means, or measuring the weight of that article while that article is held in that article holding means; combination computing means for combining weight values developed by the measurement by said weighing means in various ways, and selecting articles forming a combination of articles the sum weight of which is within a predetermined weight range; and conveying means for conveying said article holding means containing said articles which form said combination selected by said combination computing means to a discharge position where the articles which form said combination selected by said combination computing means are discharged.

A weighing machine according to a thirteenth invention comprises: receiving means for receiving an article to be weighed; forwarding means for forwarding article to be weighed received by said receiving means onto a first elevator; first weighing means having a table for weighing said article to be weighed disposed on said table; first elevator means including a first elevator which is driven to move between an elevated position and a lowered position, said first elevator, while in said elevated position, being capable of receiving said article to be weighed forwarded by said forwarding means, said first elevator moving said article to be weighed on said first elevator toward said receiving means while said first elevator is moving to said lowered position, whereby said article to be weighed on said first elevator is transferred onto said table, being kept out of contact from an article to be weighed disposed on the undermentioned stage and from an article on said receiving means; and a stage disposed to succeed said first elevator means, for receiving successive ones of articles to be weighed on said first elevator successively forwarded by said forwarding means, said received articles to be weighed being transferred on said stage, being in contact with preceding and succeeding ones of said articles to be weighed.

A weighing machine according to a fourteenth invention is the weighing machine of the thirteenth invention which further includes zero-adjuster means for moving a zero point of the first weighing means for zero adjustment while the first elevator is in said elevated position.

A weighing machine according to a fifteenth invention comprises: feeding means for alternately moving and stopping articles to be weighed, while being held in contact with preceding and succeeding ones of said article holding means, to thereby convey said respective articles to be weighed in the forward direction; second weighing means having a table disposed in a succeeding stage of said feeding means, for measuring the weights of articles to be weighed disposed on said table; discharge means for discharging weighed articles weighed by said second weighing means; and second elevator means including second and third elevators driven in synchronization with each other between respective elevated positions and respective lowered positions, said second elevator in its elevated position being capable of receiving article to be weighed conveyed by said feeding means, said second elevator moving an article to be weighed on said second elevator away from the succeeding article to be weighed on said feeding means while said second elevator is moving toward its lowered position, whereby an article to be weighed on said second elevator can be transferred onto said table, said third elevator in its elevated position being capable of receiving said weighed articles on said second elevator as forwarded by said feeding means, said third elevator being capable of moving the weighed article on said third elevator away from the weighed article on said second elevator while said third elevator is moving to its lowered position and also transferring said weighed article onto said discharge means.

A weighing machine according to a sixteenth invention is the weighing machine of the fifteenth invention which further includes zero-adjuster means for moving a zero point of the second weighing means for zero adjustment while the second elevator is in said elevated position.

A weighing machine according to a seventeenth invention is the weighing machine of the sixth invention which further includes zero-adjuster means for moving a zero point of the second weighing means for zero adjustment while the second elevator is in said elevated position.

A weighing machine according to an eighteenth invention comprises: receiving means for receiving empty article holding means; forwarding means for forwarding article holding means received by said receiving means onto a first elevator; first weighing means having a table for weighing said empty article holding means disposed on said table; first elevator means including a first elevator which is driven to move between an elevated position and a lowered position, said first elevator in said elevated position being capable of receiving said article holding means forwarded by said forwarding means, said first elevator moving said article holding means on said first elevator toward said receiving means while said first elevator is moving to said lowered position, whereby said article holding means on said first elevator is transferred onto said table, being kept out of contact from article holding means disposed on the undermentioned supplying stage and from article holding means on said receiving means; a supplying stage disposed to succeed said first elevator means, for receiving successive ones of article holding means on said first elevator successively forwarded by said forwarding means, said received article holding means being transferred on said supplying stage, being in contact with preceding and succeeding ones of said articles to be weighed, articles to be weighed being put into said respective article holding means while said article holding means are being transferred on said supplying stage; and second weighing means disposed in a stage succeeding said supplying stage, for receiving said article holding means with articles to be weighed put therein successively forwarded by said forwarding means, said second weighing means weighing the sum weight of said article holding means and article put in said article holding means.

BRIEF DESCRIPTION OF DRAWINGS

FIG. 20($a$) is an enlarged plan view of the first elevator of the weighing machine of the second embodiment, FIG. 20($b$) is an enlarged, front elevational view of the first elevator, FIG. 20($c$) is an enlarged left-side view of the first elevator, and FIG. 20($d$) is an enlarged right-side view of the first elevator.

FIG. 21($a$) is an enlarged plan view of the second and third elevators of the weighing machine of the second embodiment, FIG. 21($b$) is an enlarged, front elevational view of the second and third elevators, and FIG. 21($c$) is an enlarged right-side view of the second and third elevators.

FIG. 33 is an enlarged side view of the roller conveyor used in the combination weighing machine of the fifth embodiment.

FIGS. 34(a), 34(b) and 34(c) are enlarged plan views of various examples of stop.

FIG. 35 is an enlarged, front elevational view of a belt conveyor used in a combination weighing machine according to a sixth embodiment of the present invention.

BEST MODE FOR CARRYING OUT THE INVENTION

For the details, the present invention is described with reference to the accompanying drawings.

Figure 1:
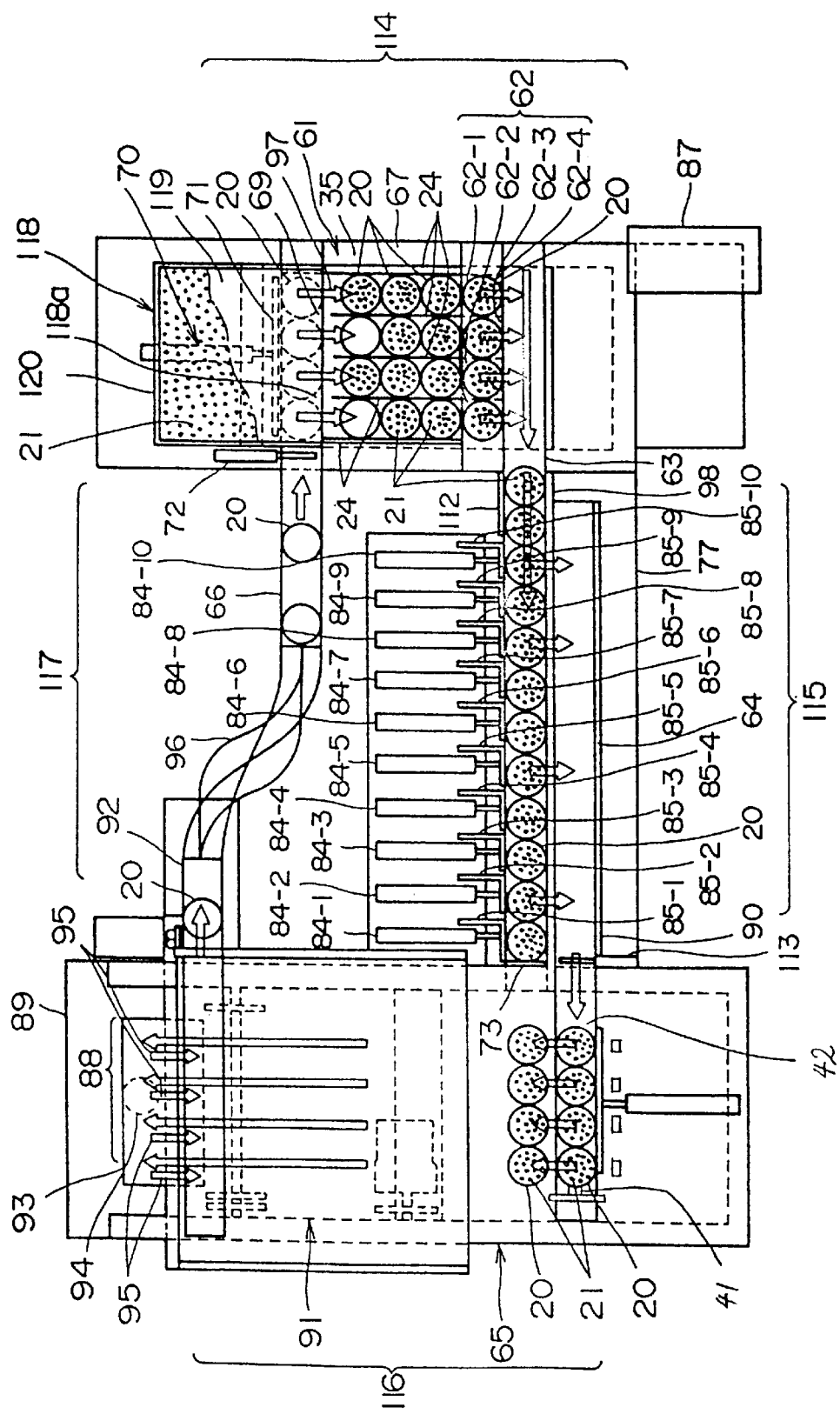
FIG. 1 is a plan view of a combination weighing machine according to a first embodiment of the present invention.

A combination weighing machine according to each of first, second and third embodiments of the present invention includes, as shown in FIG. 1, a supplying stage 61 in which an operator supplies articles 21 to empty, short-cylindrical cups having a bottom, four weighers 62 (62-1, 62-2, 62-3, 62-4), a retention conveyor 63, a transfer conveyor 64, a discharge unit 65, and a transport conveyor 66. The supplying stage 61, the four weighers 62 (62-1, 62-2, 62-3, 62-4) etc. are arranged to transport a plurality of cups (i.e. article holding means) 20 in the clockwise direction on the weighing machine as indicated by arrows in FIG. 1. In this weighing machine, an operator supplies to cups 20 (i.e. fill the cups 20) by hand adhesive or sticky articles 21 to be weighed, for example, cut vegetables, pickles, lumps of roe or the like while cups 20 are moving on the supplying stage 61, the weights of the respective articles 21 are measured by the weighers 62, a combination of weighed articles 21 the sum of which is within a predetermined weight range is selected, and the cups 20 containing the articles of the selected combination are transferred to the discharge unit 65. The discharge unit 65 transports the cups 20 containing the articles of the selected combinations to a predetermined discharge station 88 where the cups 20 are turned upside down to discharge the articles from the cups 20.

In this way, combinations of articles having total weights within the predetermined weight range are weighed. Emptied cups 20 are conveyed by a conveyor 92 through a cup turning unit 96, where cups are turned again so that inlet openings face upward, to the transport conveyor 66. Then, the transport conveyor 66 conveys empty cups 20 to the supplying stage 61, where the operator supplies the articles into the empty cups 20 again in a similar manner, for weighing. It should be noted that cups 20 are formed to have the same weight.

Now, the first embodiment is described.

As shown in FIG. 1, the supplying stage 61 includes a fixed platform (grate grate-like platform) 67 which can hold four rows of cups 20 with each row including three cups aligned in the forward direction.

Figure 3:
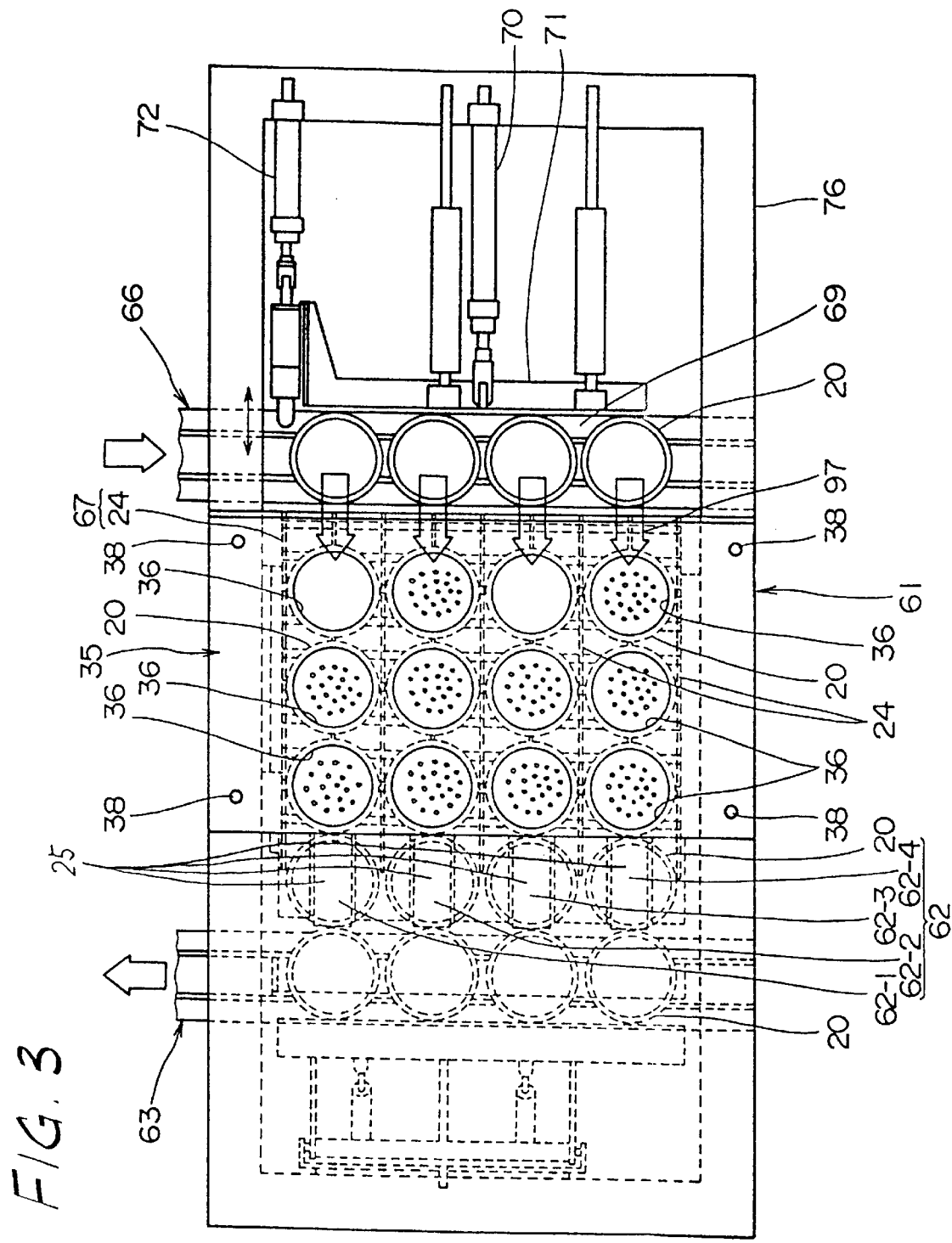
FIG. 3 is an enlarged plan view of a supplying and weighing stage of the first embodiment.
Figure 4:
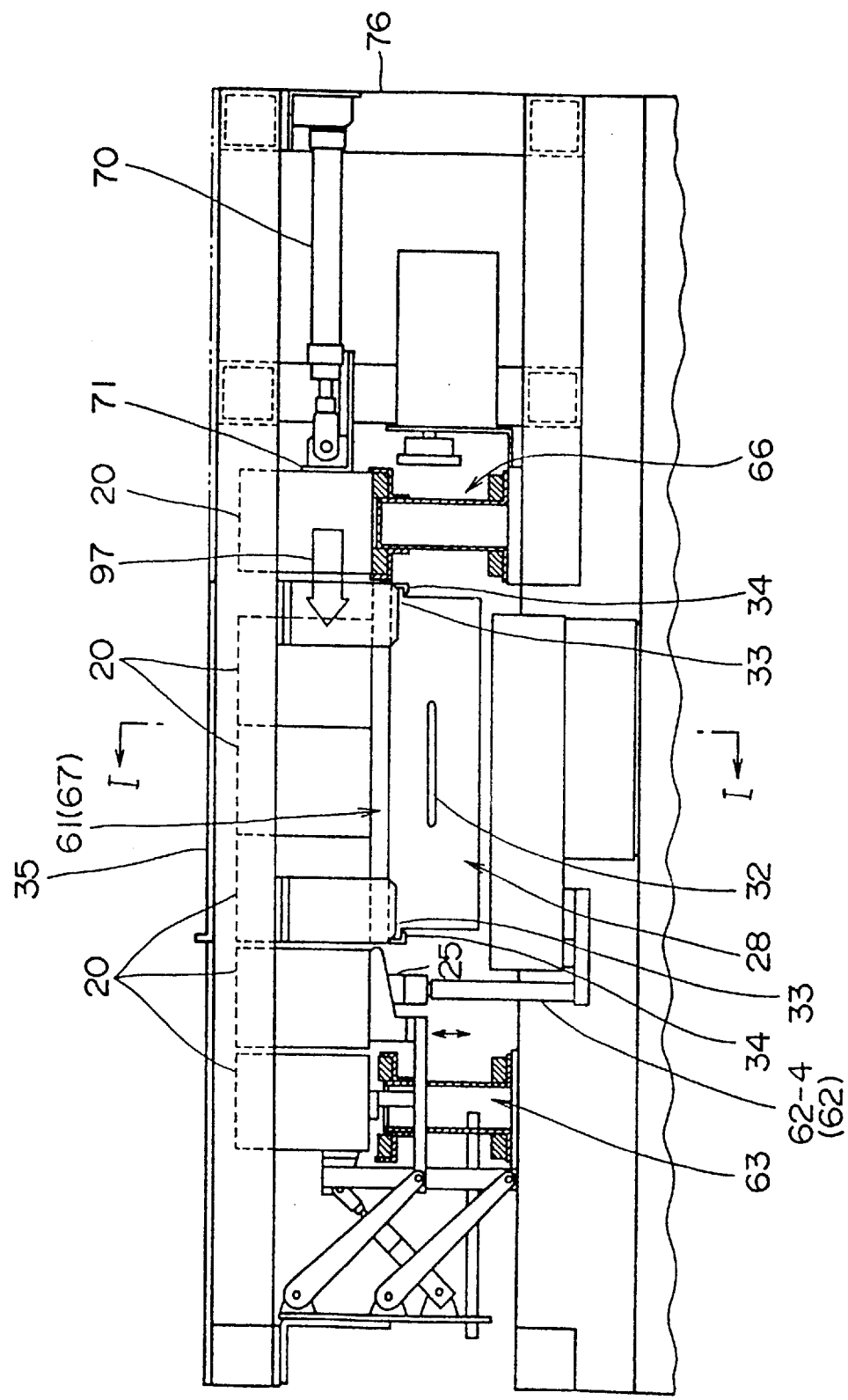
FIG. 4 is a side view of the supplying and weighing stage shown in FIG. 3.
Figure 5:
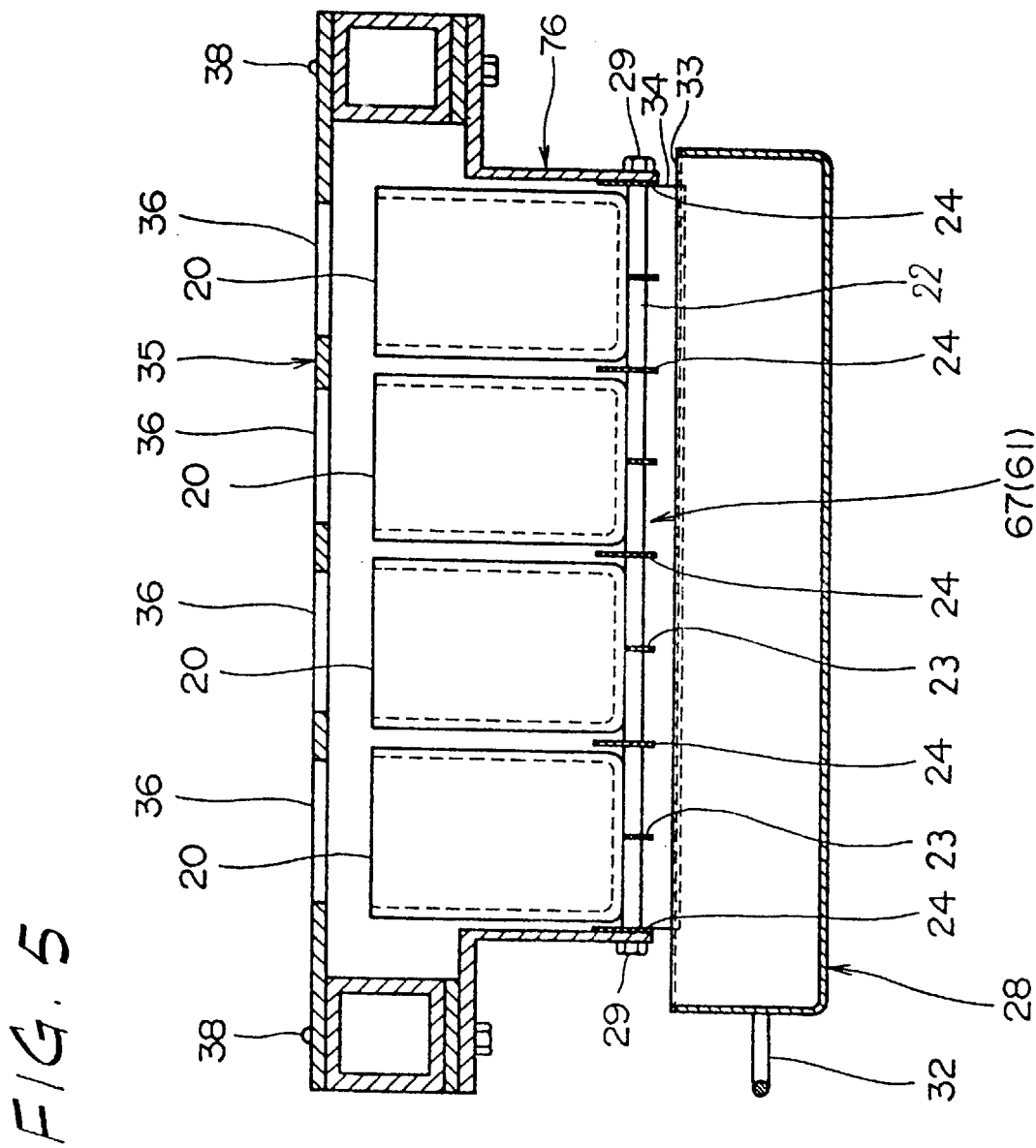
FIG. 5 is a cross-sectional view of the supplying and weighing stage of the first embodiment along a line I—I in FIG. 4.
Figure 6A:
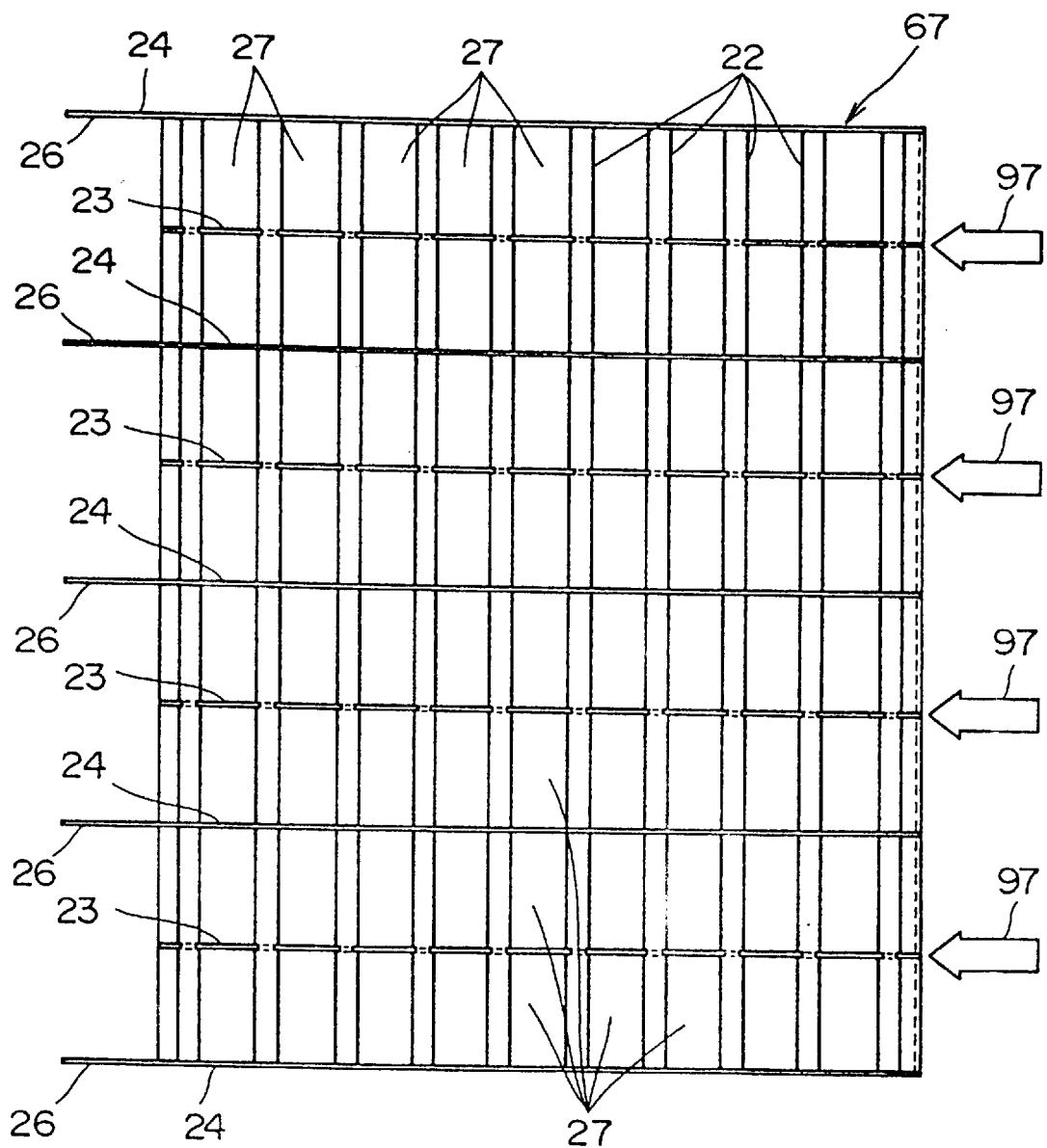
FIG. 6($a$) is an enlarged plan view of a fixed platform of the first embodiment, and FIG. 6($b$) is an elevational view of the fixed platform.
Figure 6B:
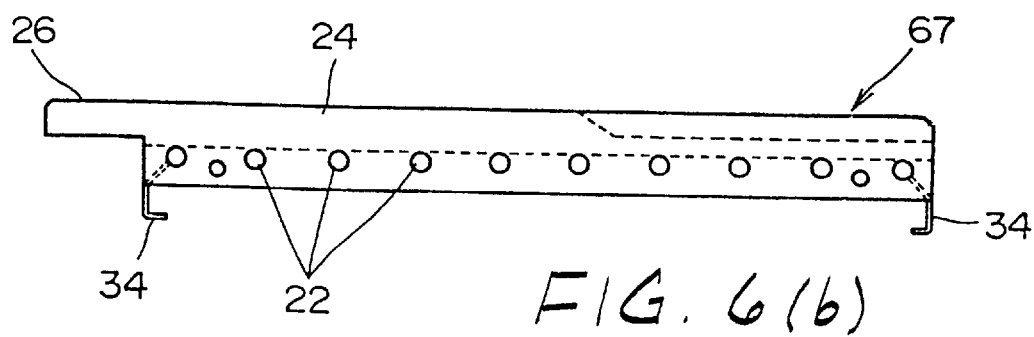
Figure 7:
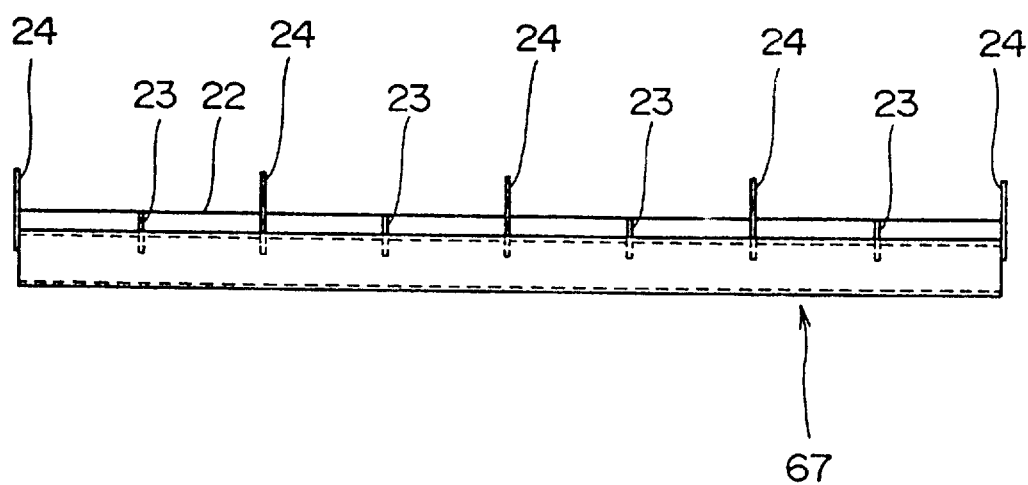
FIG. 7 is a side view of the fixed platform shown in FIG. 6.

The fixed platform 67 has a generally rectangular plan and includes ten rod-like members 22 having a circular cross-section, as shown in FIG. 6. The ten rod-like members 22 are arranged to extend in the direction perpendicular to the moving direction 97 of cups 20, and are spaced from each other. The rod-like members 22 are connected with each other by five guides 24 and four crosspieces 23, as shown in FIGS. 6 and 7. The guides 24 serve to prevent cups 20 in a row from entering into adjacent rows or from moving out of the supplying stage 61, and extend in parallel with the moving direction 97. The spacing between adjacent ones of the guides 24 is slightly larger than the diameter of cups 20. When the fixed platform 67 is mounted to a frame body 76 of the combination weighing machine, one end of each of the five guides 24 project above article rests 25 of the weighers 62. The projecting ends of the guides 24, i.e. the projections 26, serve to prevent cups 20 on the article rests 25 from contacting with adjacent ones to thereby prevent weighing error which would otherwise be caused by cups 20 contacting with each other. As shown in FIG. 7, the crosspieces 23 have their upper edges located below the level of the upper edges of the rod-like members 22 so that the crosspieces 23 do not interfere with the movement of cups 20. As described, the fixed platform 67 provides the supplying stage 61, and the ten rod-like members 22, the five guides 24 and the four crosspieces 23 which together form the fixed platform 67 define a plurality of through-holes 27 (see FIG. 6(a)). Articles 21 which fail to be put into cups 20 drop through the through-holes 27 and are received by a receiving dish 28 beneath the fixed platform 67. FIG. 3 is an enlarged plan view showing the supplying stage 67 etc., FIG. 4 is an enlarged side elevational view of the supplying stage 61 etc., and FIG. 5 is an enlarged cross-sectional view of the supplying stage 61 along a line perpendicular to the moving direction of cups 20. As shown in FIG. 5, the fixed platform 67 is fixed to the frame body 76 of the weighing machine by bolts 29.

Figure 9A:
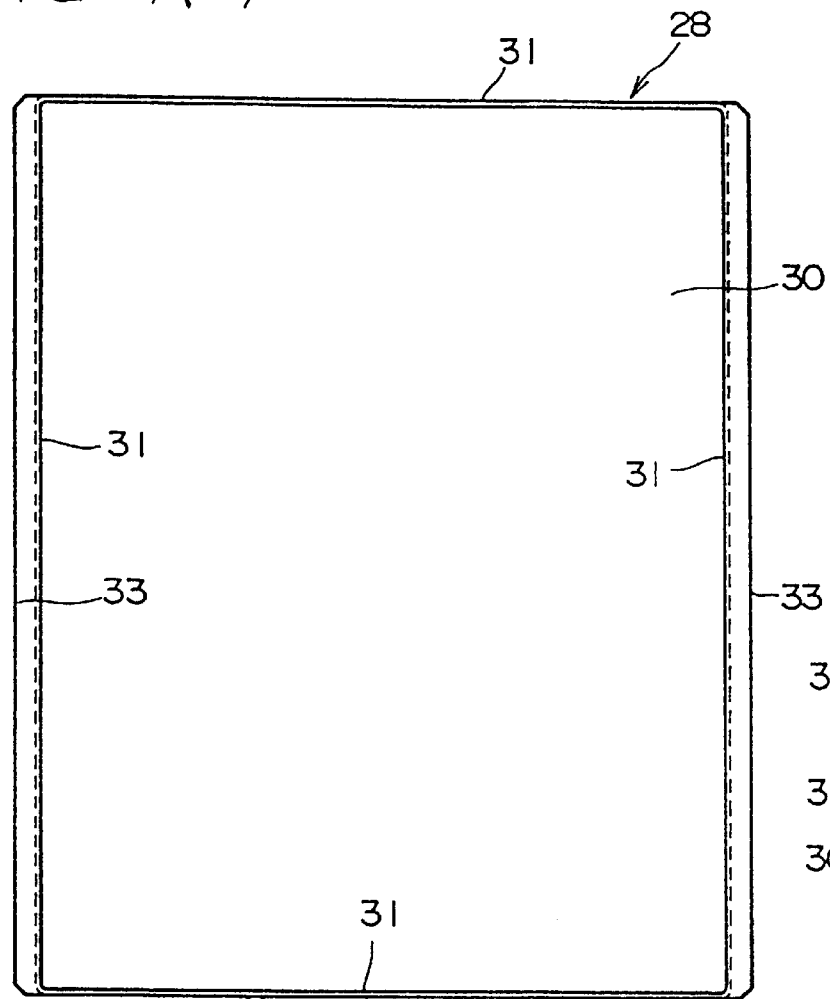
FIG. 9($a$) is an enlarged plan view of a receiving dish of the first embodiment, FIG. 9($b$) is an enlarged front elevational view of the dish, and FIG. 9($c$) is an enlarged side view of the dish.
Figure 9B:
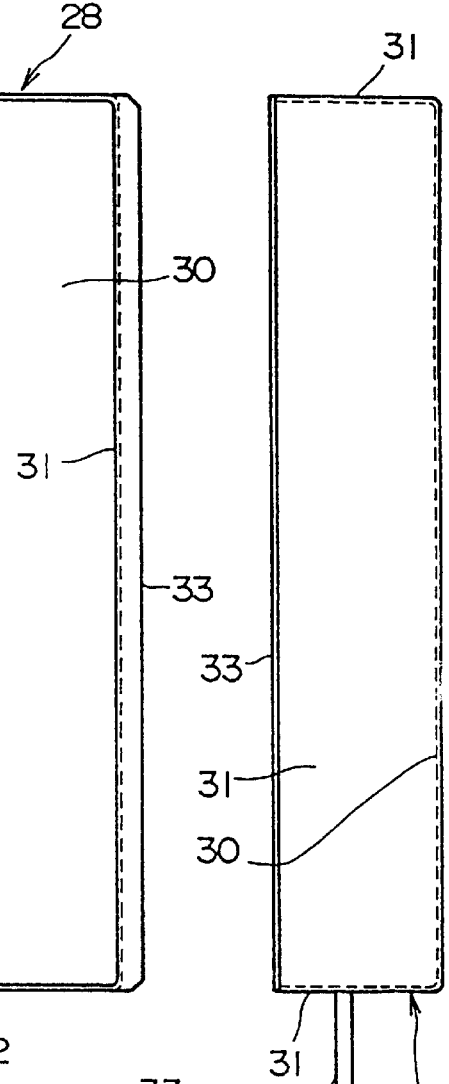
Figure 9C:
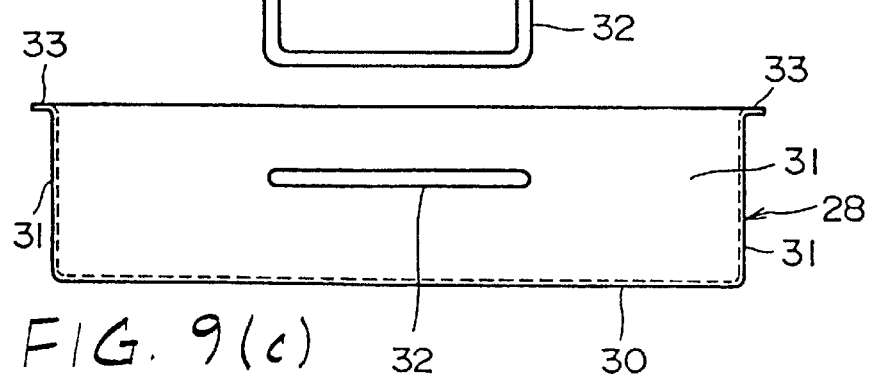

As shown in FIG. 9, the dish 28 is formed of a rectangular bottom plate 30 having substantially the same size as the fixed platform 67 when viewed in plan, four side-plates 31 disposed along the four sides of the bottom plate 30, a handle 32 disposed on one side-plate 31, and flanges 33 disposed along the top edges of the two side-plates 31 on opposite sides of the handle 32. The dish 28 is removably disposed on the fixed platform 67. When the dish 28 is placed on the fixed platform 67, it is held horizontal, and the flanges 33 are brought onto left and right rails 34 provided along the left and right lower edges of the fixed platform 67 shown in FIG. 6(b) and pushed along the rails 34. FIGS. 3–5 show the dish 28 mounted on the fixed platform 67. In this state, the dish 28 can receive articles 21 which drop through a plurality of through-holes 27 in the fixed platform 67.

As shown in FIGS. 1, 3 and 4, the terminal end 69 of the transport conveyor 66 is connected to the inlet port of the supplying stage 61. When four empty cups stay on the terminal end 69 and a predetermined supply signal is developed from a central processing unit (CPU) (not shown) provided for the combination weighing machine, an empty-cup pusher 70 comprising an air cylinder disposed in the proximity of the terminal end 69 stretches so that a pad 71 at the distal end of the empty-cup pusher 70 pushes out the four empty cups 20 on the terminal end 69 into the inlet port of the supplying stage 61. The four cups 20 fed onto the supplying stage 61 urge forward respective cups 20 in,front of them, so that not only the four cups at the forward ends of the rows on the supplying stage 61 are forwarded onto the corresponding four weighers 62-1, 62-2, 62-3, and 62-4, but also the four cups 20 on the weighers 62-1, 62-2, 62-3, and 62-4 are forwarded onto the retention conveyor 63. After that, the empty-cup pusher 70 retracts, and, therefore, another succeeeding set of four empty cups 20 can stay at the terminal end 69. A stop 72 is disposed at the entrance of the terminal end 69. The stop 72 comprises an air cylinder, and closes the entrance of the terminal end 69 of the conveyor 66 (i.e. extends as shown in FIG. 1) when four cups come to stay on the terminal end 69 so that no further cup 20 enters into the terminal end 69. When the cups 20 on the terminal end 69 are pushed onto the supplying stage 61 and the empty-cup pusher 70 retracts, the stop 72 opens (i.e. retracts as shown in FIG. 3) to permit cups 20 to pass into the terminal end 69.

The fixed platform 67, the empty-cup pusher 70, the terminal end 69 of the transport conveyor 66, and the stop 72 form aligning and transfer means.

Figure 8A:
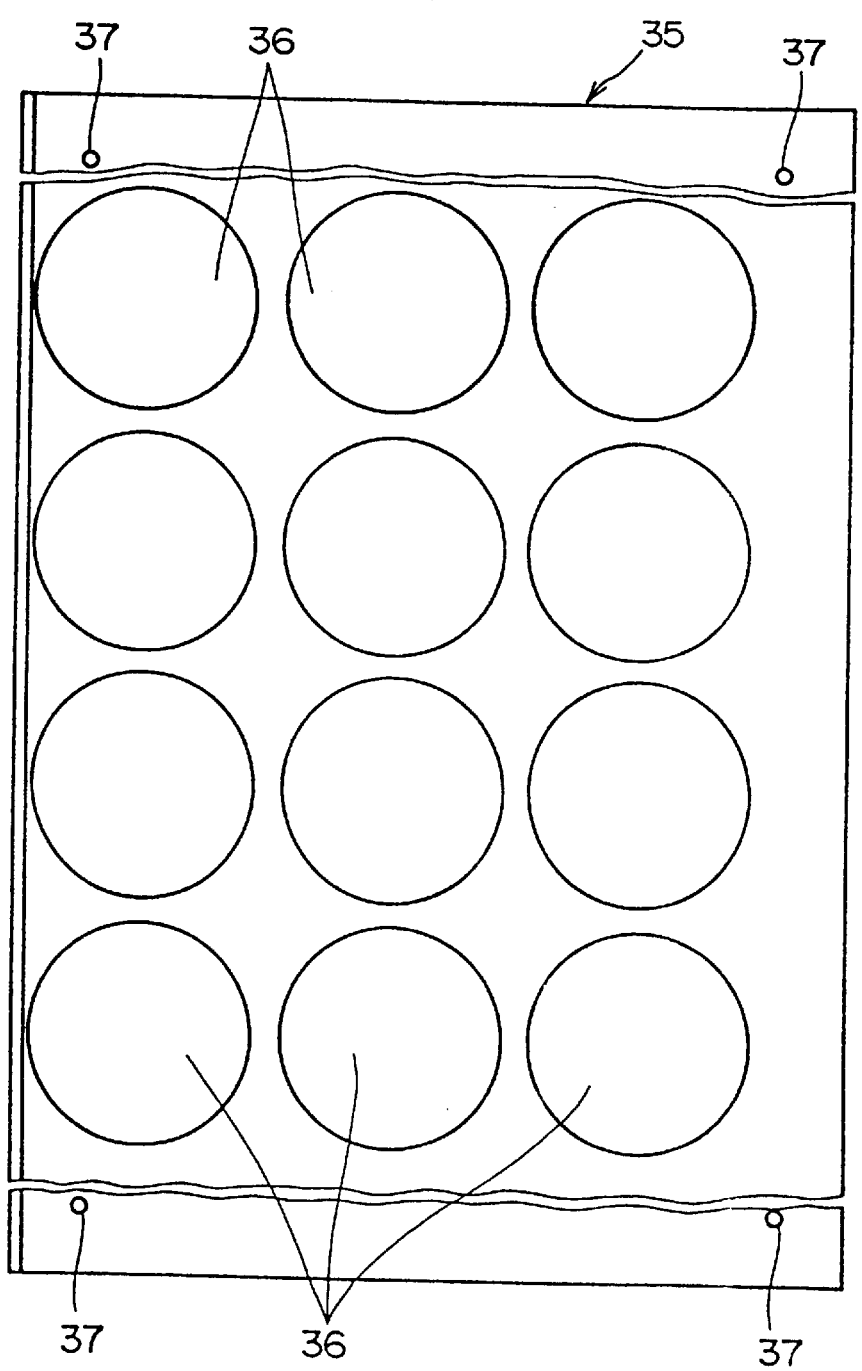
FIG. 8($a$) is an enlarged plan view of a supplying table of the first embodiment, FIG. 8($b$) is an enlarged front elevational view of the supplying table, and FIG. 8($c$) is an enlarged side view of the supplying table.
Figure 8B:
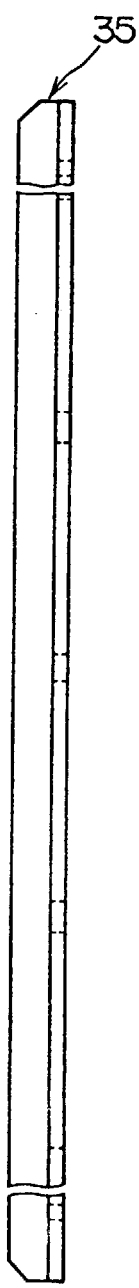
Figure 8C:

A reference numeral 35 in FIG. 3 denotes a supplying table. The supplying table 35 includes twelve circular article-supplying ports 36 of the same size. An operator puts articles 21 into the respective supplying ports 36 to supply them into twelve cups 20 staying on the fixed platform 67. The supplying table 35 is formed of a transparent plastic plate, and, as shown in FIG. 5, it is removably disposed on the frame body 76 of the weighing machine. For example, the table 35 can be positioned and fixed with respect to the frame body 76 by placing it in such a manner that four positioning pins 38 (see FIG. 5) projecting from the frame body 76 extend through four positioning holes 37 (see FIG. 8) in the supplying table 35. As shown in FIGS. 3 and 5, the supplying table 35 is so positioned on the frame body 76 that the twelve article-supplying ports 36 are located above the respective locations at which twelve cups 20 moved intermittently on the fixed platform 67 by the empty-cup pusher 70 (aligning and transfer means) stop. Each article-supplying port 36 is slightly smaller in size than the upper opening of cups 20. By virtue of the transparency of the table 35, an operator can know that cups are not moving before they put articles in the cups by hand.

A reference numeral 118 in FIG. 1 denotes a reservoir for reserving articles 21 to be weighed. The reservoir 118 may be of stainless steel, and it is attached removably to the weighing machine frame body 76 at a location above the empty-cup pusher 70 and the terminal end 69 of the transport conveyor 66. The reservoir 118 comprises a rectangular bottom plate 119 and side plates 120 attached to three sides of the bottom plate 119. No side plate is attached to the side, i.e. a outlet side 118a, of the bottom plate 119 facing the supplying the stage 61. Thus, the operator can easily take articles 21 on the reservoir 18 by hand for supplying them into cups 20.

With the above-described arrangement of the aligning and transfer means, as shown in FIG. 3, empty cups 20 fed to the supplying stage 61 are aligned in four rows along the moving direction 97 of cups 20 on the fixed platform 67, and the aligned, four rows of cups 20 are synchronously forwarded successively by alternately moving and stopping them. Because cups 20 are arranged in four rows on the fixed platform 67, the cup transfer speed can be reduced to a quarter of the speed required for transporting the same number of cups per unit time in one row. This enables the operator to time the putting of articles into cups, so that it is easier to put articles into cups by hand.

Next, how to put articles 21 into cups 20 being transferred by the alignment and transfer means is described. Cups 20 are intermittently moved on the fixed platform 67 of the supplying stage 61. An operator can see cups 20 through the transparent supplying table 35 to make it sure that cups stop moving before putting articles 21 through the article-supplying ports 36. The supplying table 35 is secured to the weighing machine frame body 76, and, therefore, the position of the article-supplying ports 36 does not change. Thus, by putting articles into the stationary article-supplying ports 36, the operators can put articles into respective cups 20. Thus, article supplying operation is simple and reliable.

Next, the shape of the combination weighing machine in plan is described. The shape of the combination weighing machine viewed in plan is generally rectangle as shown in FIG. 1. Along a first side of the rectangle (i.e. a side of the combination weighing machine in the right-side portion of the sheet of FIG. 1 laid on its side), the supplying stage 61 and the weighers 62 (i.e. supplying and weighing stage 114) are disposed. Along a second side (i.e. the bottom side of the combination weighing machine on the sheet of FIG. 1 laid on its side), the retention conveyor 63 and the transfer conveyor 64 (i.e. waiting and transfer stage 115) are disposed. Along a third side (i.e. the left-hand side of the combination weighing machine on the sheet of FIG. 1 laid on its side), the discharge unit 65 (i.e. turning and discharge stage 116) is disposed, and along a fourth side (i.e. the top side of the combination weighing machine on the sheet of FIG. 1 laid on its side), the forwarding,,conveyor 92, the cup turner 96 and the transport conveyor 66 (i.e. returning stage 117) are disposed.

With the above-described arrangement, the longitudinal or transverse length of the weighing machine can be relatively short. That is, the length of the supplying and weighing stage 114 and the length of the turning and discharging stage 116 measured in the direction along which cups 20 are conveyed can be approximately equal to each other, and the length of the waiting and transfer stage 115 and the length of the returning stage 117 measured in the direction along which cups 20 are conveyed can be approximately equal to each other, whereby the shape of the combination weighing machine in plan is generally rectangular. As a result, the area occupied by the combination weighing machine can be relatively small.

Next, the weighers 62, the retention conveyor 63, deviation retraining means, pushers 84, combination computing means, the transfer conveyor 64, the discharge unit 65 etc. are described in detail. The retention conveyor 63 broadly defining a waiting position or waiting station.

The four weighers 62 (broadly, weighing means) shown in FIG. 1 each include weight detectors, e.g. load cells. When a cup 20 with an article 21 put therein is sent from the supplying stage 61 onto the article rest 25 on each load cell, the weigher 62 can measure the sum of the weight of the cup 20 and the weight of the article 21 in the cup 20. A computation control section (not shown) of the combination weighing machine subtracts the known weight of the cup 20 (all the cups 20 having the same weight) from the sum weight to provide the weight of the article 21 in each cup 20. Then, the four cups 20 containing the articles 21 of which weights have been thus measured are fed onto the succeeding retention conveyor 63 when the number of the cups 20 on the retention conveyor 63 is eight or less. The length of the retention conveyor 63 is just for holding twelve cups 20 thereon, and, therefore, in order for the retention conveyor 63 to be able to receive four cups 20 which have been weighed, the number of cups 20 on the retention conveyor 63 must be eight (=12−4) or less. The number of weighers 62 is four in the illustrated embodiment, a number A other than four may be employed for the weighers. In such a case, the number of rows of cups 20 arranged on the supplying stage 61 is equal to the number A of the weighers 62. When the number of cups 20 on the succeeding retention conveyor 63 becomes equal to (12−A) or smaller, weighed cups.20 with articles therein are fed onto the retention conveyor 63.

Figure 10:
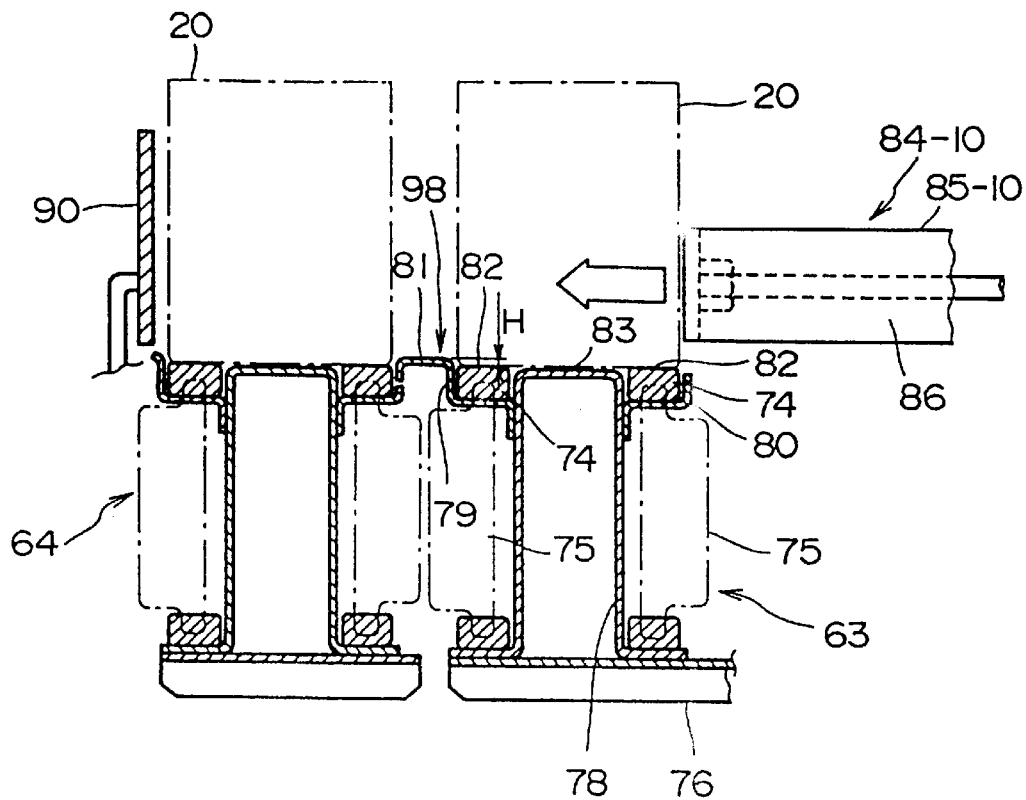
FIG. 10 is an enlarged longitudinal cross-sectional view of a retention conveyor and a transfer conveyor of the combination weighing machine of the first embodiment.

As shown in FIG. 1, the retention conveyor 63 is a straight conveyor which has its proximal end portion disposed sideward of the four weighers 62, and can receive and transport cups 20 discharged from the weighers 62 in the leftward direction in the sheet of the drawing. A stop 73 is disposed at the distal left end, which can stops cups 20. As shown in FIG. 10 which is a cross-sectional view, the retention conveyor 63 includes two looped plastic chains (top chains) 74, 74, and the loops are wrapped around sprockets 75, 75 at two opposed ends. (In FIG. 10, sprockets 75, 75 at the distal end of the conveyor are shown.) The sprockets 75 are connected with a rotation shaft of a motor (not shown) so that the rotation of the motor can drive two plastic chains 74, 74 in the predetermined direction. Although not shown, transport surfaces 82 of the plastic chains 74, 74 which contact with cups 20 are provided by plastic plates having small friction resistance.

A reference numeral 76 in FIG. 10 denotes the frame body of the combination weighing machine. The frame body 76 is fixed to a carriage 77 (see FIG. 1). A guide frame 78 having a U-shaped cross-section is disposed on the frame body 76. The guide frame 78 has a top surface 83 which is located at a level lower than the transport surfaces 82 of the plastic chains 74, as shown in FIG. 10. On the opposite side surfaces of the guide frame 78, retainers 79 and 80 for retaining the plastic chains 74 are provided. The retainer 79 shown in FIG. 10 on the left side surface of the guide frame 78 has an upper bend portion 98. The upper bend portion 98 has a top surface 81 which is about 3 mm above the transport surfaces 82 of the plastic chains 74.

Figure 11:
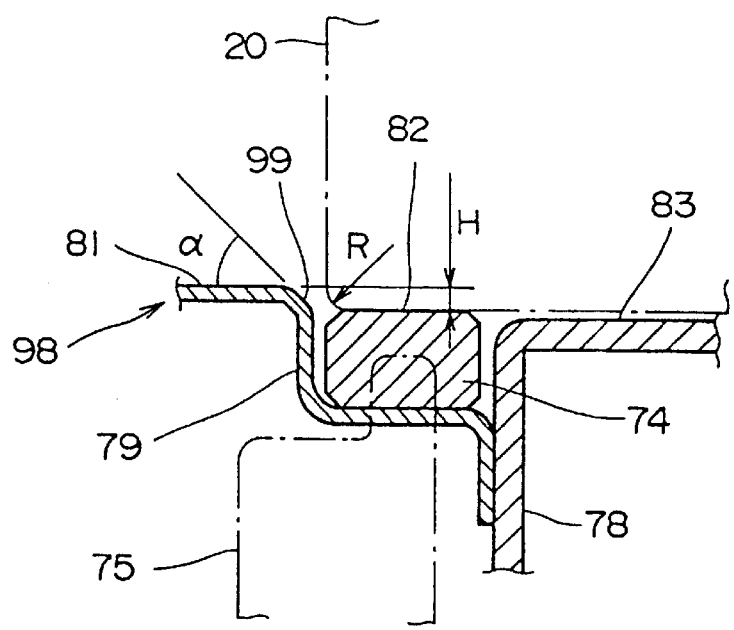
FIG. 11 is an enlarged, longitudinal cross-sectional view of deviation preventing means (an upper bend of a retainer) provided on the retention conveyor of the first embodiment.

The top surface 81 of the retainer 79 is higher by about 3 mm than the level of the transport surfaces 82 of the plastic chains 74, and the step height H (=about 3 mm) can restrain cups 20 on the retention conveyor 63 from deviating toward the transfer conveyor 64. For that purpose, the step height H must be determined, depending on the size and weight of cups 20, the radius of curvature (R) of the peripheral surface of the bottom portion of cups 20, and the weight of articles 21 put into cups 20. FIG. 11 is an enlarged cross-sectional view showing the step. In FIG. 11, "R" is equal to about 3 mm, and $\alpha$ is about 45°. Though the top surface 81 of the retainer 79 is provided with a beveled edge 99 having an angle $\alpha \approx 45°$ on its side facing the plastic chains 74, other angle of bevel may be employed. Alternatively, the edge 99 may be rounded. Further, though the radius of curvature R of the peripheral surface of cups 20 has been stated to be about 3 mm, other radius of curvature may be employed. What is important is that the step height H, the radius of curvature R, and the shape of the edge 99 should be such that when cups 20 are waiting in line on the retention conveyor 63, as shown in FIG. 1, cups 20 are restrained from deviating toward the transfer conveyor 64 and that when the pushers 84 extend, cups 20 can get over the top surface 81 (deviation restraining means) of the retainer 79 onto the transfer conveyor 64, while keeping the upright position.

On the right-hand side of the retention conveyor 63 in FIG. 10, the first through tenth pushers 84-1 through 84-10 are disposed. Pads 85-1 through 85-10 at the tip ends of respective piston rods of the respective pushers can restrain cups 20 on the retention conveyor 63 from moving into the pusher side. Specifically, the retention conveyor 63 is driven by the motor all the time, and cups 20 on the retention conveyor 63 are moved in the direction of the stop 73. With the foremost cup 20 abutting against the stop 73, the cups 20 after it successively push the preceeding ones in a line, and, therefore, they do not move there. However, since the retention conveyor 63 is driven all the time, cups 20 in a line on it tend to deviate leftward or rightward with respect to the moving direction of the retention conveyor 63. Because of the step H and the pads 85-1 through 85-10 restrain such cups 20 from deviation. As shown in FIG. 1, a guide 112 is disposed rearward of the rearmost pusher 85-10 to restrain any cups 20 from deviating from the course.

The first through tenth pushers 84-1 through 84-10 constitute means for selectively removing desired cups 20 on the retention conveyor 63 onto the transfer conveyor 64. Each of the first through tenth pushers 84-1 through 84-10 includes an air cylinder, as shown in FIG. 1, and is spaced from adjacent pushers by a distance equal to the diameter of cups 20. As shown in FIG. 1, the first through tenth pushers 84-1 through 84-10 correspond respectively to the foremost through tenth ones of twelve cups 20 arranged in a line on the retention conveyor 63. Each of the pads 85-1 through 85-10 of the pushers 84-1 through 84-10 is L-shaped in its plan. The L-shape is employed for the pad 85 because, when pushers are in their extended state, as represented by the second, fifth, eighth and tenth pushers 84-2, 84-5, 84-8 and 84-10 shown in FIG. 2, their retainer plates 86 can retain succeeding cups 20 following the cups removed by the pushers 84-2, 84-5, 84-8 and 84-10 in their current positions. After that, when the stretched pushers 84-2, 84-5, 84-8 and 84-10 retract, they can smoothly retract to the retracted position shown in FIG. 1, retaining the succeeding cups 20 in their retained positions. The stretched position of the pushers 84 is a removing position, whereas the retracted position is a non-extracting position.

Next, how the combination computing means computes to prepare various combinations of weights of weighed articles 21, and how articles 21 selected for combination are removed from the retention conveyor 63, put onto the transfer conveyor 64 and transferred to the discharge unit 65 are described.

The combination computing means is not shown, but it includes computation control section (not shown) provided by a central processing unit (CPU), and predetermined programs stored in a storage section (not shown) connected to the computation control section. Specifically, the combination computing means is means for preparing various combinations of weights of articles 21 weighed by the respective weighers 62, and selecting articles providing a combination of weights which is within a predetermined range of weights and which meets a predetermined condition, e.g. a combination of weights which is equal to or closest to a desired, target weight. The cups 20 containing the selected combination of articles are broadly referred to as a selected combination of article holders.

The combination computation by the combination computing means starts when the number K of memories at which the combination computation is started, which is preset by an operator in a preset indication unit 87, is reached. The combination computation start memory number is a condition for making the combination computing means start computation. The condition is fulfilled when the number of cups 20 standing on the retention conveyor 63 (i.e. the number of weight values of weighed articles stored in a memory section) becomes, for example, K=9 or more. If the number of weight values stored in the memory section is less than nine, the combination computation is not done because probability of selecting a combination of weights which is within the predetermined weight range is small. Accordingly, the combination computation is carried out only when the number of stored weight values is nine or more so that probability of selecting a desired combination is higher. It should be noted that any number may be preset by an operator as the combination computation start memory number K through the preset indication unit 87, in accordance with the precision and speed of the combination weighing of the system. When the number of cups 20 waiting on the retention conveyor 63 becomes smaller than nine, four cups 20 with weighed articles therein are fed at a time from weighers 62 until the number of cups 20 on the retention conveyor 63 becomes nine or more, at which time the feeding of cups from the weighers 62 is interrupted.

Removing means for extracting cups 20 selected for combination from the retention conveyor 63 and moving them onto the transfer conveyor 64 is first through tenth pushers 84-1 through 84-10. Thus, cups 20 which can be extracted by means of the first through tenth pushers 84-1 through 84-10 are ones of the first ten cups 20 out of twelve cups 20 on the retention conveyor 63 shown in FIG. 1. Accordingly, weight values available for combination are weight values of the articles 21 put in these ten cups 20. The weight values of articles 21 in the eleventh and twelfth and succeeding cups 20 are not used in preparation of combinations of weights.

Transport means for transporting cups 20 removed by means of first through tenth pushers 84-1 through 84-10 shown in FIG. 1 to the discharge station 88 includes the transport conveyor 64 and the discharge unit 65.

Figure 2:
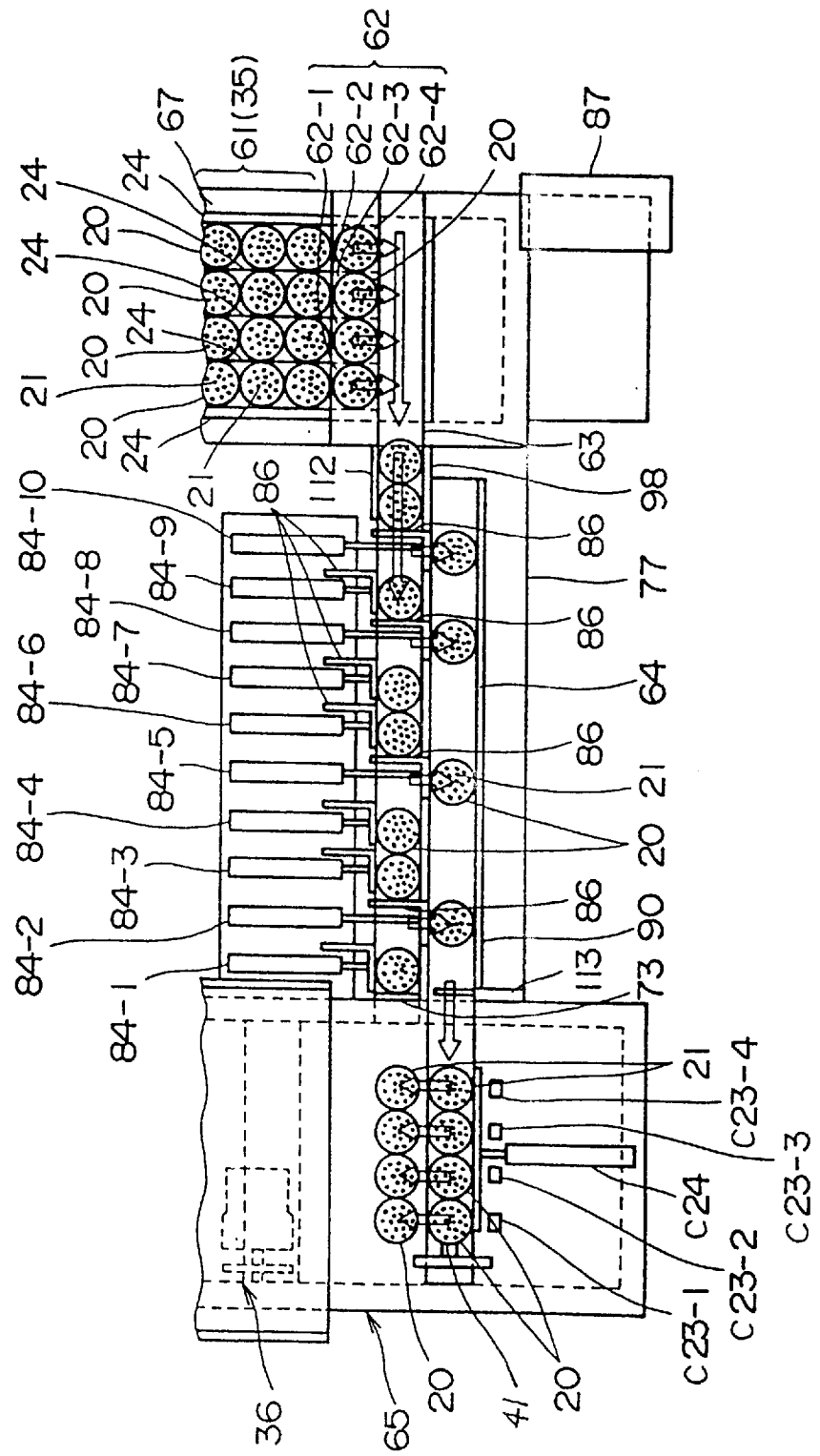
FIG. 2 is a plan view of the combination weighing machine according to the first embodiment illustrating how a pusher pushes out cups containing selected articles.

Now, let it be assumed that the combination computing means has selected, for example, the second article 21, the fifth article 21, the eighth article 21 and the tenth article 21, as shown in FIG. 2, as a desired combination of articles (i.e. weight values). Then, as shown in FIG. 2, the second, fifth, eighth and tenth pushers 84-2, 84-5, 84-8 and 84-10 are driven to stretch to thereby push the cups 20 with the second, fifth, eighth and tenth articles 21 put therein out of the retention conveyor 63. The pushed cups 20 move over the upper surface 81 of the retainer 79 or deviation restraining means, onto the transport conveyor 64 disposed adjacent to the retention conveyor 63. When the second, fifth, eighth and tenth pushers 84-2, 84-5, 84-8 and 84-10 are in the stretched state, the retainer plates 86 of the pads 85-2, 85-5, 85-8 and 85-10 of the respective pushers can retain, in position, cups 20 which are in the positions succeeding the positions of the extracted second, fifth, eighth and tenth cups 20. With this arrangement, the pads 85-2, 85-5, 85-8 and 85-10 do not catch the cups 20 in the succeeding positions when the stretched second, fifth, eighth and tenth pushers 84-2, 84-5, 84-8 and 84-10 are retracted, and, the second, fifth, eighth and tenth pushers 84-2, 84-5, 84-8 and 84-10 can smoothly return to their original positions.

The four cups, namely, the second, fifth, eighth and tenth cups 20 are transferred by the transfer conveyor 64 to the discharge unit 65. The articles 21 are removed from the second, fifth, eighth and tenth cups 20 transferred to the discharge unit 65, and a packaging apparatus 89 packs the removed articles 21. When the second, fifth, eighth and tenth pushers 84-2, 84-5, 84-8 and 84-10 are placed in their retracted state, the six cups 20 which contain the non-selected first, third, fourth, sixth, seventh and ninth articles 21 and the succeeding two cups 20 are conveyed forward by the retention conveyor 63. In addition, four cups 20 with weighed articles put therein are successively moved from the four weighers 62 onto the retention conveyor 63. These four cups 20 together with the eight cups 20 retained on the retention conveyor 63, i.e. twelve cups 20 containing weighed articles are moved until the foremost cup 20 abuts against the stop 73, as described above. The twelve cups 20 stay in a line on the retention conveyor 63, contacting and pushing adjacent ones. Then, the next combination computation is carried out.

If the number of articles (weight values) 21 selected in combination computation is four, only eight cups 20 remain on the retention conveyor 63, which is less than the combination computation start memory number K=9. The system is arranged such that in such a case, the system awaits succeeding cups with weighed articles put therein which are discharged onto the retention conveyor 63 from the four weighers 62 before it starts the next combination computation. For that purpose, the starting of the combination computation is deferred by a predetermined time (measured by a timer) after cups with weighed articles put therein are supplied onto the retention conveyor 63 from the weighers 62. While the system is waiting for the lapse of the predetermined time, weight values of respective articles which are to be combined with each other are stored in the memory section. However, if, for example, twelve cups 20 are staying on the retention conveyor 63 and if the number of articles (weight values) 21 selected in combination computation is three or less, there are nine cups 20 left on the retention conveyor 63, which meets the condition for starting the combination computation, i.e. the condition that the number of cups is greater than the combination computation start memory number K=9. In this case, no cups 20 containing weighed articles are supplied, from the weighers 62 onto the retention conveyor 63. Accordingly, the combination computation can be carried out before the next cups 20 are supplied from the weighers 62 to the retention conveyor 63.: The elimination of need for the waiting for the arrival of the next cups 20 with weighed articles put therein is realized by the arrangement that two cups, namely, the eleventh and twelfth cups 20 stand by as shown in FIG. 1 and the weight values of the articles in these two cups can be used in the combination computation. Two cups 20 are arranged to stand because, as described above, with such an arrangement, when three or less cups 20 containing weighed articles therein are discharged from the retention conveyor 63, the next combination computation can be carried out without need for waiting for the supply of new cups with weighed articles contained therein to the retention conveyor 63. This permits an increased number of combination computations per unit time to be carried out. The larger is the number of standing cups 20, the more times the combination computation can be performed without awaiting cups 20 with weighed articles put therein from the weighers 62. However, the larger is the number of standing cups 20, the larger is the length of the combination weighing machine. Therefore, the number of standing cups 20 should be determined, taking a desired length of the combination weighing machine into account.

As shown in FIG. 10, the transfer conveyor 64 is a plastic chain conveyor similar to the retention conveyor 63. On the left-hand side of the transfer conveyor 64, a guide 90 is disposed, which is used to prevent cups 20 pushed onto the transfer conveyor 64 from the retention conveyor 63 from falling from the transfer conveyor 64. The level of the transfer surface of the transfer conveyor 64 is substantially the same as that of the transfer surface 82 of the retention conveyor 63. Thus, the level of the transfer surface of the transfer conveyor 64 is about 3 mm (=H) below the top surface 81 of the upper bend portion 98 of the retainer 79. The end portion of the transfer conveyor 64 is connected to the discharge unit 65. As shown in FIG. 1, a stop cylinder 113 similar to the stop 72 is disposed at a portion of the transfer conveyor 64 at the entrance to the discharge unit 65. The stop cylinder 113 is switched between a stretched state and an retracted state with an appropriate timing, so that selected combinations of cups 20 each are successively fed into the discharge unit 65. When the stop cylinder 113 is stretched to thereby stop selected cups 20 on the transfer conveyor 64, the cups 20 are restrained from deviating out of the transfer conveyor 64 from both sides by the upper bend portion 98 of the retainer 79 and the guide 90, which permits the cups 20 to stand in line on the transfer conveyor 64.

Figure 12:
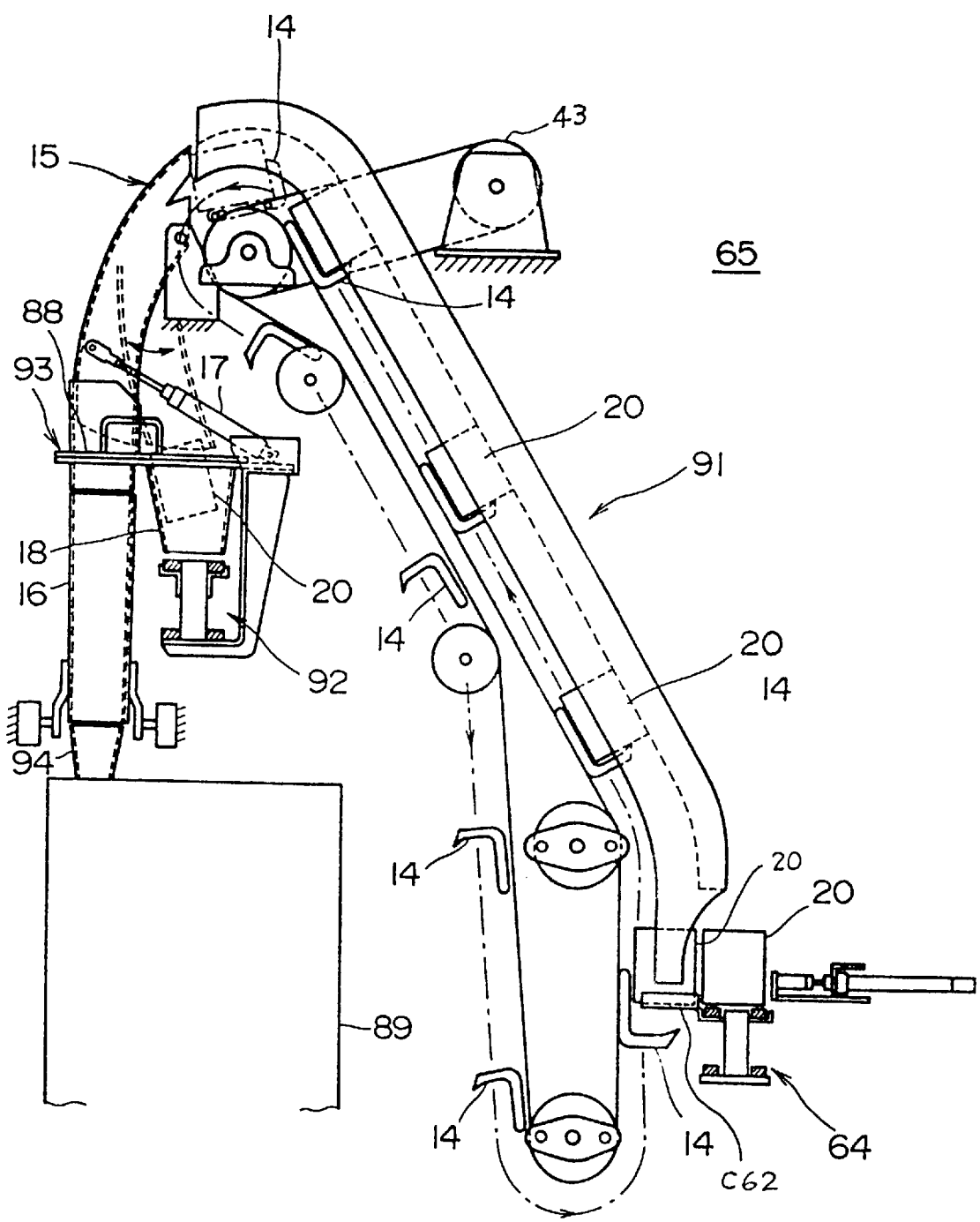
FIG. 12 is an enlarged side view of a discharge unit of the first embodiment.

Next, the discharge unit 65 is described. The discharge unit 65 includes a sloping conveyor 91 and a forwarding conveyor 92, as shown in FIGS. 1 and 12. The forwarding conveyor 92 is a plastic chain conveyor similar to the retention conveyor 63. The sloping conveyor 91 is a chain conveyor which includes a number of cup holders 14 arranged in rows, with four cups in each row, on a transfer surface thereof, and is driven by a servo motor 43. The sloping conveyor 91 is connected to the transfer conveyor 64 and receives cups 20 with weighed articles put therein selected for combination, in respective ones of four cup holders 14. Cups received in the cup holders 14 are conveyed slantwise upward, four cups being laterally arranged, and turned upside down at the top end of the sloping conveyor 91. Then, cups 20 fall out of the cup receivers 14 down into a positioning cylinder section 15 and stop at the discharge station 88 (e.g., a discharge position). Because cups 20 are upside down and are given impact due to falling down onto the discharge station 88, articles 21 are discharged from the cups 20 and pass through a funnel 16 disposed below a cup receiver plate 93 and through an inlet port 94 into a packaging apparatus 89. Four emptied cups 20 are sent toward the forwarding conveyor 92 (i.e. in a direction indicated by arrows 95 in FIG. 1) by the positioning cylinder section 15 which is driven by an air cylinder 17. Four emptied cups 20 are then sent through an outlet port (not shown) in the cup receiver plate 93 and through a chute 18 onto the forwarding conveyor 92, and conveyed by the forwarding conveyor 92. The cup turner 96 turns cups 20 by 180 degrees so that their inlet openings can face upward, and then cups 20 are sent onto the transport conveyor 66. The transport conveyor 66 conveys emptied cups 20 to its terminal end 69. When four empty cups 20 stay at the terminal end 69 and when the CPU applies a given feed signal, the empty cup pusher 70 is stretched and the pad 71 at the tip end of the pusher 70 pushes four empty cups 20 on the terminal end 69 into the entrance of the supplying stage 61. In this manner, cups 20 are circulated for continuous combination weighing of articles.

Cups 20 containing articles 21 selected for the combinations are successively conveyed to the discharge station 88 shown in FIG. 1, and the combinations of articles 21 in cups 20 are successively fed into the packaging apparatus 89. The packaging apparatus 89 reads the number of articles in each combination from memory means and packs articles in each combination in one pack. That is, the packaging apparatus 89 is arranged to package the number of articles, one, two, three, four, five, . . . , selected for each combination in one pack.

Figure 13:
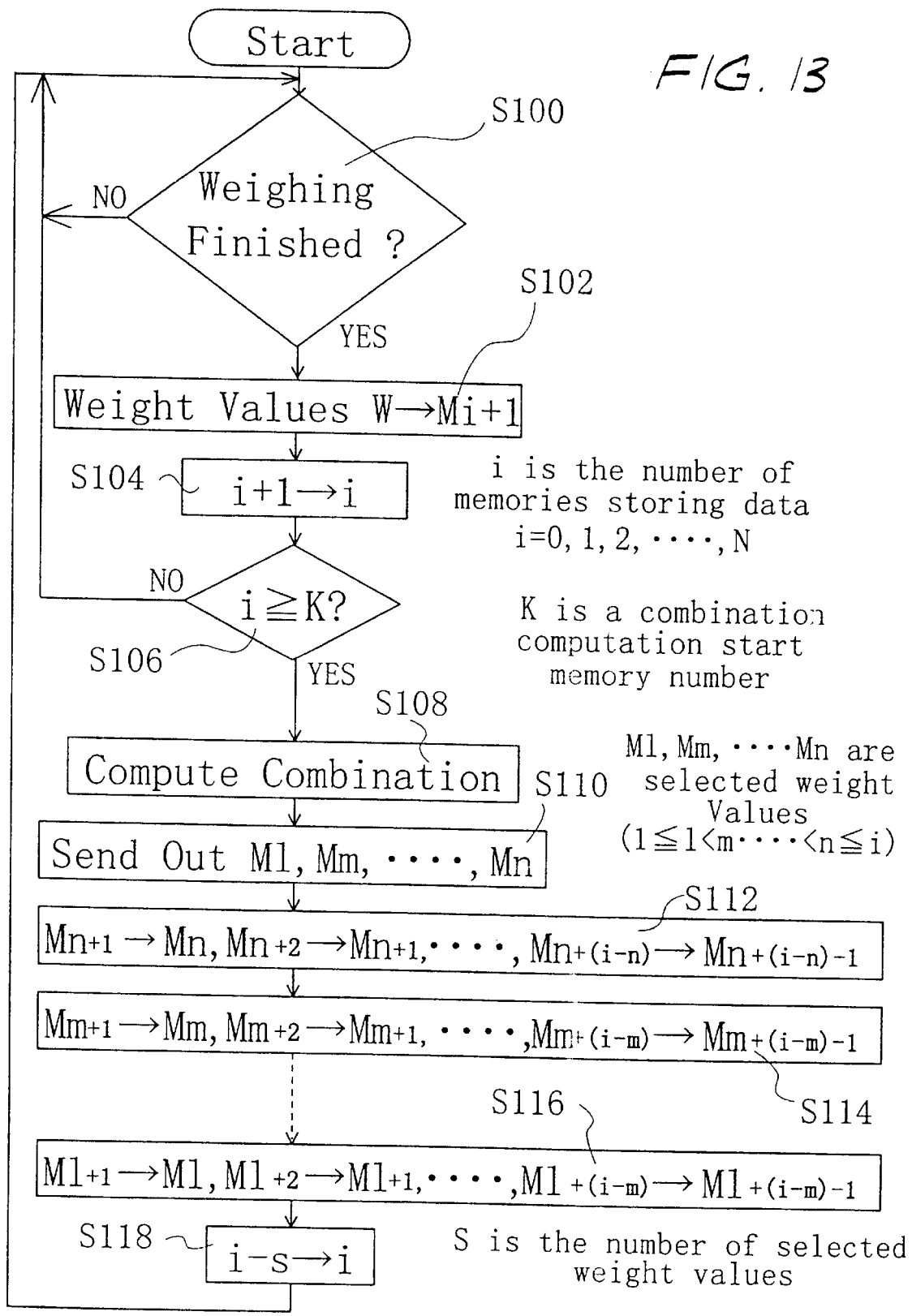
FIG. 13 is a flow chart showing operation of the combination weighing machine of the first embodiment.

Next, referring to FIG. 13, the process for storing weights measured for articles;is described. First, a cup 20 containing an article is weighed by a weigher 62 (S100), and the weight value of the weighed article is stored in the memory section (S102, S104). For example, weight values resulting from first, second, . . . , N-th weighing operations are stored in first, second, . . . , N-th memories, respectively. Whether the number of stored (memorized) weight values is K, e.g. nine (9) or not is judged (S106). If the number is less than nine, the combination computation is not done, and if the number is judged to be nine or greater, the combination computation is done (S108). Then, cups 20 containing articles of s weight values selected by combination computation ($M_l$, $M_m$, . . . , $M_n$) are sent out onto the transfer conveyor 64 (S110).

The ordinal numbers of non-selected articles left on the retention conveyor 63 change as they are conveyed forward successively, and, therefore, the ordinal numbers of the weight values stored in the memories must be altered. For that purpose, weight values stored in memories $M_{n+1}$, $M_{n+2}$, . . . , and $M_{n+(i-n)}$ are transferred to memories $M_n$, $M_{n+1}$, . . . , and $M_{n+(i-n)-1}$, respectively (S112). Further, weight values stored in memories $M_{m+1}$, $M_{m+2}$, . . . , and $M_{m+(i-m)}$ are transferred to memories $M_m$, $M_{m+1}$, . . . , and $M_{m+(i-m)-1}$, respectively (S114). Weight values stored in memories $M_{l+1}$, $M_{l+2}$, . . . , $M_{l+(i-l)}$ are transferred to memories $M_l$, $M_{l+1}$, . . . , and $M_{l+(i-l)-1}$, respectively (S116). In this case, $1 \leq <m< . . . <n \leq i$, and i is the highest ordinal number of those of the memories storing data.

The number s is subtracted from the number i of the originally stored weight values to know the number i of the currently stored weight values (S118). In this way, weight values resulting from successively weighing articles can be memorized, and the ordinal numbers of weight values stored in respective memories can be modified in accordance with the change of the ordinal numbers of non-selected articles left on the retention conveyor 63. Thus, weight values of articles standing on the retention conveyor 63 are stored, being associated with the respective articles.

As shown in FIG. 1, the combination weighing machine of the above-described embodiment is arranged such that articles are held in the same cups 20 from the time when they are put into the cups for weighing at the supplying stage 61, through the time when they are selected by combination computation, to the time when they are put into the packaging apparatus 89. Accordingly, adhesive or sticky articles never stick to the inner walls of individual chutes 9 and the collecting chute 10 as they do in conventional combination weighing machine, which results in improvement of precision and speed of weighing cut vegetables, pickles, roe etc. which are adhesive or sticky.

In addition, because a number of cups 20 containing weighed articles can be kept on the retention conveyor 63 and weighed articles in the standing cups 20 can be selected for computing desired combinations, the weighing precision is also improved. Further, because a number of stops for making cups 20 stand on the retention conveyor 63 are not required, the size of the combination weighing machine can be reduced, accordingly, and, the number of parts of the machine can be also reduced.

The number of articles which can participate the combination computation can be increased by increasing the lengths of the retention conveyor 63 and the transfer conveyor 64 and increasing the number of the pushers 84. In a conventional combination weighing machine like the one shown in FIG. 14, it is necessary to add a set of a straight feeder 3, a weighing hopper 5 and a memory hopper 8 in order to increase the number of weight values by one, but the present invention does not require such addition and, therefore, is economical.

In addition, since a number of weighed articles can be stored in cups 20 without need for putting them into other containers, such as a hopper, measured weights remain unchanged, which could otherwise change due to the adhesion of articles to cups if they were removed from the cups into other containers. Thus, the present invention can provide improved precision and speed for the combination weighing of sticky articles over conventional combination weighing machines. Because a number of cups 20 containing weighed articles can stand on the retention conveyor 63, articles can be sent out successively from the weighers 62 after they are weighed and, therefore, the weighing of articles can be continuously and successively carried out. This improves an operating efficiency of the weighers 62 (i.e. the ratio of the time necessary for weighing articles in the supplying and weighing stage to the operating time of the combination weighing machine) over conventional machines.

Next, a second embodiment is described with reference to respective drawings. The difference of a combination weighing machine according to the second embodiment from the combination weighing machine according to the first embodiment is a supplying and weighing stage 114. The configurations and operations of the remaining portions, namely, a waiting (e.g., the waiting station, also referred to as the waiting position) and transfer stage 115, a returning and discharge stage 116, a return stage 117 and apparatuses and parts disposed in these stages, are similar to those of the first embodiment. The same reference numerals as used for the first embodiment are used for such similar portions, and detailed descriptions thereof are not given.

Figure 18:
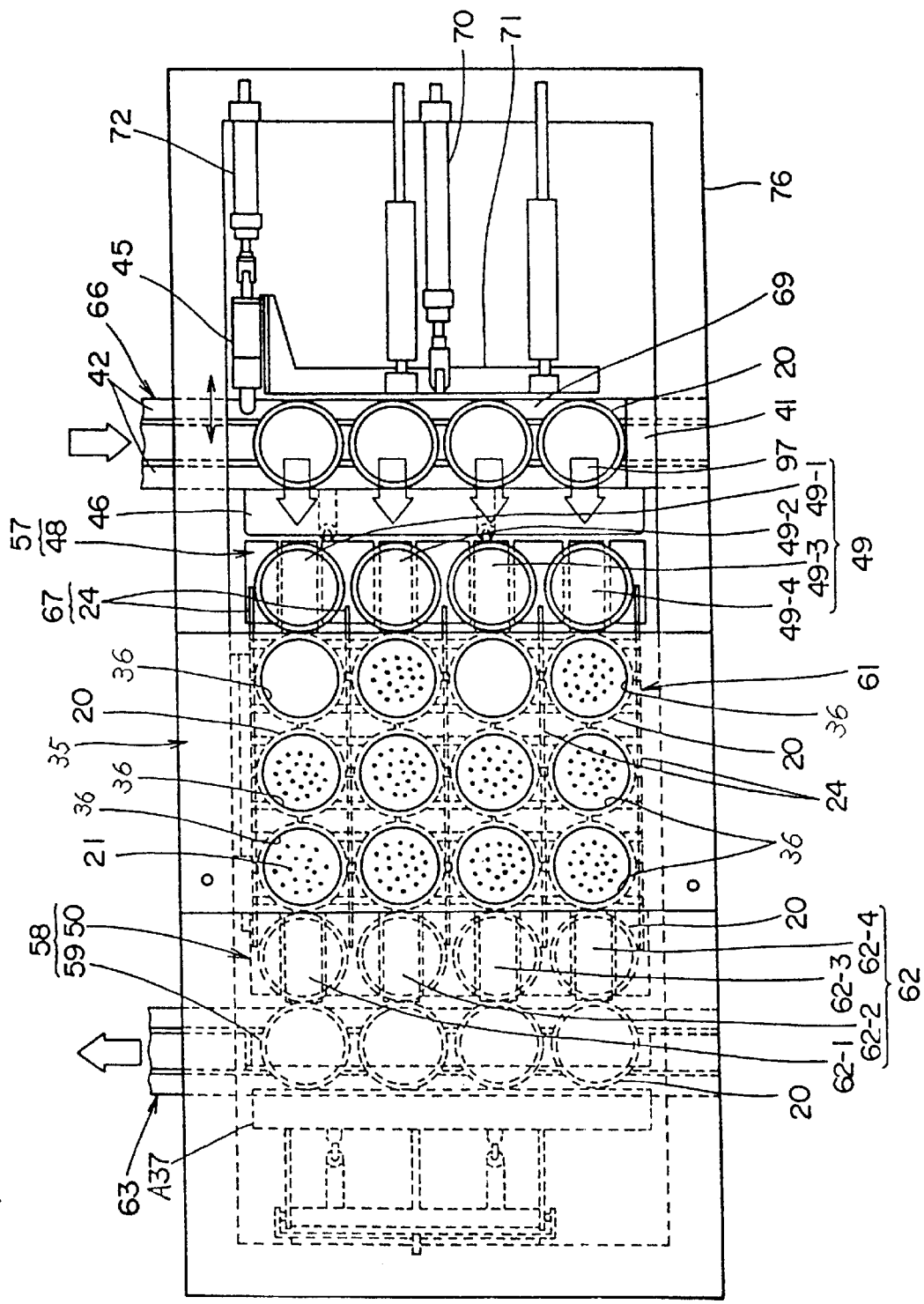
FIG. 18 is a plan view of the weighing machine of the second embodiment.
Figure 19:
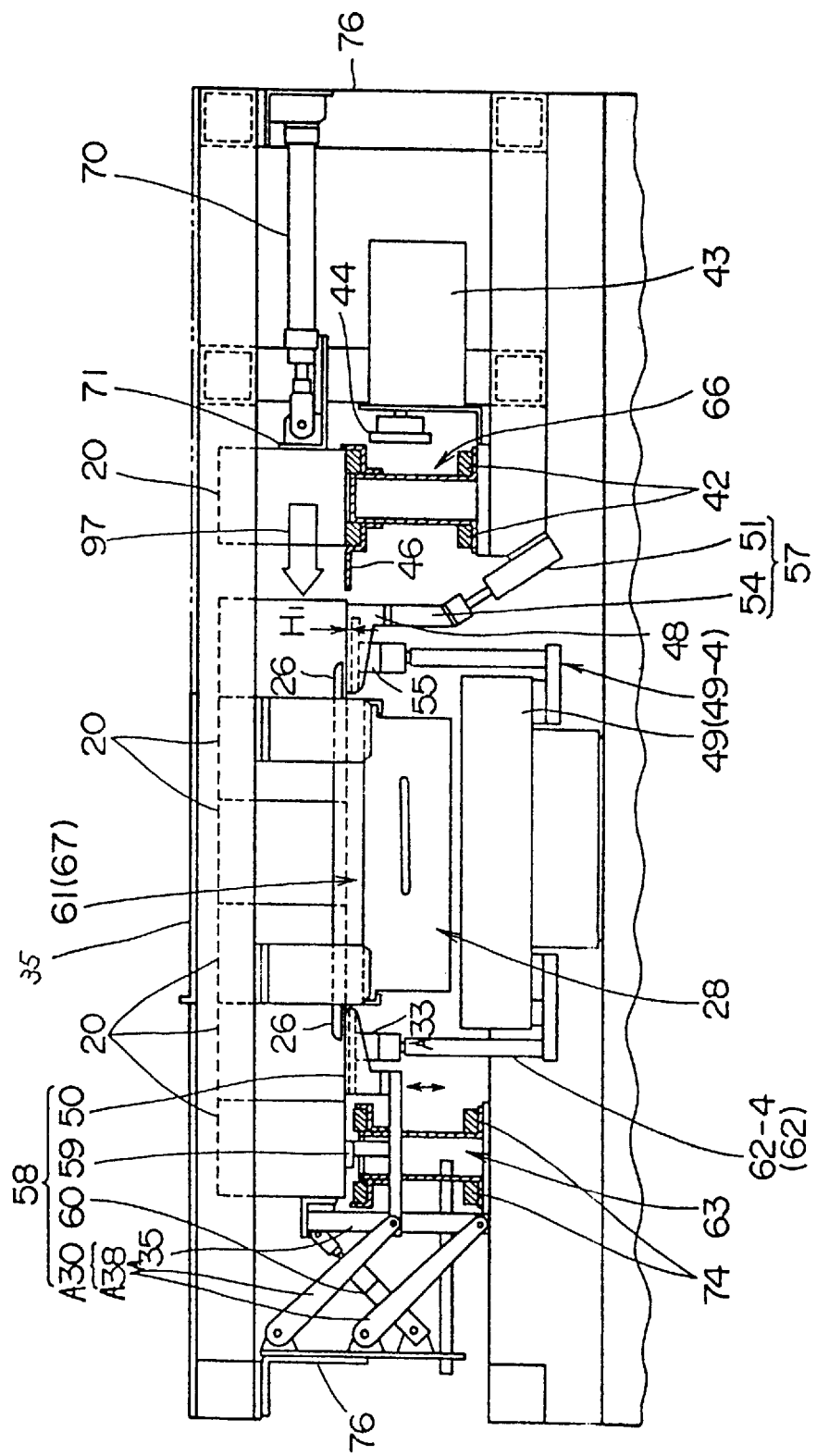
FIG. 19 is a partially cross-sectional, front elevational view of the weighing machine of the second embodiment.
Figure 22:
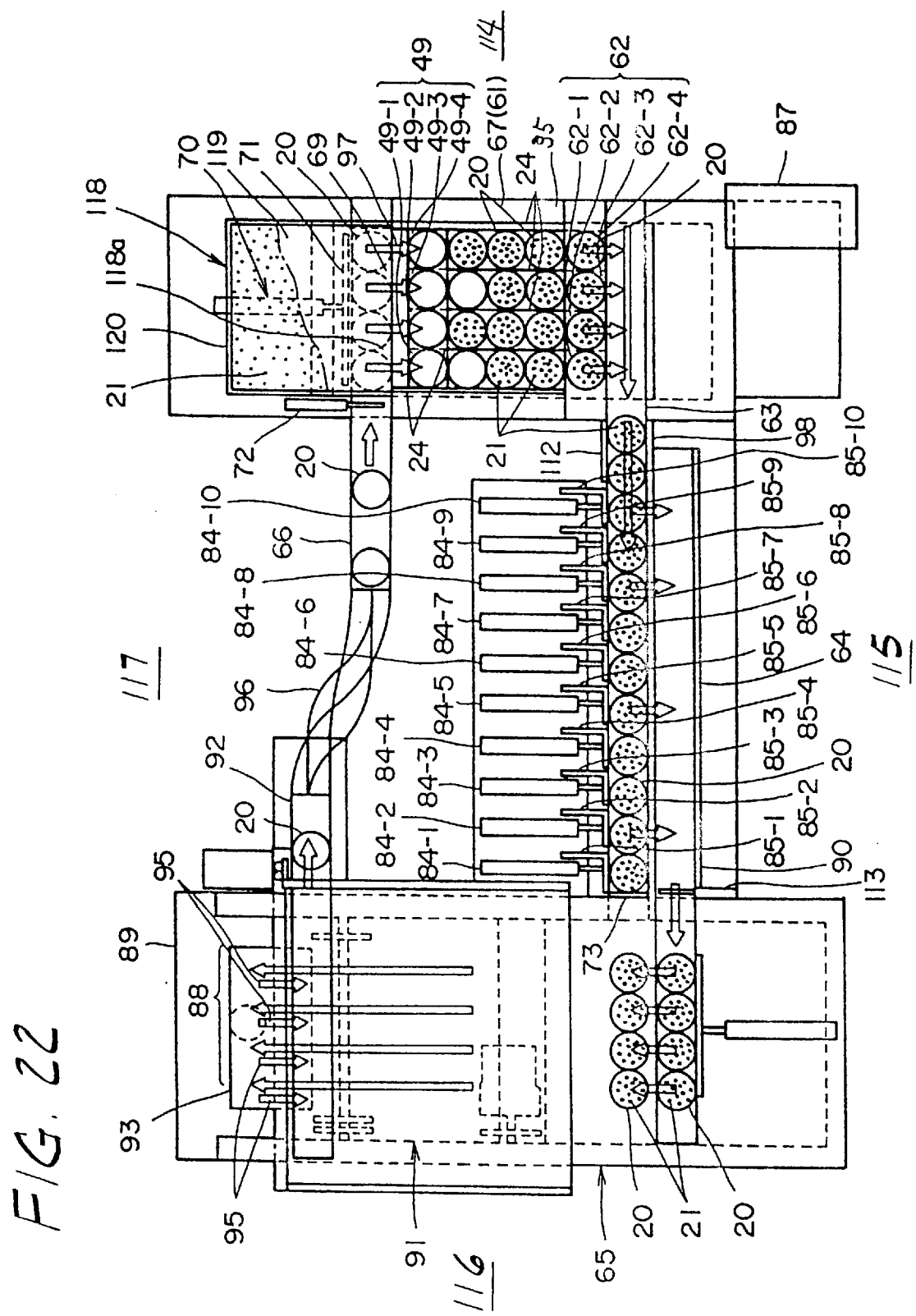
FIG. 22 is a plan view of combination weighing machines according to the second and third embodiments of the present invention.
Figure 23:
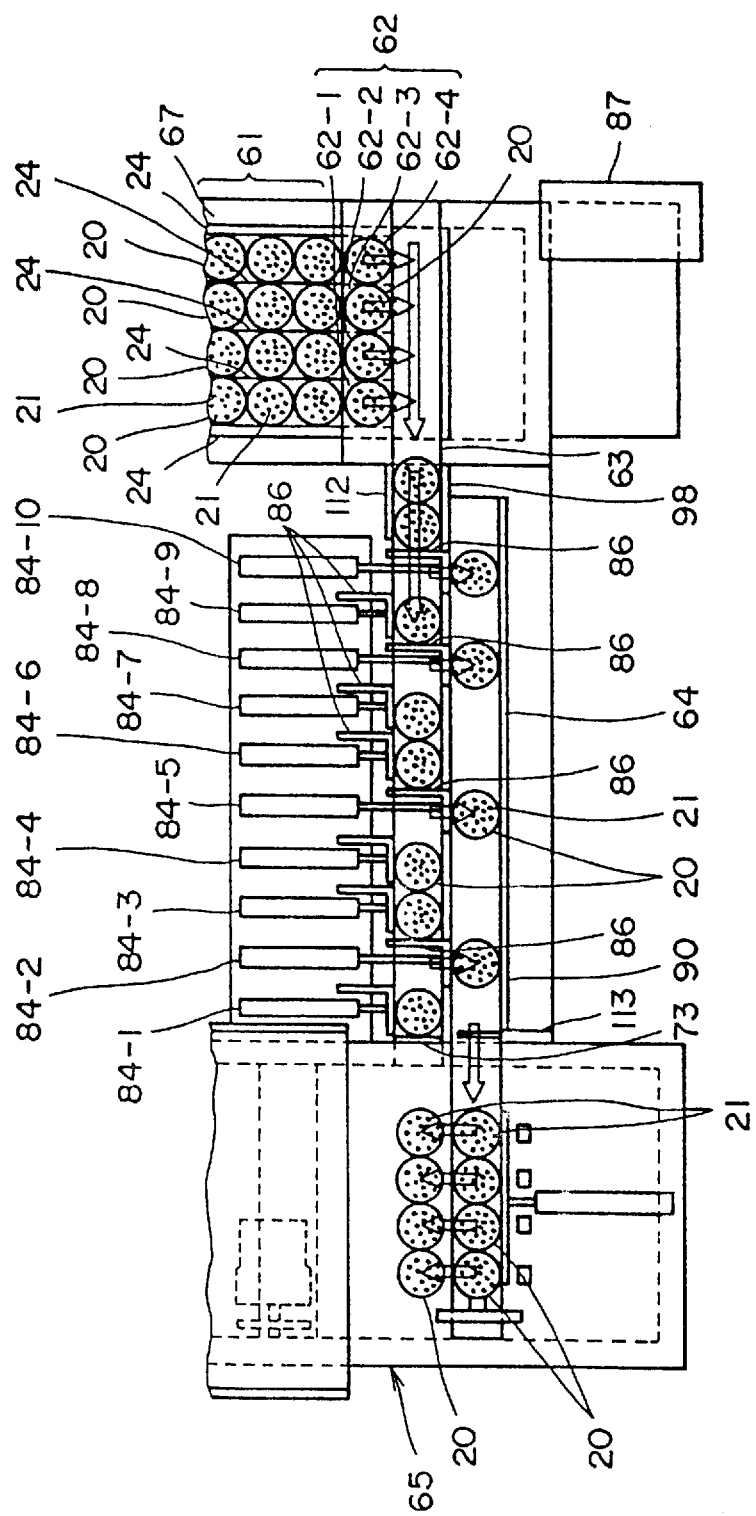
FIG. 23 is a plan view of combination weighing machines of the second and third embodiments, showing how pushers push out cups containing selected articles.

FIG. 18 is a plan view of a weigher apparatus forming a supplying and weighing stage 114, and FIG. 19 is a front elevational view thereof. As is seen from the plan view of FIG. 18, the weigher apparatus receives empty cups (article holding means) 20 by means of a transport conveyor (receiving means) 66, and cups received by the transport conveyor 66 are fed by means of an empty cup pusher (pushing means) 70 onto a first elevator (first elevation means) 48 in its elevated position. The empty cups 20 thus fed are weighed by first weighers 49 (49-1, 49-2, 49-3, 49-4). While the weighed cups 20 are moving in the forward direction 97 on a supplying stage 61, articles to be weighed are supplied into respective cups 20 by an operator or by a supplying unit. Cups 20 with articles 21 to be weighed put therein are fed to a second elevator 50 in its elevated position. The weights of cups 20 containing articles 21 to be weighed are measured by four second weighers 62 (62-1, 62-2, 62-3, 6-24). After that, cups 20 containing weighed articles 21 therein are fed out to a retention conveyor (sending out means) 63. Weight values $W_{H1}$, $W_{H2}$, $W_{H3}$, and $W_{H4}$ (weight values of cups 20) obtained by the weighing in the first weighers 49 are subtracted in a subtracter (not shown), respectively from weight values $W_{G1}$, $W_{G2}$, $W_{G3}$, and $W_{G4}$ (weight values of sums of weights of cups 20 and articles 21) obtained by the weighing in the four second weighers 62, whereby the weights $W_{B1}$, $W_{B2}$, $W_{B3}$, and $W_{B4}$ of the respective articles 21 in the cups 20 are calculated. Since empty cups 20 are weighed beforehand by means of the first weighers 49, the weights of articles 21 currently put into cups 20 can be precisely measured even if such cups have various weights or part of articles remains sticking to such cups. Then, weighed articles in cups 20 are removed from the cups 20 and packaged. The transport conveyor 66, the empty cup pusher 70 and the first elevator 48 form feeding means recited in claim 6.

The transport conveyor 66 is receiving means, which is, as shown in FIGS. 18 and 19, is a straight conveyor having its terminal end 69 disposed beside four first weighers 49. The transport conveyor 66 receives empty cups 20 from which weighed articles or articles to be weighed 21 (hereinafter, sometimes referred to simply as articles) have been discharged, and transport such cups 20 to the terminal end 69. A stop 41 is disposed in the terminal end 69, which can catch and hold cups 20. As is seen from a partially cross-sectional side view shown in FIG. 19, the transport conveyor 66 includes two looped plastic chains (top chains) 42, 42. The two opposite ends of each of the loops 42, 42 wrap around sprockets (not shown). The sprockets are linked with sprockets 44 disposed on a rotating shaft of a motor 43. As the motor 43 rotates, the two plastic chains 42, 42 are driven in a predetermined direction. Although not shown, the surfaces of the plastic chains 42, 42 contacting cups 20 are provided by plastic plates having small friction resistance. When cups 20 are transported to the terminal end 69 of the transport conveyor 66, the foremost cup 20 is caught by the stop 41, so that cups 20 stop moving on the terminal end 69.

Figure 17:
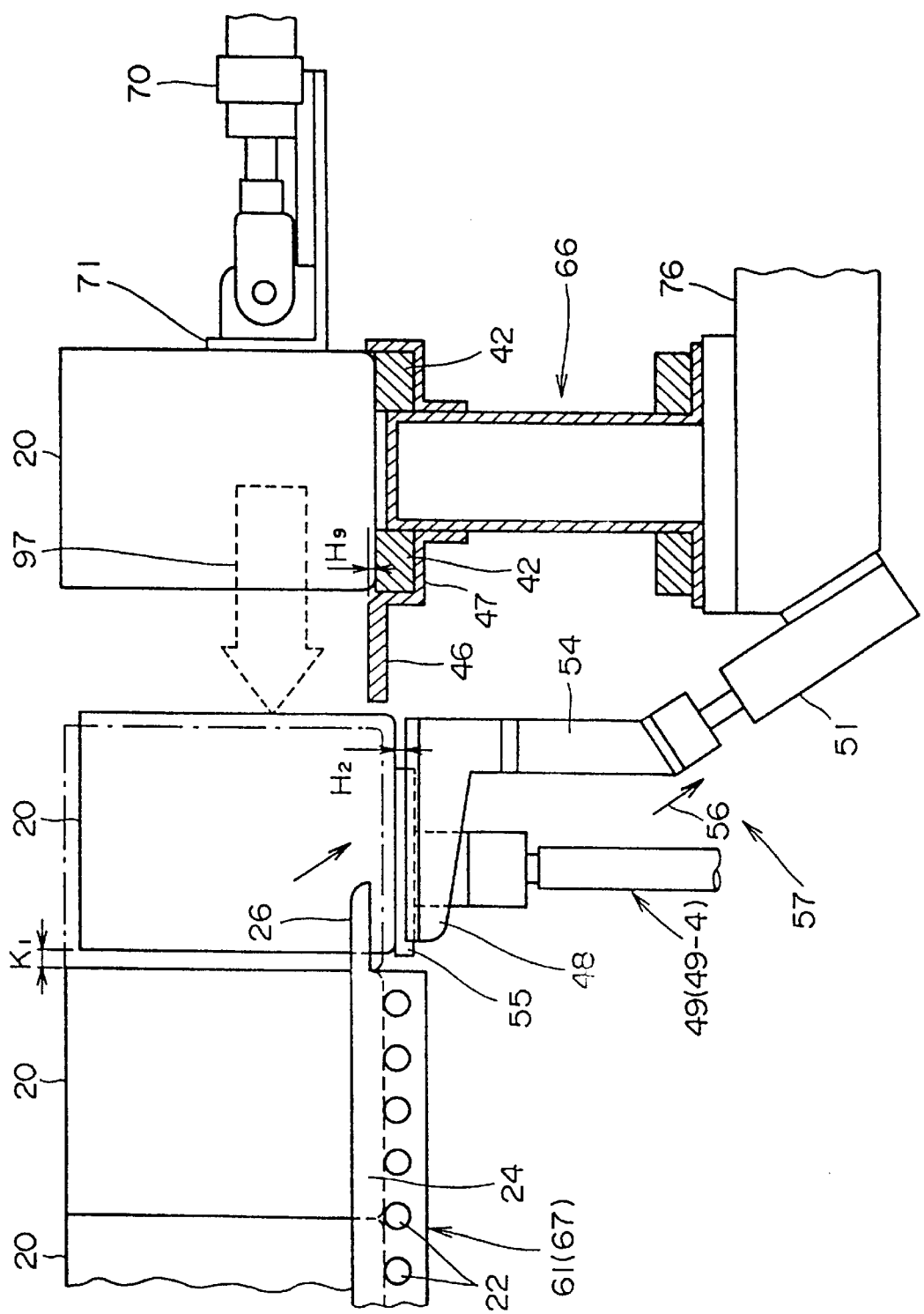
FIG. 17 is an enlarged front elevational view of a first elevator of the weighing machine of the second embodiment when it is in a lowered position.

As shown in FIGS. 17 and 18, the empty cup pusher 70 is disposed in the terminal end 69 of the transport conveyor 66, and the pad 71 at the distal end of the piston rod of the empty cup pusher 70 restrains cups 20 on the transport conveyor 66 from being pushed toward the pusher 70. The transport conveyor 66 is driven by the motor 43 all the time, and, therefore, when cups 20 on the transport conveyor 66 are transported to the stop 41 and the foremost cup 20 comes into contact with the stop 41, cups 20 following the foremost cup 20 stop in a line, pushing preceding ones. Since the transport conveyor 66 is driven all the time, cups standing in a line on the transport conveyor 66 tend to be pushed leftward or rightward, but the pad 71 and a guide plate 46 shown in FIG. 17 prevent them from being pushed out of the transport conveyor 66. The guide plate 46 is provided by bending the foremost end of a retainer 47 which retains the plastic chain 42, and has an upper surface which is located above the transport surface (top surface) of the plastic chain 42 by $H_9$ (about 3 mm). The guide plate 46 is disposed beside the four first weighers 49, as shown in FIG. 18.

When there come four empty cups 20 at the terminal end 69 of the transport conveyor 66, as shown in FIG. 18, and a given supply signal is outputted from a central processing unit (CPU) (not shown) included in the weighing apparatus, a stop 72 which comprises an air cylinder disposed at the entrance of the terminal end 69 extends, so that a pad 45 at the tip end of the stop 72 prevents succeeding cups 20 from entering. Then, the empty cup pusher 70 stretches to push four cups 20 in the terminal end 69 onto the first elevator 48 disposed in front of it. The pusher 70 then retracts (into a retracted position shown in FIG. 18), and the stop 72 opens (i.e. placed in a retracted position shown in FIG. 18) the path to permit four cups 20 to move to the terminal end 69.

The empty cup pusher 70 forms pushing means. The empty cup pusher 70 has the pad 71 at the tip end of its piston rod, as shown in FIGS. 18 and 19. When the empty cup pusher 70 stretches from its retracted position shown in FIG. 18, four cups 20 standing on the terminal end 69 of the transport conveyor 66 are pushed to move over the guide plate 46 onto the first elevator 48 in its elevated position.

The first elevator 48 is disposed in a first elevator apparatus 57. The first elevator apparatus 57, as shown in FIGS. 18 and 19, includes the first elevator 48 and two drive cylinders 51. As shown in FIG. 20, the first elevator 48 includes five elevator plates 52 which are disposed horizontal, being spaced by a predetermined distance. The five elevator plates 52 are connected together by means of a connecting plate 53. The first elevator 48 is connected to the tip ends of the piston rods of the two drive cylinders 51 through a connecting frame 54, as shown in FIG. 19. In each of the four spacings between adjacent ones of the five elevator plate 52, a table 55 of one of the four first weighers 49 is located, as shown in FIG. 20($a$). As shown in FIGS. 18 and 19, the two drive cylinders 51 parallel each other and are mounted on a weighing machine frame body 76. The drive cylinders 51 extend slantwise with the tip ends of their piston rods aimed from beneath the terminal end 69 of the transport conveyor 66 toward the tables 55 of the first weighers 49. The first elevator apparatus 57 moves the first elevator 4 between the elevated position shown in FIG. 19 and the lowered position shown in FIG. 17 by driving the drive cylinders 51 to stretch and retract. With the first elevator 48 driven to assume the elevated position shown in FIG. 19, the five elevator plates 52 are kept horizontal with the upper surfaces of the elevator plates 52 being in a position (upper position) above the upper surfaces of the tables 55 of the first weighers 49 by $H_1$ (=about 3 mm), but slightly below the upper surface of the guide plate 46, whereby the first elevator 48 can hold cups 20 in such a manner that the weights of cups 20 may not act on the tables 55. With the first elevator 48 driven to assume the lowered position shown in FIG. 17, the upper surfaces of the five elevator plates 52 are in a position (lower position) below the upper surfaces of the tables 55 of the first weighers 49 by $H_2$ (=about 4 mm), whereby four cups 20 on the first elevator 48 are placed onto the tables 55 of the first weighers 49. Since the drive cylinders 51 are disposed slantwise as shown in FIG. 17, the first elevator 48 moves downward in a direction indicated by an arrow 56, so that, during the downward movement, the first elevator 48 moves cups 20 on the first elevator 48 in the direction away from cups 20 on the supplying stage 61 in front of it, to thereby transfer cups 20 on the first elevator 48 onto the tables 55., As shown in FIG. 18, there are four first weighers 49 (49-1, 49-2, 49-3, 49-4). Each of the four first weighers 49 includes a weight detector, e.g. a load cell, and one table 55 is mounted on each load cell. By moving four empty cups 20 onto the tables 55 from the first elevator 48, the four empty cups 20 are weighed. A computation control unit (not shown) of the combination weighing machine stores weight values $W_{H1}-1$, $W_{H2}-1$, $W_{H3}-1$ and $W_{H4}-1$ of the cups 20 in a memory section. When four cups 20 are weighed on the four tables 55, they are spaced by $K_1$ (=about 3 mm) from four cups 20 on the supplying stage in front of them, as shown in FIG. 17, and are spaced from laterally adjacent cups by guides 24 of the supplying stage 61. Accordingly, it occurs neither that weights of cups preceding and succeeding the cups 20 on the tables 55 of the four first weighers 49 and weights of cups 20 laterally adjacent to them act on the tables 55, nor that weights of the cups 20 on the tables 55 act on cups 20 preceding and succeeding them or on laterally adjacent cups 20. Thus, exact weights of four empty cups 20 on the tables 55 can be measured by the first weighers 49.

As shown in FIG. 18, the supplying stage 61 is similar to the one of the first embodiment. The same reference numerals are used for similar components, and their detailed description is not made.

A second elevator apparatus 58 including the second elevator 50 is disposed in the stage succeeding the supplying stage 61. The second elevator apparatus 58 includes second elevator 50, a third elevator 59, two drive cylinders 60 for driving the second and third elevators 50 and 59, and an elevator link assembly A30 for transmitting driving force of the drive cylinders 60 to the second and third elevators 50 and 59. FIG. 21(a) is an enlarged plan view of the second and third elevators 50 and 59, FIG. 21(b) is their enlarged front elevation view, and FIG. 21(c) is their enlarged side view.

As shown in FIG. 21, the second elevator 50 includes five, spaced, horizontal elevator plates A31 which are connected together by a connector plate A32. In the respective ones of the four gaps between adjacent ones of the five elevator plates A31, tables A33 of the four second weighers 62 are located, as shown in FIG. 21(a). The second elevator 50 is secured to two vertically extending links A35 by means of a horizontal frame member A34.

The third elevator 59 includes an elongated planar member of which the upper surface is disposed horizontal, as shown in FIG. 21. The opposite ends of the planar member are bent downward. The third elevator 59 is connected to the horizontal frame member A34 by means of connecting rods A36. As shown in FIG. 21(c), the third elevator 59 and the second elevator 50 are mounted to the horizontal frame member A34 in such a manner that their upper surfaces are in the same level. A stop A37 having an L-shaped cross-section is disposed at the top end of each vertical link A35 to which the horizontal frame member A34 is connected.

Figure 14:
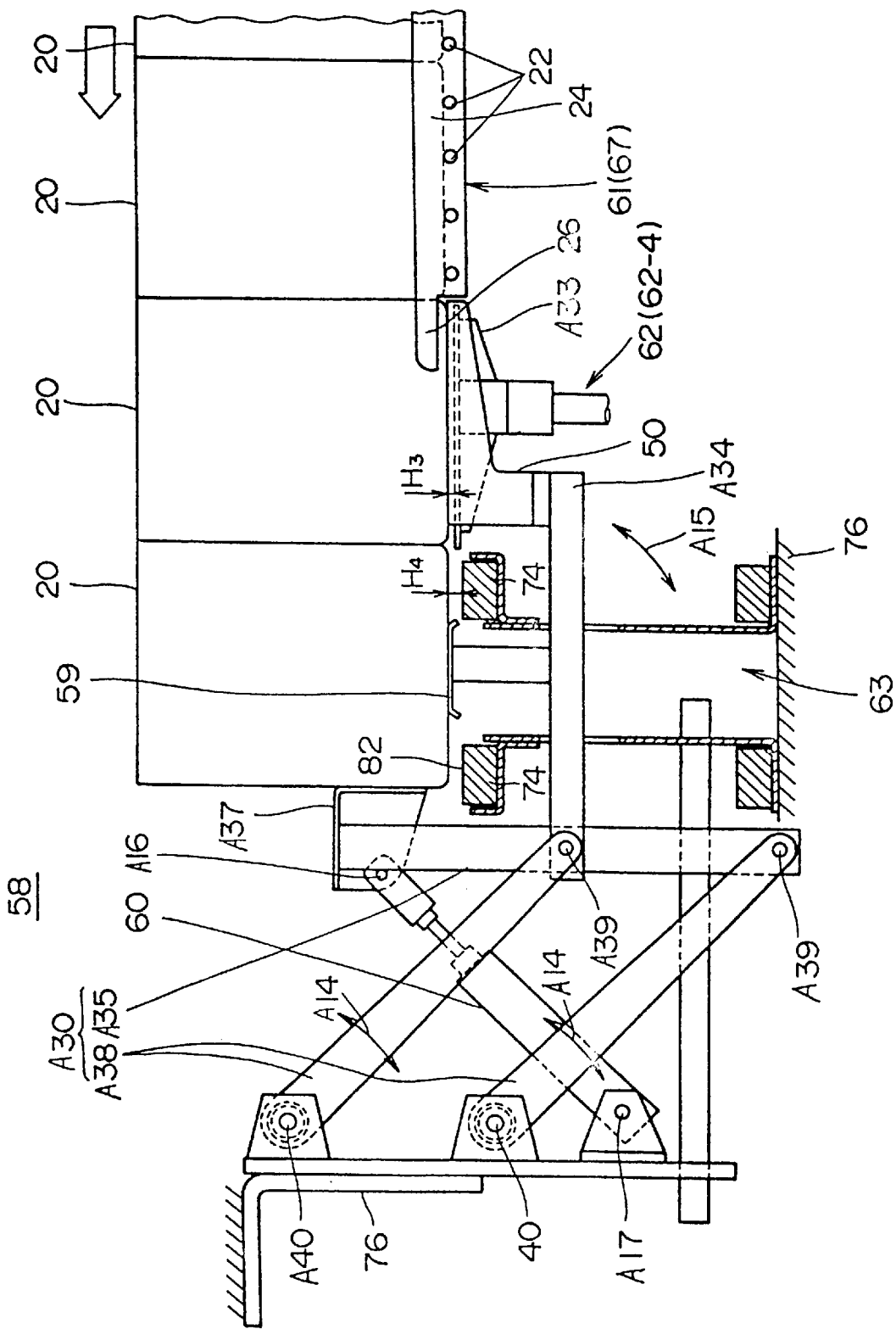
FIG. 14 is an enlarged front elevational view of second and third elevators of a weighing machine according to a second embodiment of the present invention in their elevated positions.

The elevator link assembly A30 includes, as shown in FIG. 14, a right-side link structure including two parallel links A38 and one of the vertical links A35; and a left-side link structure disposed symmetrical with the right-side link structure. The right-side and left-side link structures are the same, and only the right-side link structure is explained. No explanation of the left-side link structure is given.

As shown in FIG. 14, the right-side link structure has its two parallel links A38 rotatably connected at their right ends with the vertical link A35 via connecting shafts A39, A39. The left ends of the parallel links A38 are rotatably connected to the frame body 76 of the weighing machine via connecting shafts A40. Thus, when the two parallel links A38 sway in a direction indicated by arrows A14 about the connecting shafts A40, A40, the horizontal frame member A34 sways in a direction indicated by an arrow A15, i.e. along a circle. The swaying action of the horizontal frame member A34 in the direction A15 causes the second and third elevators 50 and 59 sway in the direction A15 with their top surfaces kept horizontal.

As shown in FIG. 14, the drive cylinders 60 include a right-side drive cylinder associated with the right-side link structure and a left-side drive cylinder, not shown, associated with the left-side link structure. The right-side drive cylinder and the left-side drive cylinder are similar, and, therefore, only the right-side drive cylinder is explained, and the left-side drive cylinder is not explained.

The right-side drive cylinder 60 may be an air cylinder, as shown in FIG. 14, and has a piston rod having its tip end rotatably connected to the upper end of the vertical link A35 via a connecting shaft A16. The base of the cylinder is rotatably connected to the frame body 76 of the weighing machine via a connecting shaft A17. When the right-side and left-side drive cylinders 60, 60 stretch in synchronism with each other, the second and third elevators 50 and 59 are driven to the elevated positions shown in FIG. 14.

In the elevated position shown in FIG. 14, the upper surface of the second elevator 50 is located about 1 mm below the upper edge of the fixed platform 67 of the supplying stage 61 (i.e. the surface on which cups 20 are conveyed), so that it can receive cups 20 which are pushed from the supplying stage 61. The upper surface of the second elevator 50 is $H_3$ ($\approx$3 mm) above the top surface of the tables A33 of the second weighers 62, so that it can support cups 20 in such a manner that weights of cups 20 do not act on the tables A33. The upper surface of the third elevator 59 is at the same level as the upper surface of the second elevator 50, so that it can receive cups 20 pushed out from the second elevator 50. The upper surface of the third elevator 59, however, is $H_4$ ($\approx$6 mm) above the transfer surface of the retention conveyor 63 and, therefore, can support cups 20 in such a manner that the bottoms of cups 20 do not contact the transfer surface.

In the lowered position shown in FIG. 16, the upper surface of the second elevator 50 is below the upper surface of the tables A33 of the second weighers 62 by $H_5$ ($\approx$4 mm), so that cups 20 on it can be transferred onto the tables A33 of the second weighers 62. The upper surface of the third elevator 59 is below the transfer surface of the retention conveyor 63 by $H_6$ ($\approx$1 mm), so that cups 20 on it can be transferred onto the transfer surface of the retention conveyor 63.

Figure 15:
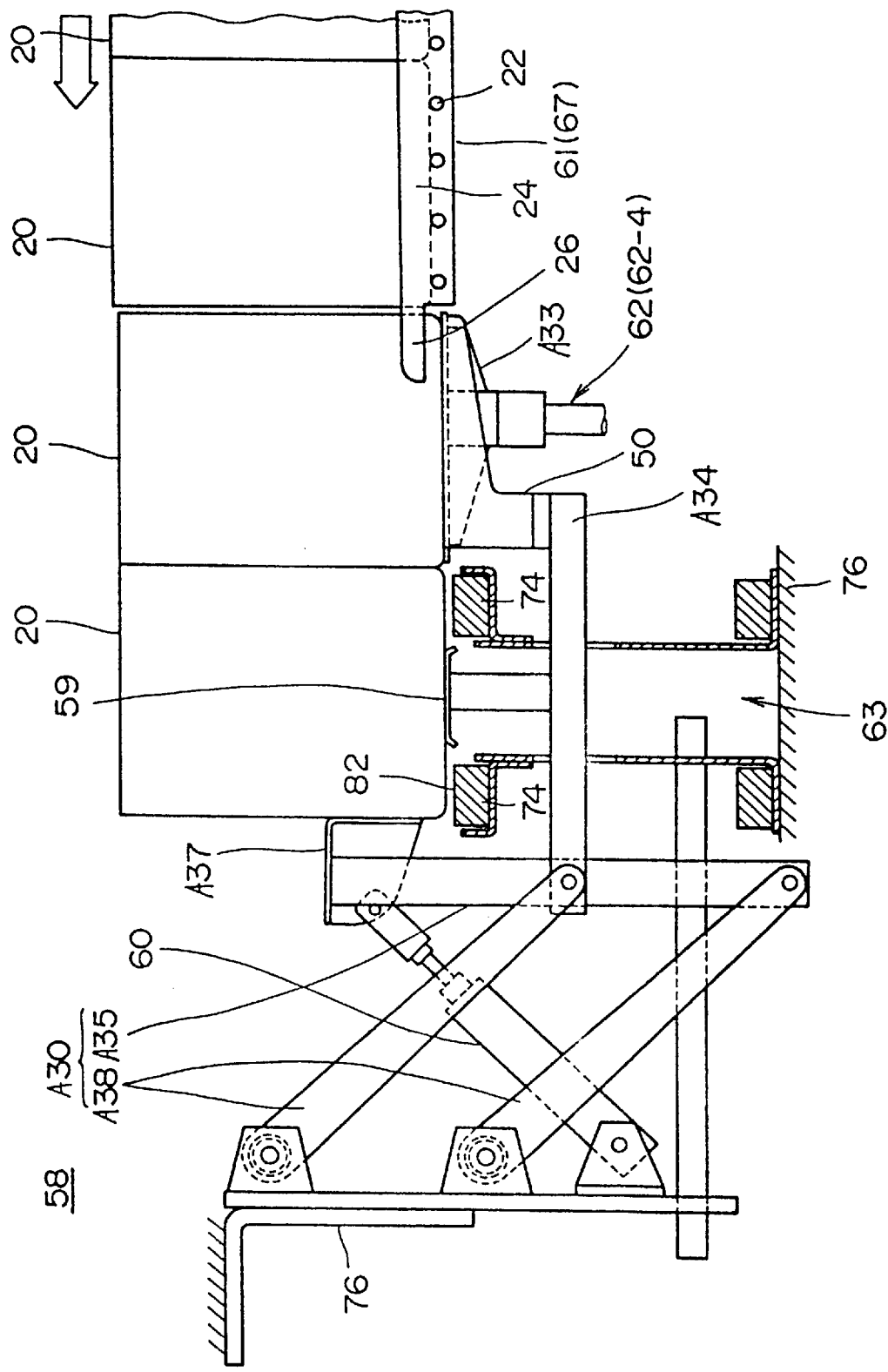
FIG. 15 is an enlarged front elevational view of the second and third elevators of the weighing machine of the second embodiment when they are in positions intermediate between their elevated and lowered positions.
Figure 16:
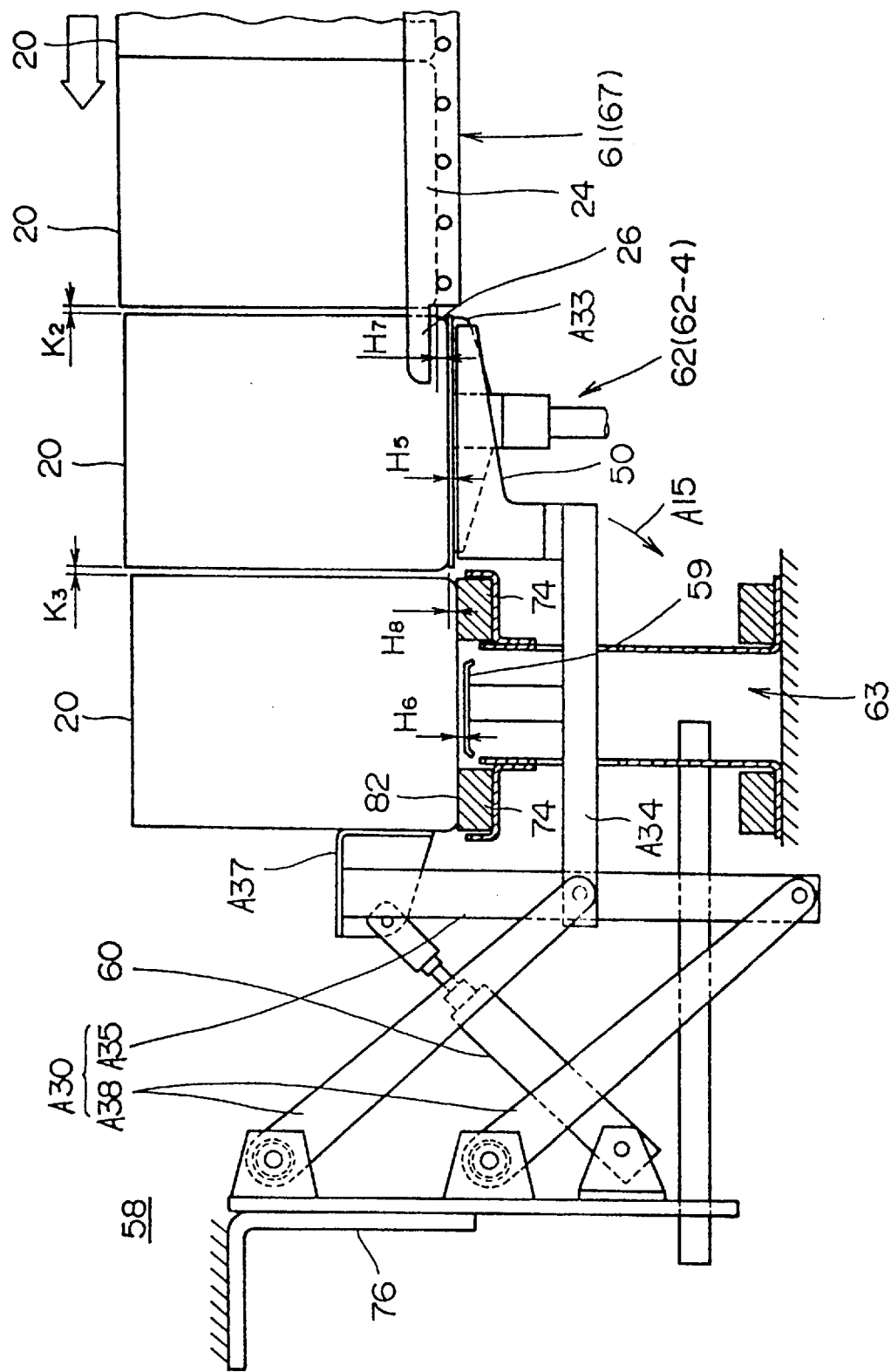
FIG. 16 is an enlarged front elevational view of the second and third elevators of the weighing machine of the second embodiment in their lowered positions.

As shown in FIG. 16, since the upper surfaces of the tables A33 of the second weighers 62 are disposed at a level below the upper edge of the supplying stage 61 (i.e. the surface on which cups 20 are conveyed) by $H_7$ ($\approx$3 mm) and the second elevator 50 is lowered in the direction away from the supplying stage 61 (i.e. in the direction indicated by the arrow A15 in FIG. 16), cups 20 on the second elevator 50 are moved in the direction away from cups 20 on the succeeding supplying stage 61 to be transferred onto the tables A33 of the second weighers 62. FIG. 15 is a front elevational view of the second elevator 50 of which the upper surface is at the same level as the upper surfaces of the tables A33.

Since the transfer surface of the retention conveyor 63 is disposed at a level below the upper surfaces of the tables A33 of the second weighers 62 by $H_8$ ($\approx$3 mm) and the third elevator 59 is lowered in the direction (as indicated by the arrow A15 in FIG. 16) away from the supplying stage 61, as shown in FIG. 16, cups 20 on the third elevator 59 can be moved in the direction away from cups 20 on the second elevator 50 in the succeeding stage to transfer them onto the transfer surface of the retention conveyor 63.

As shown in FIGS. 18 and 19, there are four second weighers 62, which include weight detectors, e.g. load cells. When four cups containing articles 21 to be weighed are moved from the second elevator 50 onto the tables A33 of the respective load cells (see FIG. 16), the weights of the four cups 20 with articles 21 to be weighed put therein are measured. The computation control section (not shown) of the combination weighing machine causes weight values of these cups 20, $W_{G1}$-1, $W_{G2}$-1, $W_{G3}$-1, and $W_{G4}$-1, to be stored in a memory section. As is understood from FIG. 16, during the weighing, four cups 20 on the tables A33 of the second weighers 62 are spaced by $K_2$ ($\approx$3 mm) from the succeeding four cups 20 on the supplying stage 61 and are also spaced by $K_3$ ($\approx$3 mm) from the preceding cups 20 on the retention conveyor 63. In addition, cups 20 on the tables A33 are separated from laterally adjacent cups 20 by the guides 24 in the supplying stage 61. Accordingly, each table A33 does not receive any weight of cups 20 in front of, back of, on the right and on the left of the cup 20 on that table A33, or the weight of the cup 20 on each table A33 does not act on cups 20 in front of, back of, on the right and on the left of that cup 20. Therefore the weights, $W_{G1}$-1, $W_{G2}$-1, $W_{G3}$-1, and $W_{G4}$-1, of four cups 20 containing articles 21 therein on the respective tables A33 can be measured precisely by the second weighers 62.

The retention conveyor 63 is a straight conveyor having its proximal end portion disposed beside the four second weighers 62, as shown in FIGS. 18 and 19, and receives and conveys in the direction indicated by arrows in FIG. 18, four cups 20 from the second weighers 62. As is understood from the cross-section shown in FIG. 14, the retention conveyor 63 is similar to that of the first embodiment, and the same reference numerals are attached to similar parts, giving no detailed description about them.

Next, operation 6f the weighing machine with the above-described arrangement is described.

As shown in FIGS. 18 and 19, the empty cup pusher 70 successively feeds four empty cups 20 on the terminal end 69 of the transport conveyor 66 onto the first elevator 48 in the elevated position. Cups are forwarded (in the direction 97) intermittently, contacting preceding and succeeding cups 20. These cups 20 are moved onto the retention conveyor 63 via the first elevator 48, the supplying stage 61 and the second elevator 50 which is elevated and lowered in synchronism with the first elevator 48.

As four cups 40 arranged in a row perpendicular to the direction 97 are fed onto the first elevator 48 in the elevated position, the first elevator 48 moves to its lowered position. While the first elevator 48 is being lowered, four empty cups 20 on it move toward the transport conveyor 66 (i.e. in the backward direction) so that they can be transferred onto the tables 55 of the respective first weighers 49-1 through 49-4, being kept separated from four cups 20 in front of them in the supplying stage 61 and four cups 20 back of them in the transport conveyor 66. When four cups 20 are placed on the four tables 55, the four first weighers 49 weigh four empty cups 20. Since four empty cups 20 on the tables 55 of the four first weighers 49 are not in contact with cups 20 in front of, back of, right of and left of the respective cups 20, the weights of the four empty cups 20, $W_{H1}$ through $W_{H4}$, can be measured precisely. Thereafter, the first elevator 48 rises to the elevated position so that weighed cups on the four tables 55 can be transferred onto the first elevator 48. Next, the empty cup pusher 70 feeds next cups 20 on the transport conveyor 66 onto the first elevator 48, and the weighed cups 20 on the first elevator 48 are forwarded onto the supplying stage 61. In this way, successively weighed cups 20 are pushed forward on the supplying stage 61, and articles 21 are supplied at the supplying stage 61. Cups 20 with articles 21 supplied thereinto are successively forwarded onto the succeeding second elevator 50 which is in the elevated position, being in contact with preceding and succeeding cups 20 (see FIG. 14). As four cups 20 with articles 21 therein are fed onto the second elevator 50 in its elevated position, the second elevator 50 moves toward its lowered position. During this lowering movement, four cups 20 on the second elevator 50 are moved toward the retention conveyor 63 (i.e. in the forward direction) so that they can be transferred onto the tables A33 of the second weighers 62, being kept separated from the succeeding four cups (see FIG. 16). The third elevator 59 is lowered in synchronism with the second elevator 50. When the third elevator 59 is lowered, four cups on it (the sums of their weights and the weights of articles therein, $W_{G1}$-1 through $W_{G4}$-1, having been measured by the second weighers 62) are moved toward the retention conveyor 63 so that they can be transferred onto the retention conveyor 63, being kept separated from the succeeding four cups on the tables A33 of the second weighers 62. In this way, four cups 20 with articles 21 put therein on the tables A33 of the second weighers 62 can be weighed, while being kept separated from four cups 20 on the preceding retention conveyor 63 and four cups 20 on the succeeding supplying stage 61. Accordingly, the weights, $W_{G1}$-1, $W_{G2}$-1, $W_{G3}$-1, and $W_{G4}$-1, of four cups 20 with articles 21 contained therein can be measured precisely by the second weighers 62. The weights, $W_{G1}$-1, $W_{G2}$-1, $W_{G3}$-1, and $W_{G4\ -1}$, are stored in the memory section of the weighing machine. The weight $W_{G1}$-1 is the sum of the weight $W_{H1}$-1 of a cup 20 measured by the first weigher 49-1 and the weight $W_{B1}$-1 of an article 21 put in this cup 20. Similarly, the weights $W_{G2}$-1, $W_{G3}$-1, and $W_{G4}$-1 are the sums of the weights $W_{H2}$-1, $W_{H3}$-1 and $W_{G4}$-1 of cups 20 measured by the first weighers 49-2, 49-3 and 49-4 and the weights $W_{B2}$-1, $W_{B3}$-1 and $W_{B4}$-1 of articles 21 put in the respective cups 20.

Next, a subtracter of the computation control section (not shown) of the combination weighing machine computes successively ($W_{G1}$-1-$W_{H1}$-1), ($W_{G2}$-1-$W_{H2}$-1), ($W_{G3}$-1-$W_{H3}$-1) and ($W_{G4}$-1-$W_{H4}$-1), so that the weights of articles 21 in respective four cups 20, $W_{B1}$-1, $W_{B2}$-1, $W_{B3}$-1 and $WB_4$-1 can be computed. In this way, the weights of articles 21 put in respective cups 20, ($W_{B1}$-1, $W_{B2}$-1, $W_{B3}$-1, $W_{B4}$-1), ($W_{B1}$-2, $W_{B2}$-2, $W_{B3}$-2, $W_{B4}$-2), ..., can be successively computed on the supplying stage 61 shown in FIG. 18.

As described above, the weights of cups 20, ($W_{H1}$-1, $W_{H2}$-1, $W_{H3}$-1, $W_{H4}$-1), ..., are measured beforehand by the first weighers 49-1 through 49-4, and the weights of articles 21 ($W_{H1}$-1, $W_{H2}$-1, $W_{H3}$-1, $W_{H4}$-1), ..., are computed by subtracting the weights of cups 20, ($W_{H1}$-1, $W_{H2}$-1, $W_{H3}$-1, $W_{H4}$-1), ..., from the sum of the weights of the cups 20 and the articles 21 ($W_{G1}$-1, $W_{G2}$-1, $W_{G3}$-1, $W_{G4}$-1), .... Accordingly, even if weights of cups 20 vary largely, or even if parts of previously measured articles 21 have not been removed out, but are left in cups 20, the weights of articles put into cups 20 can be measured precisely. After that, precisely weighed articles 21 are removed from respective cups 20 and packaged.

Next, a combination weighing machine according to a third embodiment is described. The combination weighing machine according to the third embodiment comprises the combination weighing machine according to the second embodiment and a zero adjuster for adjusting the zero points of the four first weighers 49-1, 49-2, 49-3 and 49-4 and and the zero points of the four second weighers 62-1, 62-2, 62-3 and 62-4, and it is otherwise similar to the combination weighing machine of the second embodiment. Accordingly, detailed descriptions of similar portions are not given.

The zero adjuster includes first zero adjuster means, second zero adjuster means, and stopping means.

The stopping means stops the first and second elevators 48 and 50 in their elevated positions for a time necessary for zero-adjustment, with a preset timing (e.g. at predetermined intervals, or at preset times), and also stops the empty cup pusher 70 in its retracted position for the time necessary for zero-adjustment. FIG. 19 illustrates the first and second elevators 48 and 50 and the empty cup pusher 70 in their stop positions.

The first zero adjuster means provides zero-adjustment for the four first weighers 49-1, 49-2, 49-3 and 49-4 by changing the respective zero points at preset times, when the first elevator 48 is in the elevated position. In the elevated position of the first elevator 48, no weight of cups 20 acts on the tables 55 of the four first weighers 49-1 through 49-4, so that the weighers can be kept unloaded and the first weighers 49-1 through 49-4 can be provided with zero-adjustment.

The second zero adjuster means provides zero-adjustment for the four second weighers 62-1, 62-2, 62-3 and 62-4 by changing the respective zero points at preset times, when the second elevator 50 is in the elevated position. In the elevated position of the second elevator 50, no weight of cups 20 acts on the tables A33 of the four second weighers 62-1 through 62-4, so that the weighers can be kept unloaded and the first weighers 62-1 through 62-4 can be provided with zero-adjustment.

Operation of the zero adjuster of the weighing machine is now described. First, an operator uses an input section (not shown) to set time intervals at which zero-adjustment of the first and second weighers 49-1 through 49-4 and 62-1 through 62-4 is to be performed. Then, the first and second weighers 49 and 62 successively measures weights $W_H$ and $W_G$ of cups 20. When the above-stated set time interval passes, the stopping means stops the first and second elevators 48 and 50 in their elevated positions for a predetermined time period, as shown in FIGS. 18 and 19 and also stops the empty cup pusher 70 in its retracted position for the predetermined time period. During this time interval, the first and second zero adjuster means change the respective zero points for zero-adjustment of the eight weighers, in total, namely the first and second weighers 49-1 through 49-4 and 62-1 through 62-4.

As described above, in the weighing machine of this embodiment, the first and second elevators 48 and 50 are used in stopping cups 20 from being transferred to the first and second weighers 49 and 62 in order to provide zero-adjustment of the first and second weighers 49 and 62. Accordingly, there is no need for using separate arrangement for stopping the transfer of cups 20 onto the first and second weighers 49 and 62, which simplifies the structure of the weighing machine into a compact machine. Thus, the cost of the weighing machine is reduced.

In the above-described third embodiment, the stopping means keeps the empty cup pusher 70 in the retracted position for a predetermined time period at the time when the zero-adjustment is made, but it may be kept in its stretched position for the predetermined time period.

In the second and third embodiments, if variations in weight of empty cups 20 are within an allowable range relative to the article weighing precision, or if stickiness of articles 21 is small and, therefore, weights of articles 21 left in empty cups 20 are small, the first weighers 49 may be eliminated. In such a case, an average weight of empty cups 20 is stored in the memory section of the weighing machine. This average weight of cups 20 is subtracted from the sum of the weights of cups 20 and articles 21 measured by the second weighers 62, whereby the weights of articles 21 are obtained automatically. Further, if the weight of cups 20 is constant, sums of weights of cups 20 and articles may be variously combined. In this case, the target weight is the weight of articles plus the weight of cups 20.

Instead of using four first weighers 49 and four second weighers 62, a different number A than four for the first and second weighers may be used. In such a case, the number of the rows of cups 20 on the first and second elevators 48 and 50 and the supplying stage 61 is made equal to the number A selected for the first and second weighers 49 and 62, and cups 20 with weighed articles 20 contained therein are forwarded to the succeeding retention conveyor 63 when the number of cups 20 on the retention conveyor 63 becomes (12–A) or less.

Figure 24:
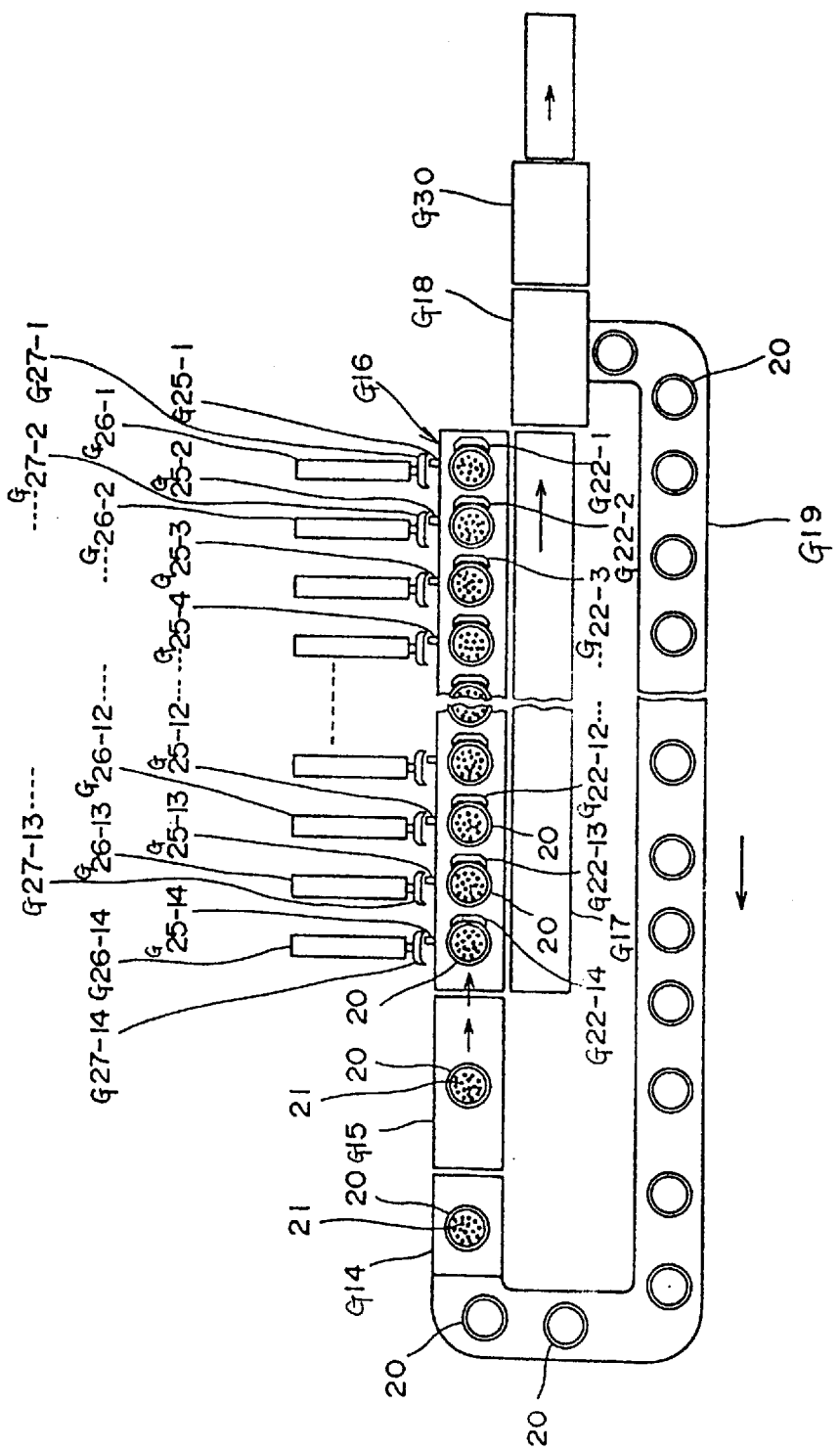
FIG. 24 is a plan view of a combination weighing machine according to a fourth embodiment.

A fourth embodiment of the present invention is described with reference to the drawings. As is seen from the plan view of the combination weighing machine shown in FIG. 24, the combination weighing machine includes a filling conveyor G14, a weighing conveyor (weighing means) G15, a retention conveyor (waiting means) G16, a 15 transfer conveyor G17, a discharge unit G18, and a transport conveyor G19, which are linked together. The filling conveyor G14 etc. are arranged to convey a number of cups (article holding means) 20 in the clockwise direction as shown in FIG. 24. With this combination weighing machine, while cups 20 are being transported, cups 20 are filled with articles to be weighed, the weights of articles are measured, and those ones of weighed articles 21 which have been selected for combination are discharged from cups 20, whereby combinations of articles, the combined weights of which are within the predetermined weight range, are obtained. Emptied cups 20 are repetitively used to hold and weigh articles 21 therein. All cups 20 are formed to have the same weight.

The filling conveyor G14 is a belt conveyor which conveys cups 20 successively to a predetermined filling position shown in FIG. 24, where each cup 20 stops moving and is filled with an article 21 having a weight which approximates a predetermined weight. A cup 20 filled with an article is conveyed to the succeeding weighing conveyor G15. Accordingly, although not shown, cups 20 are fed to the filling conveyor G14 at predetermined intervals. The filling of cups may be done by a filling machine or may be done manually. The filling conveyor G14 forwards a cup with an article contained therein to the weighing conveyor after a preceding article has been weighed by the weighing conveyor 15.

The weighing conveyor G15 is a belt conveyor with a weight detector, e.g. a load cell, which measures the sum of the weights of a cup 20 and an article within the cup 20 while the cup 20 is being conveyed. Because the weight of the cup 20 is known, a computation control section (not shown) subtracts the weight of the cup 20 from the sum weight to compute the weight of the article. The cup 20 with the weighed article is forwarded to the succeeding retention conveyor G16 when the number of cups 20 standing on the retention conveyor G16 becomes less than fourteen.

Figure 28:
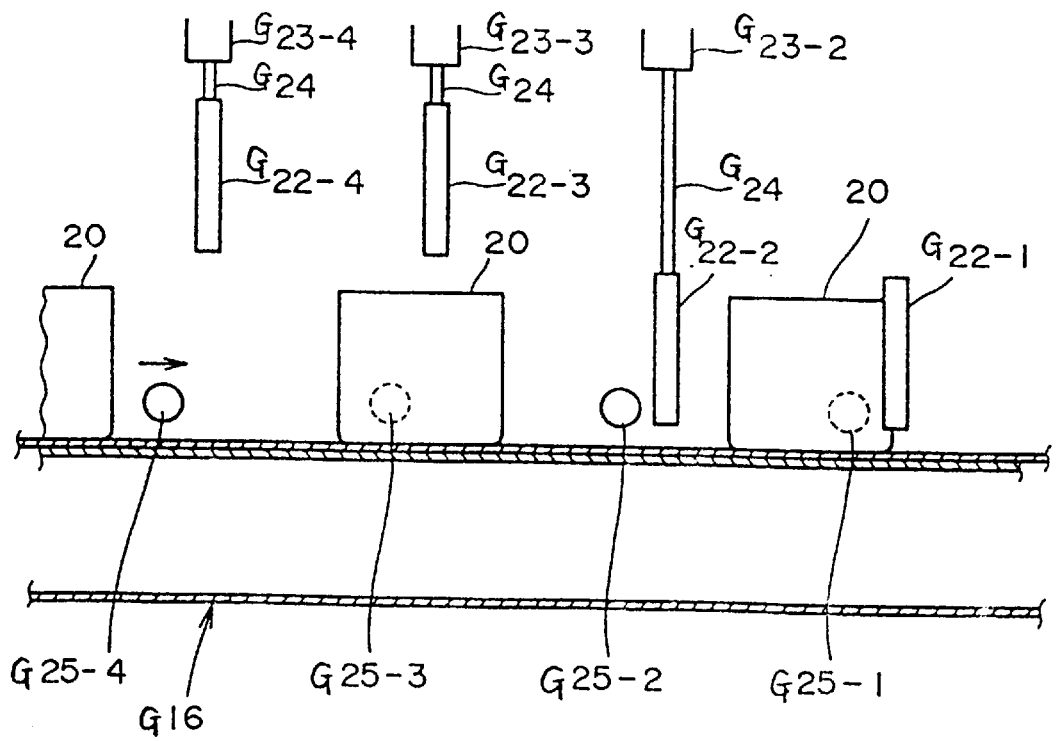
FIG. 28 is an enlarged front elevational view showing how cups are caught and held on the retention conveyor of the fourth embodiment.

The retention conveyor G16 is a belt conveyor having a relatively smooth conveyor surface, and, as shown in FIG. 24, receives cups 20 with weighed articles contained therein which are successively forwarded from the weighing conveyor G15. The retention conveyor G16 is so arranged that fourteen cups 20 can stand on it in a line, with a predetermined spacing disposed between adjacent ones. Fourteen cups are caught at predetermined stop positions by respective ones of first through fourteenth, fourteen stops G22 (G22-1 through G22-14), as shown in FIGS. 24 and 28. Weight values of respective articles are stored in the memory section (not shown), being associated with the respective stop positions. The memory section is connected to the computation control section.

As shown in FIG. 24, each of the stops G22 has a concave surface which contacts each cup 20 so that that cup 20 may not be displaced. The first, rightmost stop G22-1 shown in FIG. 24 is secured to the frame (not shown) of the retention conveyor G16, whereas the remaining, second through fourteenth stops G22-2 through G22-14 are mounted respectively on the lower ends of piston rods G24 of thirteen air cylinders G23-2 through G23-14 disposed above the retention conveyor G16 as shown in FIG. 28. They are driven by the respective air cylinders to move between the lower positions (i.e. cup catching positions) and the upper positions (i.e. cup non-catching positions). Out of four stops G22-1 through G22-4 shown in FIG. 28, the leftward two stops G22-3 and G22-4 are in their upper positions (cup non-catching positions), and the stop G22-2 which is the second from the right is in the lower position (cup catching position). The rightmost stop G22-1 is fixed to the frame and, therefore, is always able to catch and hold a cup 20 in that position.

Figure 25:
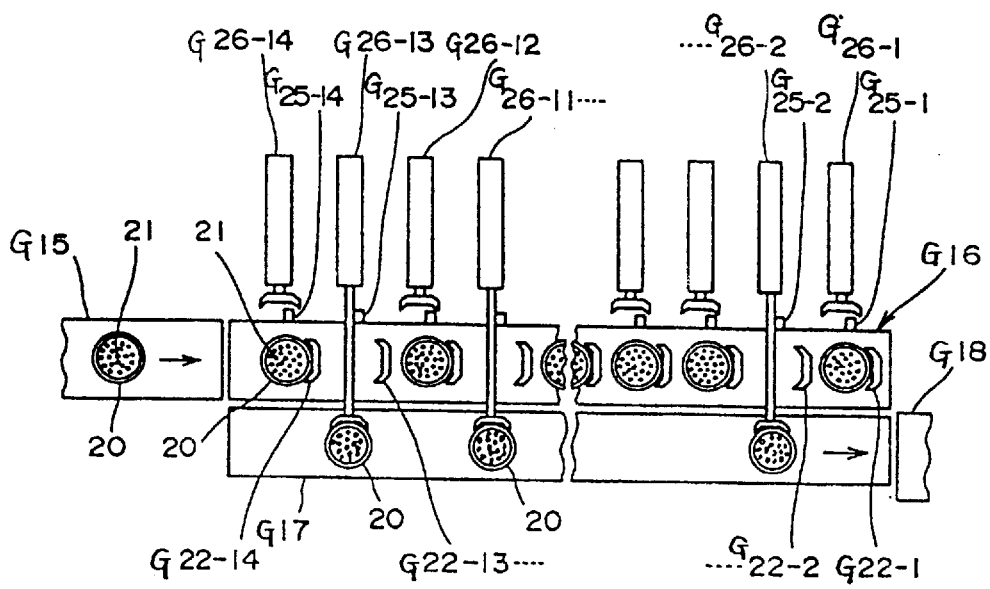
FIG. 25 is a plan view of the combination weighing machine of the fourth embodiment, showing how pushers push out cups containing selected articles.

As shown in FIG. 24, first through fourteenth cup detectors G25-1 through G25-14 are disposed with a predetermined spacing between adjacent ones, along the left side viewed in the conveying direction of the retention conveyor G16. The cup detectors G25-1 through G25-14 detect cups 20 caught and held by the respective stops G22-1 through G22-14 in the respective positions shown in FIG. 24, and develop detection signals when they detect cups 20. Behind the respective cup detectors G25-1 through G25-14 are first through fourteenth pushers G26-1 through G26-14, which have respective air cylinders. Pads G27-1 through G27-14 are at the respective front ends of the piston rods, and have concave surfaces which contact cups 20 so that cups 20 may not be disengaged from the pads G27-1 through G27-14 when they push cups 20 out of the retention conveyor G16. The pads G27-1 through G27-14 are driven by the respective air cylinders to move between pushing positions (i.e. the stretched position of the pushers) for pushing respective cups onto the transfer conveyor G17 and stand-by positions (i.e. the retracted positions of the pushers). The pushing positions of the pads (the stretched positions of the pushers) and the stand-by positions (the retracted positions of the pushers) are shown in FIG. 25.

Next, the process in which cups 20 containing weighed articles are made to stand on the retention conveyor G16 is explained. Let it be assumed that no cups 20 are on the retention conveyor G16. Because the rightmost first stop G22-1 of the retention conveyor G16 shown in FIG. 24 is fixed, it is always ready to catch a cup 20. On the other hand, the remaining thirteen, namely, second through fourteen stops G22-2 through G22-14 are in their upper positions (cup noncatching positions), being driven by the respective air cylinders G23-2 through G23-14. Then, as cups 20 containing weighed articles are successively forwarded from the weighing conveyor G15, and move under the second through fourteenth stops G22-2 through G22-14. Then, as shown in FIG. 28, the foremost cup 20 comes into contact with the first stop G22-1 and stops there. The first cup detector G25-1 associated with the first stop G22-1 detects a cup 20 and the detection signal is applied to the computation control section. Upon receiving the detection signal, the computation control section drives the air cylinder G23-2 to stretch so that the second stop G22-3 moves from its upper position to the lower position (cup catching position), as shown in FIG. 28. A second cup 20 forwarded comes into contact with the second stop G22-2 and stops there. Similarly, the second cup detector G25-2 associated with the second stop G22-2 detects the second cup 20, and the computation control section drives the air cylinder G23-3 to stretch so that the third stop G22-3 shown in FIG. 28 moves to its lower position (cup catching position). In this manner, each time one of the third through fourteenth cups 20 is conveyed, one of the fourth through fourteenth stoppers G22-4 through G22-14 is moved to the lower position (cup catching position), so that a total of fourteen cups 20 are held at respective positions on the retention conveyor G16.

Next, the process in which the combination computing means computes various combinations of weights of these weighed articles, and the process in which articles selected for combinations are removed from the retention conveyor G16 onto the transfer conveyor G17 and conveyed into the discharge unit G18 are described.

Although not shown, the combination computing means includes the computation control section (not shown) provided by a central processing unit (CPU), and predetermined programs stored in the memory section (not shown) connected to the computation control section, and performs predetermined combination computations. Specifically, the combination computing means prepares various combinations weights of articles 21 measured by the weighing conveyor G15, and selects articles having weights the sum of which is within a predetermined weight range and is equal to or closest to a preset target weight.

Combination computation performed by the combination computing means is started when combination computation start memory number preset by an operator through a preset indication section (not shown) reaches K. The combination computation start memory number is the condition for the combination computing means to start computation. This condition is, for example, that the number of cups 20 standing on the retention conveyor G16 (i.e. the number of weight values of weighed articles stored in the memory section) K becomes ten or more.

With the weight values stored in the memory section being less than ten, there is a small possibility that combinations of weights the sum of which is within the predetermined weight range are found by the combination computation, and, therefore, computation is not performed.

Only when there are,ten or more weight values so that the possibility of selection of desired combinations increases, the combination computation is carried out.

Figure 29:
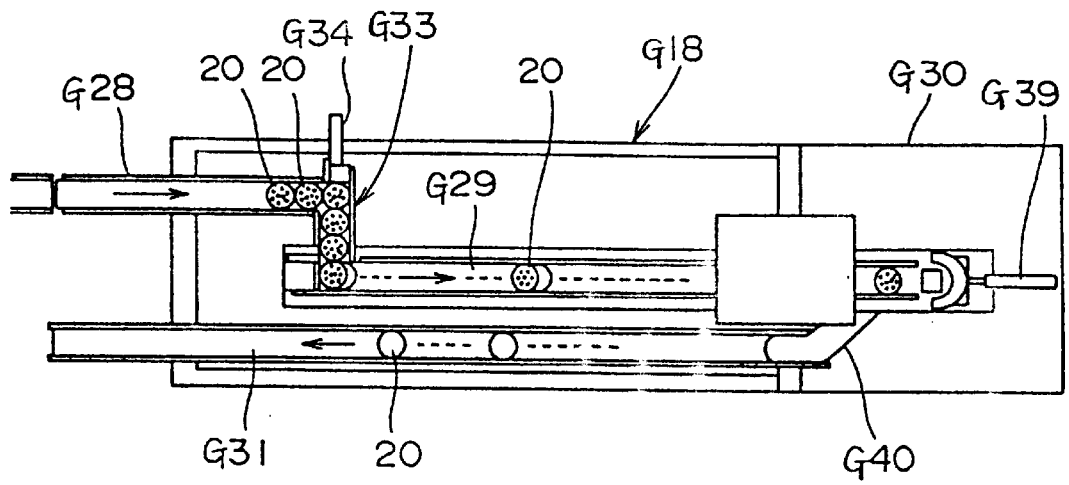
FIG. 29 is a plan view of a discharge unit connected to the combination weighing machine of the fourth embodiment.

The transfer means for transferring cups to the discharging position includes the first through fourteenth pushers G26-1 through G26-14 and the transfer conveyor G17 shown in FIG. 24, and a feed-in conveyor G28 and a sloping conveyor G29 which are included in the discharge unit G18 shown in FIG. 29.

Figure 26:
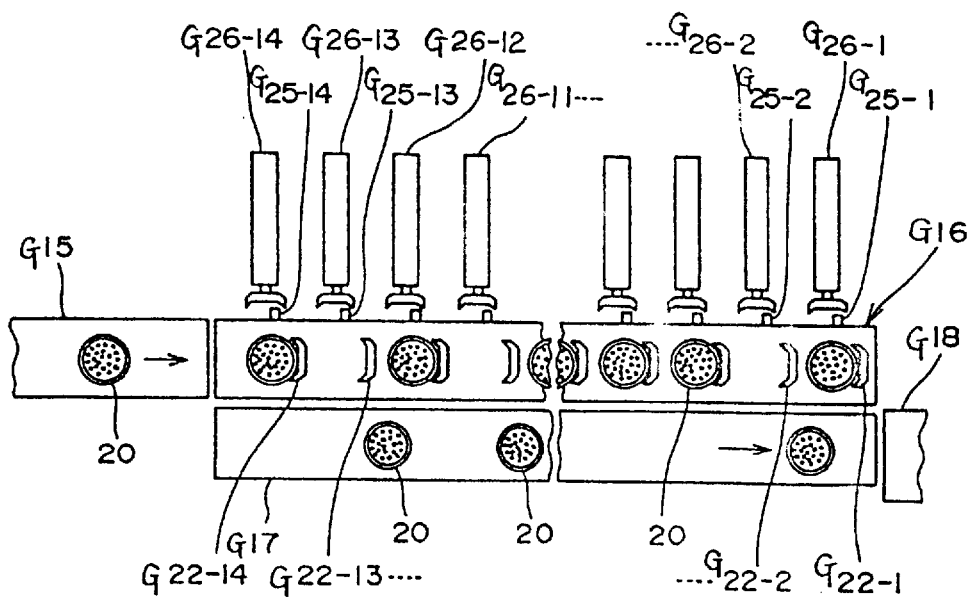
FIG. 26 is a plan view showing the pushers of the combination weighing machine of the fourth embodiment are in their retracted positions.
Figure 27:
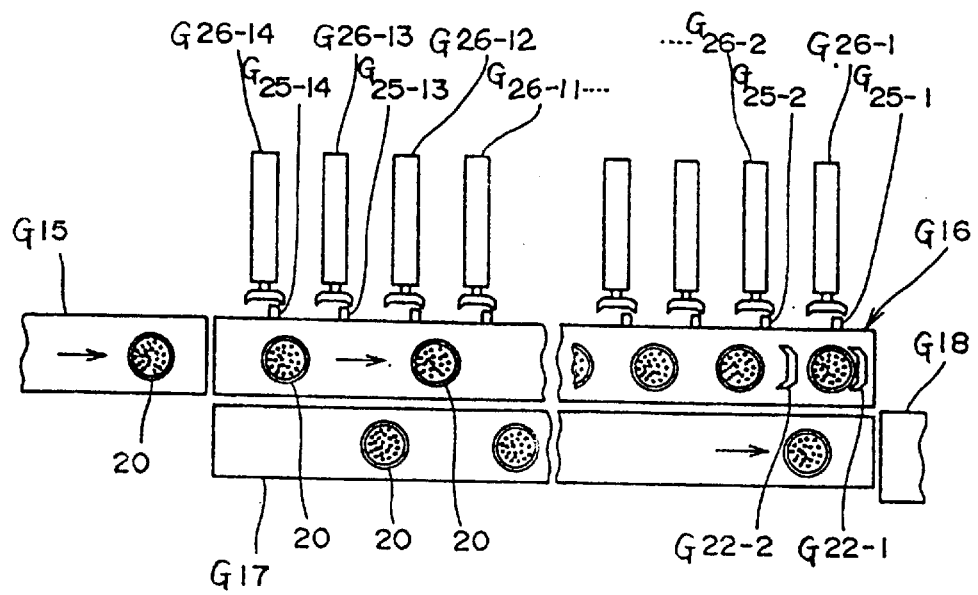
FIG. 27 is a plan view showing how selected articles are conveyed in the combination weighing machine of the fourth embodiment.

Now, let it be assumed that the combination computing means selected the second, eleventh and thirteenth articles (weight values) as shown in FIG. 25 as providing a desired combination. Then, the second, eleventh and thirteenth pushers G26-2, G26-11 and G26-13 stretch and drive the cups 20 containing the second, eleventh and thirteenth articles out of the retention conveyor G16 onto the transfer conveyor G17 (which is a belt conveyor) disposed adjacent to the retention conveyor G16. After that, the second, eleventh and thirteenth pushers G26-2, G26-11 and G26-13 retract to their retracted positions as shown in FIG. 26, and the second, eleventh and thirteenth cups 20 transferred onto the transfer conveyor G17 are conveyed on the transfer conveyor G17 to the discharge unit G18. The articles in the second, eleventh and thirteenth cups 20 transferred to the discharge unit G18 are removed from the cups, and a packaging machine G30 package the articles. When the second, eleventh and thirteenth pushers G26-2, G26-11 and G26-13 are retracted to their retracted positions, the third through fourteenth stops G22-3 through G22-14 move to their upper positions (cup non-catching positions) as shown in FIG. 27, whereby the cups 20 containing the third through tenth, twelfth and fourteenth articles which have not been selected are conveyed forward, and three cups 20 containing weighed articles are successively forwarded from the weighing conveyor G15 to the retention conveyor G16. The fourteen cups containing weighed articles, namely, the three cups 20 forwarded from the weighing conveyor G15 and the eleven cups 20 on the retention conveyor G16, are then caught by the respective stops G22-1 through G22-14 and held in position shown in FIG. 24, in the manner described above. The weight values of the articles in the respective stop positions are stored in the memory section, being associated with the respective stop positions.

Figure 30:
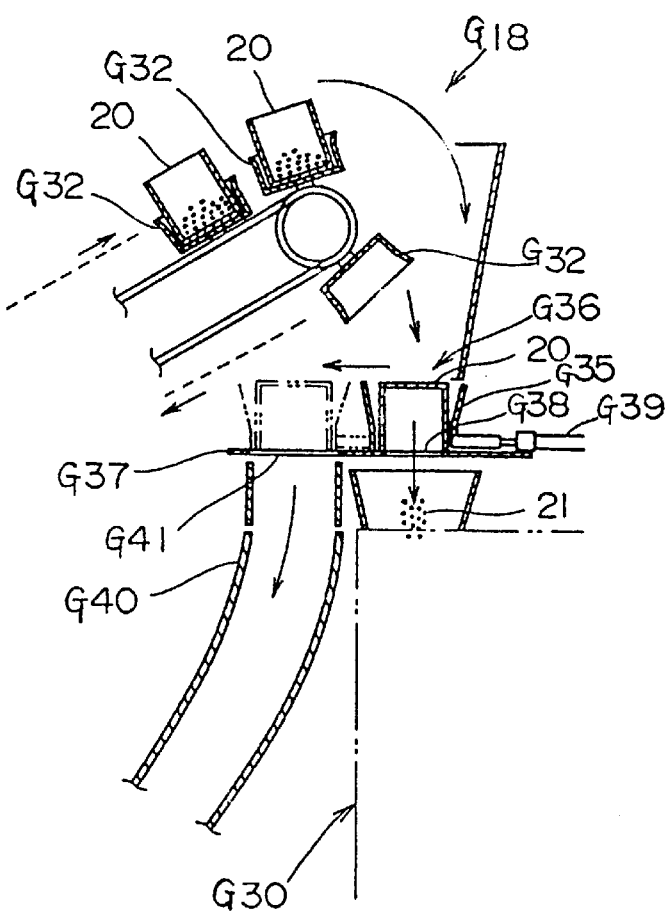
FIG. 30 is an enlarged cross-sectional view of part of the discharge unit connected to the combination weighing machine of the fourth embodiment.

Next, the discharge unit G18 is described. The discharge unit G18 includes the feed-in conveyor G28, the sloping conveyor G29 and a feed-out conveyor G31. The feed-in conveyor G28 and the feed-out conveyor G31 are belt conveyors. The sloping conveyor G29 is a chain conveyor with a number of cup holders G32 on the transfer surface thereof as shown in FIG. 30. The feed-in conveyor G28 is linked with the transfer conveyor G17 and receives and feeds cups containing articles selected for combination from the transfer conveyor G17 into a push-out device G33 shown in FIG. 29. The push-out device G33 drives an air cylinder G34 with a predetermined timing to cause cups 20 to be fed one by one to the input end of the sloping conveyor G29.

One cup 20 is put into one cup holder G32. Each cup 20 in the cup holders G32 is turned upside down at the top end of the sloping conveyor G29, as shown in FIG. 30, and gets out of the cup holders G32. The cup 20 falls into a positioning cylindrical member G35 and stops in a discharge position G36. Because a cup 20 in the discharge position G36 is upside down and because shock is applied to the cup due to falling, an article 21 in the cup 20 goes out of the cup 20 and is put into the packaging machine G30 through a port G38 in a cup receiver plate G37. An air cylinder G39, then, stretches to push the positioning cylindrical member G35 and, hence, an emptied cup 20 to a position (indicated by a two-dots-and-dash line in FIG. 30) above a chute G40. The empty cup 20, then, enters into the chute G40 through an outlet port G41 in the cup receiver plate G37. A cup turner (not shown) disposed at a location along the chute G40 turns cups 20 to a normal position (in which cup openings face upward), and cups 20 are forwarded to the feed-out conveyor G31. The feed-out conveyor G31 conveys empty cups 20 to the transport conveyor G19 which is linked with the feed-out conveyor G31. Then, the transport conveyor G19 forward empty cups one by one to the filling conveyor G14 at predetermined times. In this way, articles selected for combination are put into the packaging machine G30.

Cups 20 containing articles selected for combinations are sequentially conveyed to the discharge position G36 shown in FIG. 30, where the articles 21 are put into the packaging machine G30. The packaging machine 30 reads the number of the articles forming a particular combination from the memory means, to package the necessary articles into one pack. The packaging machine indicates the sum weight of combined articles on each pack.

The means for storing weights of articles measured and the process of storing them are similar to the ones of the first embodiment. The processing is done in accordance with the flow chart shown in FIG. 13. Therefore, detailed descriptions are not given.

Figure 36:
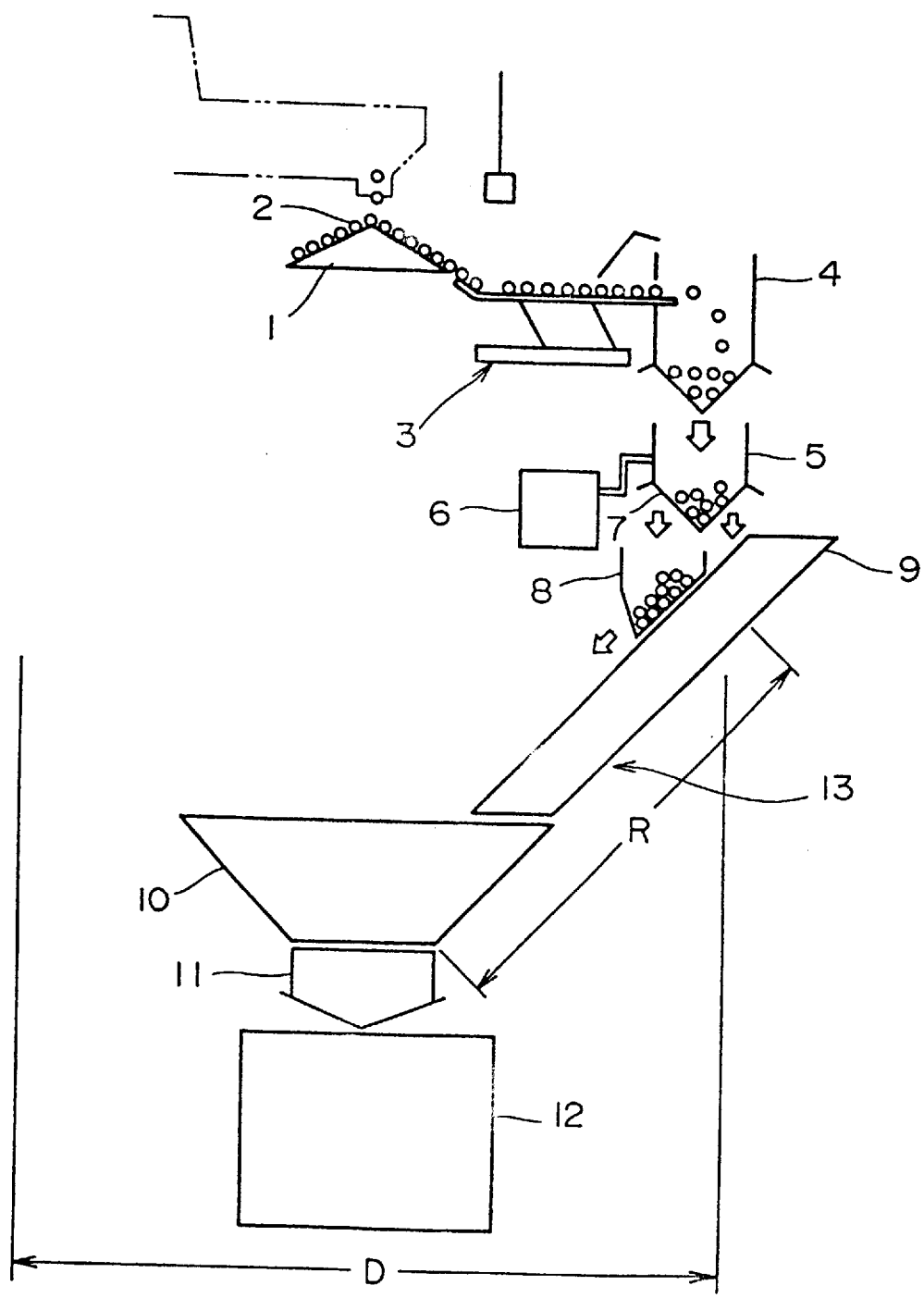
FIG. 36 is a partly removed, cross-sectional view of a conventional combination weighing machine.

With the combination weighing machine of the above-described arrangement, same cups 20 are used to hold articles throughout the processing, from the time when articles are put into the cups 20 on the filling conveyor G14 and selected for combination, as shown in FIG. 24, to the time when articles are put into the packaging machine G30 shown in FIG. 30, as in the first embodiment. Accordingly, different from the conventional combination weigher shown in FIG. 36 in which adhesive or sticky articles tend to stick to the inner surfaces of the individual chutes 9 and the collecting chute 10, the precision and speed of combination weighing of adhesive or sticky articles, such as cut vegetables, pickles and roe, are improved.

Furthermore, many cups 20 with weighed articles contained therein can be made to stand on the retention conveyor G16, and many articles put in these standing cups 20 can be selected for combinations, which also improve the combination weighing precision. If it is desired to increase the number of articles which can be selected for combination, the numbers of the stops, the pushers and the cup detectors, as well as the lengths of the retention conveyor G16 and the transfer conveyor G17 may be increased, which is economical in comparison with the combination weighing machine shown in FIG. 36 in which, in order to add one article weight value, a set of straight feeder, a weighing hopper and a memory hopper must be added.

In addition, similar to the first embodiment, because many weighed articles can be kept waiting in cups 20, without need for transferring them into separate containers, weights do not change, which could change if articles were removed into a separate hopper or the like so that articles stick and remain on the separate hopper. This also can improve the precision and speed of the combination weighing of sticky articles, over conventional machines. Furthermore, because of the arrangement which permits many cups 20 containing weighed articles to stand on the retention conveyor G16, the weighing by the weighing conveyor G15 can be done successively and continuously, so that the operation efficiency of the weighing conveyor G15 is improved over prior art.

Figure 31:
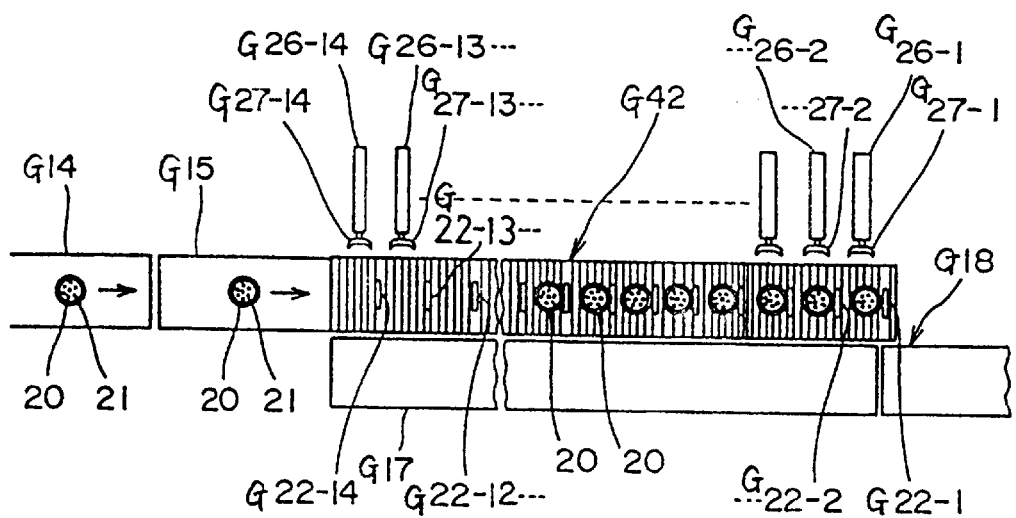
FIG. 31 is a plan view of a combination weighing machine according to a fifth embodiment of the present invention.
Figure 32:
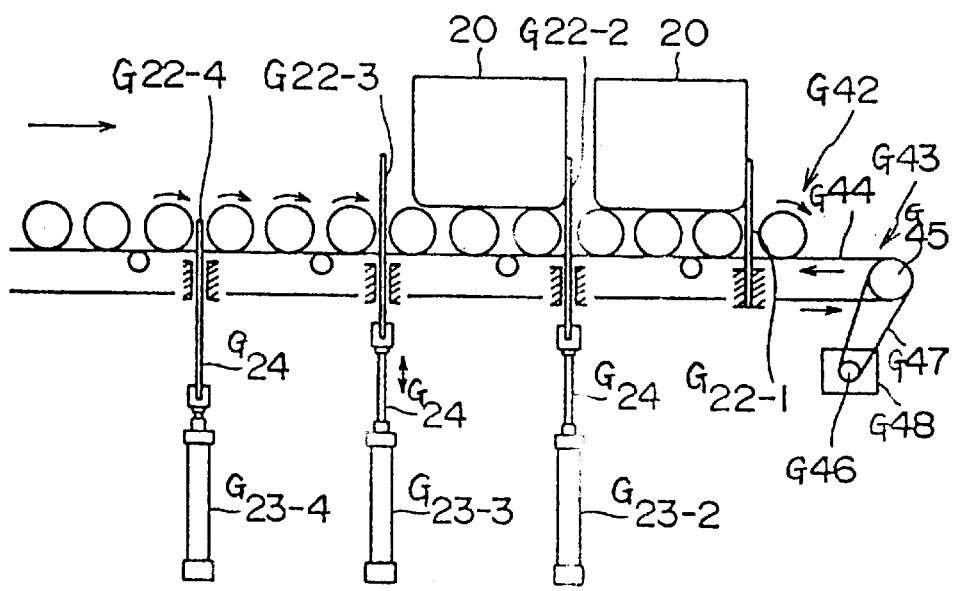
FIG. 32 is an enlarged, front elevational view of a roller conveyor used in the combination weighing machine of the fifth embodiment.

A fifth embodiment is described with reference to FIGS. 31 through 34. A combination weighing machine according to the fifth embodiment is the combination weighing machine according to the fourth embodiment with an exception that a roller conveyor G42 shown in FIG. 31 is used as the retention conveyor G16 of the fourth embodiment, and the stops G22-1 through G22-14 are disposed beneath the roller conveyor G42. Otherwise, the combination weighing machine of the fifth embodiment is similar to that of the fourth embodiment, and, therefore, similar portions are not described any more. It should be noted, however, that although not shown in FIG. 31, cup detectors G25-1 through G25-14 similar to the ones of the fourth embodiment are also used. According to the fifth embodiment, since the stops G22-2 through G22-14 are disposed below the retention conveyor G16, articles put in cups 20 can be visually inspected easily. FIG. 32 is an enlarged front elevational view showing how cups 20 with weighed articles contained therein are caught and held by the stops on the roller conveyor G42. FIG. 33 shows the roller conveyor G42 from the froward direction. G43 in FIGS. 32 and 33 denotes a driving unit for driving the roller conveyor. The driving unit includes a roller driving belt G44, pulleys G45 and G46, a power transmission belt G47, and a motor G48. FIGS. 34(*a*), (*b*) and (*c*) are plan views of examples of the stops G22. The shape of the stops G22 may be determined in accordance with the shape and size of cups 20.

Similar to the combination weighing machine according to the fourth embodiment, the combination weighing machine of this embodiment can stop fourteen cups 20 at predetermined positions on the roller conveyor G42. After selected cups 20 are pushed out from the roller conveyor G42, different cups 20 containing weighed articles are successively fed in, as in the fourth embodiment, and the remaining cups 20 on the roller conveyor G42 are conveyed forward so that a maximum of fourteen cups 20 can be made to stand.

Next, a sixth embodiment is described with reference to FIG. 35. A combination weighing machine according to the sixth embodiment is similar to the combination weighing machine of the fourth embodiment, except that a belt conveyor G49 shown in FIG. 35 is used as the retention conveyor G16 of the fourth embodiment, and stops G22-1 through G22-14 are eliminated. With the elimination of the stops, the structure is simplified, and the bulk of the machine is decreased. Otherwise, the combination weighing machine according to the sixth embodiment is similar to the one of the fourth embodiment, and detailed descriptions are not made. It should be noted, however, although not shown in FIG. 35, pushers and cup detectors similar to the pushers G26-1 through G26-14 and the cup detectors G25-1 through G25-14 are used. As shown in FIG. 35, the belt conveyor G49 of the sixth embodiment includes fourteen separate conveyors G50-1 through G50-14, each having such a size as to be capable of holding one cup 20. Each of the separate conveyors includes three cup holding rollers G51, a drive roller G52, and a belt G53 wrapped around the four rollers. Each of the fourteen drive rollers G52 of the fourteen separate belt conveyors G50-1 through G50-14 is connected to a drive shaft G58 connected to the rotation shaft of the motor G57 via one of electromagnetic clutches G54 with a brake and bevel gears G55 and G56.

With this combination weighing machine, without cups 20 on the belt conveyor G49, all of the fourteen separate belt conveyors G50-1 through G50-14 are driven. When a first cup 20 is conveyed onto the belt conveyor G49, it is conveyed on the fourteen separate belt conveyors in the rightward direction G59 in FIG. 35. When the cup reaches a predetermined position on the rightmost first separate conveyor G50-1, it is detected by the cup detector G25-1, and the electromagnetic clutch G54 associated with the first separate conveyor belt G50-1 is separated. At the same time, the drive roller G52 is braked to stop the first separate conveyor G50-1. Thus, the first cup 20 is stopped on the first separate belt conveyor. Similarly, other cups 20 are held at predetermined positions on the second through fourteenth separate belt conveyors G50-2 through G50-14. Thereafter, articles put in some of the cups 20 are selected for combination, and the cups 20 containing the selected articles are pushed on the transfer conveyor G17. In a manner similar to the fourth embodiment, another cups 20 containing weighed articles are successively fed onto the separate conveyors, and the cups remaining on the separate conveyors are fed forward, so that a maximum of fourteen cups 20 can be made to stand on the separate belt conveyors.

Next, a seventh embodiment is described. A combination weighing machine according to this embodiment includes four of the filling conveyor G14 shown in FIG. 24, which are linked in series, and after them, four of the weighing conveyor 15 in parallel (or in series) so as to receive and weigh cups 20 with weighed articles put therein. The retention conveyor G16 is disposed after the weighing conveyors G15 so that cups 20 with articles having their weights measured by the weighing conveyors G15 can stand on the retention conveyor G16. The number of cups 20 which can be kept on the retention conveyor G16 is a maximum of ten, for example. When ten cups 20 with weighed articles put therein standing on the retention conveyor G16 are caught and held by the respective stops G22-1 through G22-10, the combination computing means execute the combination computation. The number of the articles (weight values) to be selected for combination is equal to the number of the weighing conveyors G15, i.e. four (a predetermined number). Otherwise, the combination weighing machine of the seventh embodiment is similar to the one of the fourth embodiment, and similar portions are not described any more.

With the combination weighing machine with the above-described arrangement, a combination of articles put in the predetermined number, four, of cups 20 are selected by the combination computing means and forwarded from the retention conveyor G16, and each time four cups 20 are forwarded from the retention conveyor G16, the predetermined number, four, of cups 20 containing articles 21 weighed by the four weighing conveyors G15 are successively supplied to the retention conveyor G16. Thus, while combinations are being selected, the four weighing conveyors G15 can operate continuously with their full ability.

Because combination computation is performed when a maximum of ten cups 20 which can wait on the retention conveyor G16 (i.e. cups 20 containing weighed articles) are forwarded and held on the retention conveyor G16, always ten articles can be used for selecting combinations, which can provide stabilized weighing precision.

Although the seventh embodiment has been described as including four weighing conveyors disposed in parallel (or in series) and as selecting the same number, four (predetermined number) of articles for combination as the weighing conveyors, a plurality (predetermined number), different from four, of weighing conveyors G15 may be linked in parallel (or in series), with the number of articles (weight values) to be selected for combination being equal to the plurality (predetermined number) of the weighing conveyors G15.

Furthermore, although the seventh embodiment has been described as having ten cups 20, made to stand on the retention conveyor G16, it may be arranged such that a different number, e.g. from eight to twenty, of cups 20 may stand on the retention conveyor G16.

In the fourth through sixth embodiments, a plurality of filling conveyors G14 (together with a plurality of filling machines or operators) and a plurality of weighing conveyors G15 may be used to increase the weighing ability of the combination weighing machine, so that the speed of combination weighing can be increased. If the number of articles to be selected for combination is set to, for example, three or four, a total of, for example, four weighing conveyors G15 may be used so that when three or four selected articles are forwarded, a desired number of articles can be forwarded to the retention conveyor G16, whereby the combination weighing can be performed at a higher speed.

Furthermore, in the fourth through sixth embodiments, a standby conveyor may be disposed between the weighing conveyor G15 and the retention conveyor G16 to permit a plurality of cups 20 containing weighed articles to stand by thereon. With the use of such standby conveyor, cups 20 with weighed articles put therein on the standby conveyor can be forward to the retention conveyor G16 as soon as cups 20 with weighed articles contained therein are pushed out from the retention conveyor G16, so that a waiting time can be eliminated, which otherwise would be necessary for waiting for the number of cups 20 containing weighed articles selectable for combination to become equal to the combination computation start memory number K.

In the first through seventh embodiments, if the weights of empty cups 20 are equal, combination computation may be carried out for various combinations of sum weights of cups and articles therein. In such a case, a target weight is the sum of the weight of an article and the weight of a cup.

Although the first through seventh embodiments have been described as using cups 20 which is cylindrical and has a bottom, cups of different shapes, e.g. a shape of prism with a bottom, may be used.

Further, the first through seventh embodiments have been described as including the retention conveyor 63 and the transfer conveyor 64 each comprising two plastic chain loops, but they each may comprise single plastic chain loops. What is important is that each of the retention conveyor 63 and the transfer conveyor 64 should be able to convey cups 20 in a predetermined direction and hold cups 20 following a foremost cup 20 in such a manner that succeeding cups 20 push preceding ones, on the conveyor surface when the foremost cup 20 is caught and stopped.

In the first through third embodiments, the number of the weighers 62 has been described to be four, but a different number of weighers may be used. The supplying stage 61 must be configured such as to arrange forward cups 20 in the same number of rows as the number of the weighers 62. The number of the weighers 62 is preferably approximately equal to the number of weight values to be selected for forming combinations. This is because by supplying, to the retention conveyor 63, cups 20 approximately equal in number to cups selected for combination and fed out of the retention conveyor 63, a substantially constant number of cups 20 can be made to stand on the retention conveyor 63 and the weighers 62 can be operated at a relatively high operating efficiency, without being idle. Of course, if the weighing speed of the weighers 62 is relatively high, the number of the weighers 62 may be approximately equal to the average of the numbers of weight values (i.e. the average of cups 20) selected for one combination divided by a natural number.

Also, the first through third embodiments have been described as having two standby cups 20, namely, the eleventh and twelfth cups from the foremost cup on the retention conveyor 63, but two or other number of cups 20 may be used as standby cups on the retention conveyor 63. Standby cups may be kept on a separate standby transfer unit, e.g. a conveyor. In other words, cups 20 forwarded from the weighers 62 are received on such separate standby transfer unit, and then successively conveyed at predetermined times onto the retention conveyor 63.

The first through seventh embodiments may be modified by using plural sets of the retention conveyor 63, the transfer conveyor 64 and the pushers 84-1 through 84-10 which are shown in FIG. 1, supplying cups 20 from the four weighers 62 to the plural sets of the retention conveyor 63, the transfer conveyor 64 and the pushers 84-1 through 84-10, and sequentially forwarding cups 20 containing articles selected for combination in each set to a single discharge unit 65.

We claim:

1. A combination weighing method comprising the steps of: putting an article into each article holding means; measuring, by weighing means, the sum weight of each article holding means and said article in said article holding means, or the weight of said article while said article is held in said article holding means; feeding out said article holding means containing articles of which weights have been measured by said weighing means from said weighing means, and causing said article holding means to wait in a waiting position; combining by combination computing means, weight values developed by the measurement by said weighing means in various ways, and selecting articles forming a combination of articles the sum weight of which is within a predetermined weight range; removing said article holding means containing said articles which form said combination selected by said combination computing means from said waiting position; and conveying said article holding means removed from said waiting position to a discharge position where the articles forming said selected combination are discharged.

2. A combination weighing machine comprising: a plurality of article holding means into which articles are put; weighing means for measuring the sum weights of said article holding means and said articles in said article holding means, or measuring the weights of said articles while said articles are held in said article holding means; waiting means for receiving from said weighing means and causing to wait a plurality of said article holding means containing articles of which weights have been measured by said weighing means; combination computing means for combining respective weight values developed by the measurement by said weighing means in various ways, and selecting articles forming a combination of articles the sum weight of which is within a predetermined weight range; removing means for removing said article holding means containing said articles which form said combination selected by said combination computing means from said waiting means; and transfer means for conveying said article holding means removed from said waiting means to a discharge position where the articles forming said selected combination are discharged.

3. The combination weighing machine according to claim 2 wherein a predetermined number, two or greater, of said weighing means are provided; said combination computing means selects a combination of articles equal in number to said weighing means; and each time said predetermined number of article holding means containing the articles forming said selected combination are fed out from said waiting means, the same number of article holding means containing articles of which weights have been measured by said weighing means are fed to said waiting means.

4. The combination weighing machine according to claim 2 further comprising: deviation preventing means for arranging said article holding means in a row on said waiting means and preventing said article holding means from deviating out of said waiting means.

5. A combination weighing machine comprising: a plurality of article holding means into which articles are put; weighing means for measuring the sum weights of said article holding means and said articles in said article holding means, or measuring the weights of said articles while said articles are held in said article holding means; waiting means for causing a plurality of said article holding means containing articles of which weights have been measured by said weighing means, to wait in a row with said article holding means contacting adjacent ones; combination computing means for combining respective weight values developed by the measurement by said weighing means in various ways, and selecting articles forming a combination of articles the sum weight of which is within a predetermined weight range; removing means for removing from said waiting means said article holding means containing the articles forming the combination selected by said combination computing means; and transfer means for conveying said article holding means removed by said removing means to a discharge position where the articles forming said selected combination are discharged.

6. A combination weighing machine comprising: a plurality of article holding means into which articles are put; feeding means for alternately moving and stopping respective article holding means which are held in contact with preceding and succeeding ones, to thereby convey said respective article holding means in the forward direction; second weighing means (62) having a table disposed in a succeeding stage of said feeding means, for measuring the sum weights of said article holding means and said articles contained in said article holding means disposed on said table, or measuring the weights of said articles while said articles are held in said article holding means; combination computing means for combining respective weight values developed by the measurement by said second weighing means (62) in various ways, and selecting articles forming a combination of articles the sum weight of which is within a predetermined weight range; and transfer means for conveying said article holding means containing the articles forming the combination selected by said combination computing means to a discharge position where the articles forming said selected combination are discharged; said combination weighing machine further comprising second elevator means (58) including a second elevator (50) which is driven to move between an elevated position and a lowered position, said second elevator (50), while in said elevated position, being capable of receiving said article holding means conveyed by said feeding means, said article holding means being moved away from said succeeding article holding means on said feeding means while said second elevator (50) is moving to said lowered position, whereby said article holding means on said second elevator (50) is transferred onto said table.

7. A combination weighing machine comprising: a plurality of article holding means into which articles are put; weighing means for measuring the sum weights of said article holding means and said articles in said article holding means, or measuring the weights of said articles while said articles are held in said article holding means; waiting means for receiving from said weighing means a plurality of said article holding means containing articles of which weights have been measured by said weighing means, and causing the received article holding means to wait; combination computing means for combining respective weight values developed by the measurement by said weighing means in various ways, and selecting articles forming a combination of articles the sum weight of which is within a predetermined weight range; and discharge means for conveying the articles forming the combination selected by said combination computing means to a discharge position for discharging;

wherein said discharge means includes a lift conveyor for conveying upward said article holding means containing articles, arranged in a plurality of lateral rows, and for turning upside down said article holding means arranged in rows at the top of said lift conveyor and causing said upside-down article holding means to fall onto a receiving frame, whereby articles contained in said respective article holding means are discharged through the inside of said receiving frame.

8. A combination weighing method comprising the steps of:
   a) putting one or more articles into each of a plurality of article holders;
   b) measuring the weight of the one or more articles in each of said article holders;
   c) determining a first selected combination of article holders containing said one or more articles, the sum weight of the articles in said first selected combination of article holders being within a predetermined weight range;
   d) transferring said first selected combination of article holders to a discharge station and discharging the articles from the article holders; and
   e) determining a second selected combination of article holders containing said one or more articles, the sum weight of the articles in said second selected combination of article holders being within a predetermined weight range, the second selected combination of article holders being determined before refilling the article holders of said first selected combination of article holders, the article holders not in said first selected combination of article holders being used in determining said second selected combination of article holders without the said one more articles contained in each of said non-selected article holders being reweighed and without said non-selected article holders being transferred to the discharge station before said second selected combination of article holders is determined.

9. The method of claim 8 wherein additional article holders each containing one or more articles that have been weighed are also used in determining the second selected combination of article holders as the first selected combination of article holders is transferred to the discharge station.

10. The method of claim 8 wherein the second selected combination of article holders is determined while the first selected combination of article holders is being transferred to the discharge station.

11. A combination weighing machine comprising: a plurality of article holders each for holding one or more articles to be weighed; weighing means for measuring the weight of said one or more articles in each of the article holders; a waiting station for receiving article holders after the articles therein have been weighed by said weighing means; combination computing means for determining a selected combination of said article holders holding a sum weight of articles within a predetermined weight range; and transfer means for transferring the selected combination of article holders from said waiting station to a discharge station at which the articles are discharged from the selected combination of article holders, the article holders not included in the selected combination of article holders remaining at the waiting station while the selected combination of article holders is transferred to the discharge station.

12. A combination weighing machine as set forth in claim 11 wherein said waiting station is configured for receiving additional article holders each containing one or more articles that have been weighed by said weighing means as the selected combination of article holders is transferred to the discharge station.

13. A combination weighing machine as set forth in claim 11 wherein said combination computing means includes a memory for storing the weights of articles weighed by said weighing means before the article holders containing the articles are received at the waiting station such that said computing means can determine a second selected combination of article holders from among the article holders at said waiting station without the one or more articles in each of the article holders at said waiting station being reweighed by said weighing means.

\* \* \* \* \*